United States Patent
Masuda et al.

(10) Patent No.: US 6,791,623 B1
(45) Date of Patent: Sep. 14, 2004

(54) IMAGE DISPLAY SYSTEM

(75) Inventors: Kouzou Masuda, Yokohama (JP); Ikuya Arai, Yokohama (JP); Sadao Tsuruga, Yokohama (JP); Jiro Kawasaki, London (GB); Tsuyoshi Sano, Fujisawa (JP); Tamotsu Nagabayashi, Yokohama (JP); Ryuuichi Someya, Fujisawa (JP); Fumio Inoue, Yokohama (JP); Kouji Kitou, Hiratsuka (JP); Yasuhiro Imai, Hadano (JP); Masatoshi Hirose, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/432,150

(22) Filed: Nov. 2, 1999

Related U.S. Application Data

(62) Division of application No. 08/547,763, filed on Oct. 24, 1995, now Pat. No. 5,978,041.

(30) Foreign Application Priority Data

| Oct. 24, 1994 | (JP) | 6-258321 |
| Mar. 13, 1995 | (JP) | 7-052731 |
| Mar. 16, 1995 | (JP) | 7-057471 |
| Mar. 16, 1995 | (JP) | 7-057473 |

(51) Int. Cl.⁷ .......... H04N 5/445; H04N 5/52; H04N 5/57; H04N 5/18

(52) U.S. Cl. .......... 348/563; 348/565; 348/678; 348/687; 348/689

(58) Field of Search .......... 348/563, 565, 348/678, 687, 689, 566, 682, 685, 691, 692, 554, 555, 556, 558, 913, 445, 448, 449; 345/501; H04N 5/445, 5/52, 5/57, 5/18

(56) References Cited

U.S. PATENT DOCUMENTS

| 4,248,091 A | * | 2/1981 | Hashiguchi | 73/631 |
| 4,460,918 A | | 7/1984 | Flasza | 348/554 |
| 4,641,188 A | | 2/1987 | Dischert | 348/448 |
| 4,658,293 A | * | 4/1987 | Arai et al. | 348/448 |
| 4,663,668 A | | 5/1987 | Rabii et al. | 348/694 |

(List continued on next page.)

FOREIGN PATENT DOCUMENTS

| JP | 60-137182 | 7/1985 |
| JP | 62-121884 U | 8/1987 |
| JP | 63-63283 | 3/1988 |
| JP | 64-23176 U | 2/1989 |
| JP | 1-232394 | 9/1989 |
| JP | 2-205887 | 8/1990 |
| JP | 3-113977 | 5/1991 |
| JP | 4-157886 | 5/1992 |
| JP | 5-45785 U | 6/1993 |
| JP | 5-211660 | 8/1993 |
| JP | 6-138834 | 5/1994 |
| JP | 6-230760 | 8/1994 |
| JP | 7-7685 | 1/1995 |

*Primary Examiner*—Nhon Diep
(74) *Attorney, Agent, or Firm*—Antonelli, Terry, Stout & Kraus, LLP

(57) ABSTRACT

An image display system includes a memory for storing at least one scanning line of an inputted video signal of the interlace scanning system, and reading means for repeating to read the video signal of one scanning line from the memory at a speed which is n (n is an integer of 2 or more) times of the writing speed of the video signal for the memory for a horizontal scanning period which is 1/n of the writing period and to stop reading for a horizontal scanning period of the remaining (n−1)/n for each scanning line of one field which is sequentially inputted and reading each scanning line so that the continuous fields interpolate the period of stopping of reading from the memory each other.

56 Claims, 54 Drawing Sheets

U.S. PATENT DOCUMENTS

| | | | | |
|---|---|---|---|---|
| 4,719,456 A | * | 1/1988 | Sproch et al. | 345/20 |
| 4,855,812 A | | 8/1989 | Rokuda et al. | 358/22 |
| 4,963,963 A | * | 10/1990 | Dorman | 348/164 |
| 5,048,101 A | * | 9/1991 | Kurosu et al. | 382/305 |
| 5,162,900 A | * | 11/1992 | Citta | 348/607 |
| 5,251,017 A | | 10/1993 | Riviere | 348/674 |
| 5,260,786 A | | 11/1993 | Kawashima et al. | |
| 5,384,600 A | | 1/1995 | Kaizaki et al. | 348/556 |
| 5,426,731 A | | 6/1995 | Masukane et al. | 345/501 |
| 5,455,632 A | | 10/1995 | Ichihara | 348/565 |
| 5,481,315 A | | 1/1996 | Matsunaga | 348/565 |
| 5,504,535 A | | 4/1996 | Abe | 348/565 |
| 5,504,538 A | | 4/1996 | Tsujihara et al. | 348/673 |
| 5,537,157 A | | 7/1996 | Washino et al. | 348/722 |
| 5,541,651 A | | 7/1996 | Iura et al. | 348/240 |
| 5,546,134 A | | 8/1996 | Lee | 348/673 |
| 5,570,135 A | | 10/1996 | Gove et al. | 348/581 |
| 5,576,843 A | * | 11/1996 | Cookson et al. | 386/97 |
| 5,596,374 A | | 1/1997 | Sumiyoshi et al. | 348/673 |
| 5,675,391 A | * | 10/1997 | Yamaguchi et al. | 348/565 |
| 5,802,281 A | * | 9/1998 | Clapp et al. | 709/228 |

* cited by examiner

FIG. 23a    FIG. 23b    FIG. 23c    FIG. 23d
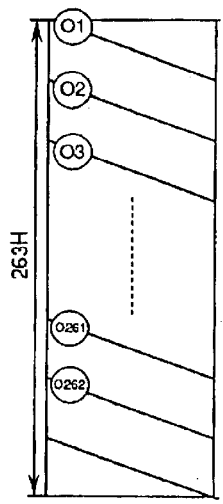 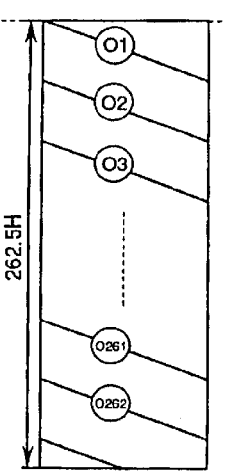 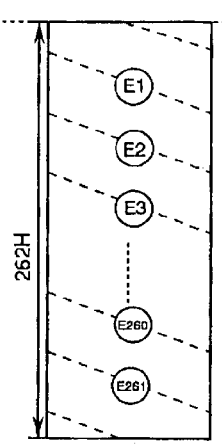 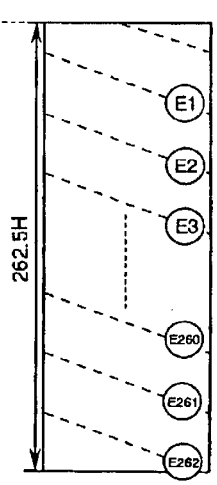
FIG. 23e
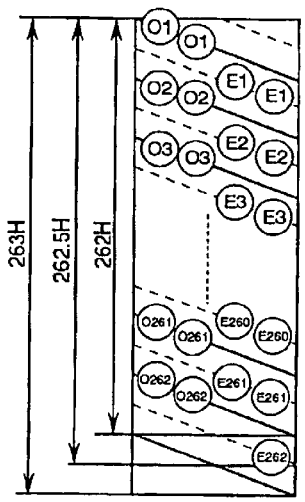

| START ADDRESS | END ADDRESS | BRIGHTNESS LEVEL |

| START ADDRESS | HORIZONTAL, VERTICAL WIDTHS | BRIGHTNESS LEVEL |

| END ADDRESS | HORIZONTAL, VERTICAL WIDTHS | BRIGHTNESS LEVEL |

IMAGE DISPLAY SYSTEM

CROSS-REFERENCE TO RELATED APPLICATION

This application is a division of application Ser. No. 08/547,763 filed on Oct. 24, 1995, now U.S. Pat. No. 5,978,041, the contents of which are hereby incorporated herein by reference in their entirety.

BACKGROUND OF THE INVENTION

1. Field of the Invention

The present invention relates to a display device for displaying computer images including characters and figures mainly and television images including natural images mainly and a system thereof and particularly to a display device having a frequency resolution conversion function for an interlace scanning signal such as an NTSC, PAL, SECAM, or high definition television signal or an image information signal in a personal computer and to a display device for displaying video signals under various standards such as various computers under different specifications, various televisions, and video output devices.

2. Description of the Prior Art

Recently, as multi-media have been developed, there are increasing needs for displaying natural images of the NTSC system which are picked up by a household VTR or video camera on a display device for displaying images of a personal computer or work station.

However, although most of horizontal scanning frequencies of video signals of a personal computer are almost 24 kHz or higher, the horizontal scanning frequency of the NTSC system is low such as 15.75 kHz. When the display device side attempts to correspond to the horizontal scanning frequency of 15.75 kHz, the burden of the horizontal deflection circuit increases and the image quality is degraded such as an increase in screen distortion. Therefore, a double conversion process for doubling the horizontal scanning frequency by converting an interlace scanning signal to a sequential scanning signal is being examined.

Conversion to a sequential scanning signal is broadly divided into two systems. One of them is an intra-field scanning line interpolation system for generating interpolation scanning lines using the scanning lines in the same field and the other is an inter-field scanning line interpolation system for generating interpolation scanning lines using the scanning lines between the preceding and subsequent fields.

When the inter-field scanning line interpolation system among these two sequential scanning conversion systems is applied to the motion portion of an image, two fields which are different in time are composed, so that a problem arises that a duplicate image is formed. Therefore, it is necessary to generate interpolation scanning lines for the motion portion of an image by the inter-field scanning line interpolation system.

In the inter-field scanning line interpolation system, there are a single scan line doubler system in which a line memory which can store a video signal of at least one scanning line is installed, and a video signal of the interlace scanning system is written into this line memory in units of one scanning line, and it is read twice every time at a speed two times of that of writing and an operation interpolation system for generating interpolation scanning lines by operations in consideration of weighting of upper and lower scanning lines.

However, in the single scan line doubler system, the resolution in the vertical direction reduces and the image quality may be degraded. Therefore, as disclosed in Japanese Patent Application Laid-Open 3-113977, a proposal that the degradation of the resolution in the vertical direction is suppressed by modifying the vertical deflection circuit on the television set side so as to display the same scanning line which is read two times every time at the same location on the cathode ray tube is made. The aforementioned operation interpolation system is disclosed in Japanese Patent Application Laid-Open 4-157886 and others.

As disclosed in Japanese Patent Application Laid-Open 63-63283, an example that the horizontal scanning frequency is doubled by doubling the field frequency and the vertical deflection circuit is devised so as to prevent the scanning positions of an odd field and the scanning positions of an even field from confusing with each other may be cited.

A method for modifying the vertical deflection circuit in such a conventional apparatus requires a means for switching an output signal of the vertical deflection circuit on the television set side, so that the vertical deflection circuit has an extremely special constitution and the cost goes up.

In the operation interpolation system, it cannot be avoided that the cost is greatly increased due to addition of an operation circuit. Furthermore, scanning lines generated by operations are scanning lines which do not exist in the original video signal, so that the sharpness of an image reduces and the image quality may be degraded on the contrary.

Next, the standard for a video output device such as a computer terminal or a television set will be considered. The specification for a video signal sent from a computer is not standardized at present and the horizontal and vertical scanning frequencies, video display period, video display position, and video flyback time are different, so that a dedicated display device corresponding to each video signal is generally necessary. For a request for displaying suitable images corresponding to various video signals on one display device, there is a multi-scan display available. In this kind of display device (multi-scan display), many active elements are used in the deflection circuit, and the circuit is increased in scale so as to keep the stability and reliability of operation, and as a result, how to produce and adjust the display device easily comes into a problem.

The aforementioned scanning frequency of a video signal is increasing further at present and accordingly, the signal specification to which a display device corresponds is enlarged. Recently, a display device which can display not only the aforementioned computer signals but also video signals such as television (NTSC) signals and Hi-Vision signals has been required. Concretely, as to the horizontal scanning frequency of a video signal, a display device which can correspond to from 15.75 kHz of an NTSC signal to about 90 kHz equal to a high definition image or a signal of the CAD/CAM class (2M pixels) is desired.

When an extremely wide range of frequencies is handled as mentioned above, it is considerably difficult for the conventional prior art to correspond to them. The reason is that to allow corresponding to the scanning frequency of a video signal, the complexity of switching control of the element constant of the deflection circuit and the number of parts increase and the circuit scale also increases so as to ensure the reliability of operation. Furthermore, it becomes difficult to ensure the performance by corresponding to the display image quality and screen distortion characteristic of various video signals. As a result, the number of parts to be adjusted increases and the cost goes up.

As a method to solve such a problem, there is a method available that a frequency resolution conversion circuit for processing a video signal digitally and converting it to a signal at the desired horizontal and vertical scanning frequencies (hereinafter called a scan converter) is used. As an example using such a scan converter, there is a display device described in Japanese Patent Application Laid-Open 6-138834.

A display device having the aforementioned conventional scan converter will be explained hereunder with reference to the accompanying drawing.

FIG. 30 shows a rough configuration example thereof. In FIG. 30, numeral 11 indicates a scan converter, 13 a deflection circuit, 14 a cathode ray tube (CRT), 120 a video processor circuit, 150a, 150b, and 150c a video circuit Rch, a video circuit Gch, and a video circuit Bch respectively, 151 a video output circuit, 1100 an input video signal, 1200 an input synchronizing signal, and 1300 an output synchronizing signal.

An input video signal 1100 under various standards of computers is inputted to the scan converter 11 and sampled by the A/D converter which is a component of the scan converter 11 by the dot clock of the input video signal 1100 which is regenerated from the input synchronizing signal 1200 by the PLL (phase locked loop) circuit which is a component of the scan converter 11. The sampled signal is written into the memory which is a component of the scan converter 11. Thereafter, it is read from the memory by the dot clock at the predetermined frequency which is regenerated by the aforementioned (or another) PLL circuit in accordance with the number of dots displayed within one horizontal scanning period of the synchronizing signal 1300 at the desired frequency and an output video signal 1400 is generated by the D/A converter which is a component of the scan converter 11. Furthermore, the output video signal 1400 from the scan converter 11 is inputted to the video circuits 150a, 150b, and 150c, subjected to the processes such as brightness control and contrast control in the video processor circuit 120 which is a component of the video circuit 150, and amplified to a voltage amplitude which is sufficiently enough to drive the cathode ray tube (CRT) 14 in the video output circuit 151. On the other hand, the output synchronizing signal 1300 from the scan converter 11 is inputted to the deflection circuit 13 and outputted to the cathode ray tube (CRT) 14. Therefore, even if a video signal having a scanning frequency beyond the corresponding range of the deflection circuit 13 is inputted, it is processed by the scan converter 11 and can be displayed on the cathode ray tube (CRT) 14.

In the display device having the aforementioned constitution, an increase in the number of parts of the deflection circuit to be adjusted is suppressed and a video signal within an extremely wide range of scanning frequencies can be handled. However, a display device of a television set (TV) or a high definition television set (HDTV) is often used at a visual distance of about 1 m or more between a user and the display device in a bright environment. Therefore, high display brightness is desirable. On the other hand, since a display device of a computer such as a personal computer or a work station is often used at a short visual distance of less than about 1 m between a user and the display device in an environment that the ambient light is comparatively dim and from a viewpoint of fatigue of eyes and furthermore to ensure the focus performance, the brightness is generally lower than that of a television set (TV) or a high definition television set (HDTV). Therefore, when video signals such as computer signals, television signals, and high definition television signals are displayed on one display device, it is desirable to switch the brightness for the aforementioned reason. However, in the conventional method, the brightness is not switched.

Recently, a system for composing and displaying (window) video signals such as television signals and high definition television signals on a screen of computer images has been required and even a system using the scan converter of the aforementioned conventional example can realize such a request comparatively simply. However, an image such as a television signal or high definition television signal to be displayed on a computer screen and other computer images are conventionally displayed at the same brightness. Even in this case, it is desirable that the brightness of an image of a television signal or a high definition television signal is higher than that of a computer image.

Furthermore, the present state of specifications and standards such as the horizontal and vertical frequencies of these video signals is shown below.

The specification of video signals generated by various computers is not standardized and the horizontal scanning frequency (hereinafter referred to as $f_H$), vertical scanning frequency (hereinafter referred to as $f_V$) video display period, video display position, and video flyback time are different. Therefore, a dedicated display device corresponding to each video signal is generally necessary. To allow one display device to display suitable images corresponding to various video signals, there is a multiscan display device. This multiscan display device uses many active elements in the deflection circuit so as to correspond to video signals under various specifications, and the circuit scale increases so as to keep the stability and reliability of operation, and as a result, a problem arises that it is difficult to manufacture and adjust such a display device.

There are increasing requests for a high resolution and the scanning frequency of a video signal is increasing. As a result, the specification range of a signal to which a display device corresponds is enlarged. Furthermore, in addition to display of computer video signals mentioned above, a display device which can display also television (NTSC) signals and high definition (HD) signals has been required recently. Concretely, from a viewpoint of $f_H$ of a video signal, a display device which can correspond to from 15.75 kHz of an NTSC signal to about 110 kHz equal to a high definition image or a signal of the CAD/CAM class (resolution of 1600 dots×1200 lines) is desired.

It is difficult for the prior art to handle a video signal at a frequency within such an extremely wide range ($f_H$: 15 to 110 kHz). Namely, the complexity of the element constant switching control circuit of the deflection circuit and the number of parts increase and the circuit scale increases so as to ensure the reliability of operation. Furthermore, it becomes difficult to ensure the performance corresponding to the image quality and screen distortion of various video signals. As a result, the number of parts to be adjusted increases and the cost goes up.

As a method to solve such a problem, there is a method available that a frequency resolution conversion circuit for processing a video signal digitally and converting it to a signal at the desired horizontal and vertical scanning frequencies (hereinafter called a scan converter) is used. As an example using this scan converter, there are display devices described in Japanese Patent Application Laid-Open 1-232394 and Japanese Patent Application Laid-Open 6-138834.

The aforementioned conventional display device will be explained hereunder with reference to the accompanying drawing.

FIG. 74 shows a rough configuration example thereof. In FIG. 74, numeral 71 indicates an A/D converter, 72 a memory, 73 a D/A converter, 74 a synchronization separator, 75 a first PLL (phase locked loop) circuit (1), 76 a second PLL circuit (2), 77 a controller, 78 a synchronizing signal generator, and 79 a display.

An input video signal 710 under various specifications which is supplied from a computer or others is inputted to the A/D converter 71 and an input synchronizing signal 712 is separated into an input horizontal synchronizing signal 716 and an input vertical synchronizing signal 717 by the synchronization separator 74. The PLL circuit (1) 75 generates a writing side clock signal 713 which is synchronized with the input horizontal synchronizing signal 716 in phase and has a frequency which is N times (N: a natural number) of the frequency fH of the input horizontal synchronizing signal 716 and supplies it to the A/D converter 71, the memory 72, and the controller 77. The PLL circuit (2) 76 generates a reading side clock signal 714 which is synchronized with the input horizontal synchronizing signal 716 in phase and has a frequency which is M times (M: a natural number) of the frequency fH of the input horizontal synchronizing signal 716 and supplies it to the D/A converter 73, the memory 72, and the controller 77. The A/D converter 71 samples the input video signal 710 by the writing side clock signal 713 and supplies digital data 718 to the memory 72. The memory 72 writes the digital data 718 on the basis of the writing side clock signal 713 and a control signal 720 from the controller 77, reads digital data 719 on the basis of a reading side clock signal 714 and the control signal 720 from the controller 77, and supplies it to the D/A converter 73. The D/A converter 73 converts the digital data 719 to an output video signal 711 on the basis of the reading side clock signal 714 and supplies it to the display 79.

The synchronizing signal regenerator 78 is controlled by the controller 77, generates an output synchronizing signal 715 using a clock supplied from the PLL circuit (2) 76, and supplies it to the display 79.

In a display device having the aforementioned constitution, it is possible to handle a video signal at a scanning frequency within an extremely wide range by suppressing an increase in the number of parts of the deflection circuit to be adjusted. However, when an NTSC signal is displayed on such a display device, a problem arises that the synchronous state becomes unstable. Namely, the signal source of the NTSC system is diversified and for example, the input video signal 710 and the input synchronizing signal 712 which are comparatively stable are obtained from a television broadcast in which the LD (laser disk) and receiving state are satisfactory. However, the input video signal 710 and the input synchronizing signal 712 from a television broadcast in which the VTR and receiving state are not satisfactory become very unstable and signals including a phase and a frequency jitter. When the PLL circuits 75 and 76 generate the writing side clock signal 713 and the reading side clock signal 714 in phase-synchronization with such an input synchronizing signal 712 including a phase and frequency jitter, the jitter component can be absorbed to a certain extent but not absorbed perfectly and the jitter component may be increased. The frequency $f_{WCLK}$ of a writing side clock signal when an NTSC signal is displayed on such a conventional display device is generally 14.3 MHz. The frequency $f_{RCLK}$ of a reading side clock signal is 28.6 MHz or higher. Although it is well known, it is necessary that the clock jitter $T_{JIT}$ when the digital process is performed is 1/10 of the clock period or less. Therefore, it is necessary that the clock jitter $T_{JIT}$ of the aforementioned write clock signal is 7 ns or less and the clock jitter $T_{JIT}$ of the reading side clock signal is 3.5 ns or less. This is a case that the frequency $f_{RCLK}$ of a reading side clock signal is subjected to a double conversion process of an NTSC signal. However, it is necessary that the clock jitter $T_{JIT}$ when a K times (K: a natural number) conversion process is executed is 7/K ns or less.

When a signal including a phase and frequency jitter is inputted from a VTR, the necessary value of clock jitter of a writing clock signal can be satisfied. However, the necessary value of clock jitter of a reading clock signal is not satisfied often (particularly when $K \geq 4$).

Next, the present state of an art for composing an image into the same field or frame is shown below.

Recently, so-called multi-media services such as VOD (video on demand) services which allow a person to watch a favorite TV program when he feels like it or an electronic encyclopedia using a CD-ROM are popular. In such multi-media services, a television image such as a natural image is often composed and displayed on a computer screen.

Since a computer operator generally looks at characters and figures on a computer display near by it, the brightness is set not so high so that they are easy to see. On the other hand, the brightness of a television image is set comparatively high so that it is seen beautifully.

Therefore, when a television image and a computer image of characters and figures are displayed on a computer display device at the same time, the brightness of the television image becomes lower than that when it is seen on a normal television set and the television image becomes dull. As a result, a means for controlling the brightness level of characters and figures displayed on the screen of the display device and the brightness level of a natural image displayed independently of each other and making only the display portion of the natural image bright is necessary.

Picture in picture for composing and displaying a subscreen of television into a master screen is well known as composing display. For picture in picture, there are a plurality of video signal input systems for a master screen and a subscreen provided in a television set and the amplitude level and DC level are controlled independently for each video signal so that the brightness level of the master screen and the brightness level of the subscreen can be changed independently of each other.

On the hand, the process (composition process) for composing television images such as natural images into computer characters and figures is performed by the software process of computer and a video signal which is composed like this is supplied and displayed on the display device. Therefore, when television images such as natural images are composed and displayed into computer characters and figures, one system of composed video signal is mostly supplied to the display as it is. As a result, in the case of a constitution having a plurality of video signal input systems like picture in picture, it is impossible to control the amplitude level and DC level of a composing screen separately.

SUMMARY OF THE INVENTION

An object of the present invention is to solve the aforementioned problems and provide a display device having a frequency resolution conversion function for displaying faithfully to an inputted video signal at low cost with little degradation in image quality due to scanning line interpolation.

Furthermore, another object of the present invention is to provide a display device for suppressing an increase in the number of portions to be adjusted and an increase in cost and handling video signals at scanning frequencies within an extremely wide range and when video signals under various standards, for example, a computer signal and a television signal are inputted, for displaying them at an optimum brightness respectively. By doing this, the brightness of an output image of the present invention which accomplishes the aforementioned first object can be adjusted and strengthened.

Still another object of the present invention is to provide an image display system and an image display device for controlling the level of even a composed video signal independently for each composing image. By doing this, the brightness when the first and second objects mentioned above are accomplished can be adjusted and strengthened partially or for each scanning line.

Still another object of the present invention is to provide a display device for handling video signals at scanning frequencies within an extremely wide range and displaying a satisfactory image even if a signal including a phase and frequency jitter is inputted. By doing this, an unstable input signal and a stable input signal are composed so as to obtain a stable image and the first to third objects mentioned above can be accomplished effectively.

To accomplish the above objects, the present invention has a memory for storing at least one scanning line of an inputted video signal of the interlace scanning system and a means for repeating to read the aforementioned video signal of one scanning line from the memory at a speed which is n (n is an integer of 2 or more) times of the writing speed of the video signal for a period which is 1/n of the writing horizontal scanning period and to stop reading for a period of the remaining (n−1)/n horizontal scanning period for each scanning line of one field which is sequentially inputted and reading each scanning line so that the continuous fields interpolate the period of stopping of reading from the memory each other.

More concretely, to solve these problems of the prior arts, in a display device of the present invention which has a frequency resolution conversion circuit for storing at least one scanning line of an inputted video signal of the interlace scanning system in a memory, reading a video signal stored in this memory at a speed that is n times of the input speed, and outputting a video signal at a scanning speed of n times and a display means for displaying a video signal in which the scanning speed is changed, a memory control signal generator for reading a video signal of one scanning line from the memory at a speed which is n times of the video signal writing speed for a period which is 1/n of the writing horizontal scanning period, stopping reading for a period of the remaining (n−1)/n horizontal scanning period, reading a video signal of one scanning line from the memory for a horizontal scanning period of 1/n at a speed of n times in the next field for the horizontal scanning period in which reading is stopped in the previous field, and stopping reading for the other horizontal scanning period is installed in the aforementioned frequency resolution conversion means.

Furthermore, in a display device comprising an input means for inputting a first video signal of the interlace scanning system, an input means for inputting a second video signal of the sequential scanning system, a frequency resolution conversion means for converting the scanning speed of the first video signal, a switching means for switching and selectively outputting the first video signal which is subjected to the frequency resolution conversion process and the second video signal, and a display for displaying a video signal outputted from this switching means, a memory for storing a video signal of at least one inputted scanning line and a memory control signal generator for reading a video signal of one scanning line from the memory at a speed which is n times of the video signal writing speed for a period which is 1/n of the writing horizontal scanning period, stopping reading for a period of the remaining (n−1)/n horizontal scanning period, reading a video signal of one scanning line from the memory for a horizontal scanning period of 1/n at a speed of n times in the next field for the horizontal scanning period in which reading is stopped in the previous field, and stopping reading for the other horizontal scanning period is installed in the aforementioned frequency resolution conversion means. Or, in a display device comprising an analog to digital converter for converting an inputted video signal of the interlace scanning system to a digital signal, a field memory for storing a video signal in at least one field which is outputted from the analog to digital converter, a dot clock generator circuit for multiplying an input horizontal synchronizing signal of an inputted video signal and generating a dot clock, a write control circuit for controlling writing into the field memory, a read control circuit for controlling reading from the field memory, an output synchronizing signal generator circuit for dividing a dot clock generated by the dot clock generator circuit and generating horizontal and vertical synchronizing signals of output, and a frequency resolution converter for increasing the number of fields by n times so as to increase the horizontal scanning frequency by n times, a read delay circuit for delaying a read start signal from the read control circuit so that a video signal of an even field which is read first from the memory is delayed by one horizontal scanning period is installed.

Or, in a display device comprising an analog to digital converter for converting an inputted video signal of the interlace scanning system to a digital signal, a field memory for storing a video signal in at least one field which is outputted from the analog to digital converter, a dot clock generator circuit for multiplying an input horizontal synchronizing signal of an inputted video signal and generating a dot clock, a write control circuit for controlling writing into the field memory, a read control circuit for controlling reading from the field memory, an output synchronizing signal generator circuit for dividing a dot clock generated by the dot clock generator circuit and generating horizontal and vertical synchronizing signals of output, and a scan converter for increasing the number of fields by n times so as to increase the horizontal scanning frequency by n times, an output vertical synchronizing signal shifting circuit for shifting an output vertical synchronizing signal so that continuous output video signals of the same field are displayed at the same scan line position is installed.

Or, in a display device having a requency resolution conversion circuit for increasing the field frequency of an inputted video signal of the interlace scanning system by n times so as to increase the horizontal scanning frequency by n times, an analog to digital converter for converting an inputted analog video signal to a digital signal, a memory for storing at least one field of a video signal outputted from this analog to digital converter, a digital to analog converter for converting a video signal read from this memory to an analog video signal, a dot clock generator circuit for multiplying a horizontal synchronizing signal of an inputted video signal and generating a dot clock, a write control circuit for generating a write control signal for the memory from a dot clock generated by the dot clock generator circuit and an input horizontal synchronizing signal and a vertical synchronizing signal of an inputted video signal, an output synchronizing signal generator circuit for counting a dot clock generated by the dot clock generator circuit and generating and outputting an output horizontal synchronizing signal and a vertical synchronizing signal at a frequency which is n times of that of the input signal, a field detector circuit for discriminating whether the field is an odd field or an even field from a horizontal synchronizing signal and a vertical synchronizing signal of an inputted video signal and outputting a field detection signal, an output vertical synchronizing signal shifting circuit for shifting and outputting a vertical synchronizing signal outputted from the output synchronizing signal generator circuit in dot clock units generated by the dot clock generator circuit on the basis of the field detection signal, and a read control circuit for controlling reading from the memory on the basis of a dot clock generated by the dot clock generator circuit, an output horizontal synchronizing signal outputted from the output synchronizing signal generator circuit, an output vertical synchronizing signal outputted from the output vertical synchronizing signal shifting circuit, and reading from the memory on the basis of the field detection signal are installed in the frequency resolution conversion circuit.

By doing this, the present invention has the function and operation indicated below.

To read a video signal from the memory at a speed which is n times of the writing speed, the scanning speed of a video signal to be inputted is n times. Furthermore, since a video signal is read in the next field during the period that reading from the memory is stopped in the previous field, an image can be displayed so as to interpolate the period of stopping of reading for each field. By shifting an output vertical synchronizing signal, it is possible to allow the scanning positions of the interpolated field to coincide with those of the original field.

Next, to accomplish the above objects, particularly the second object, the present invention has a means (scan converter) for converting at least one of the frequency and resolution which process an input video signal digitally and convert it to a video signal having the predetermined horizontal and vertical scanning frequencies, a variable gain video output means for varying the amplitude of the aforementioned video signal, and a control means for controlling the gain of the variable gain video output means according to at least one value of the aforementioned frequency and resolution.

More concretely, the display device of the present invention comprises a scan converter for inputting an input video signal or an input synchronizing signal under various standards and converting and outputting it to a video signal at the desired horizontal and vertical scanning frequencies, a video signal processor for inputting an output video signal from the scan converter and performing the video signal process such as brightness control and contrast control for the display device, a variable gain video output circuit for inputting an output signal of the video signal processor, amplifying it up to a signal voltage amplitude which can drive the cathode ray tube (CRT), furthermore changing the gain by a control signal from the scan converter in accordance with the aforementioned input video signal, a deflection circuit for inputting an output synchronizing signal from the scan converter, and a cathode ray tube (CRT) and an image can be displayed at an optimum brightness by changing the gain of the variable gain video output circuit suitably according to a video signal under various standards.

The present invention having this constitution has the function and operation indicated below.

The present invention having the aforementioned constitution can suppress an increase in the number of portions to be adjusted and handle a video signal at a scanning frequency within an extremely wide range. When video signals under various standards, for example, a computer signal and a television signal are inputted, they can be displayed at an optimum brightness respectively. By doing this, in the present invention which accomplishes the first object mentioned above, the brightness of an output image can be strengthened and prevented from reduction.

Next, to accomplish particularly the third object, the present invention can compose n (n is an integer of 1 or more) images in at least one of the field and frame, display an image composed by this composition means, designate the timing of the composition position of up to n image signals among the image signals composed by the composition means, and control at least one of the amplitude level and DC level in the area within at least one composition image of the n images at the designated composition position timing. Namely, the present invention designates the image composition timing on the composed image signal and controls the amplitude level and DC level at the designated image signal timing.

By doing this, the present invention has the operation and function indicated below.

The brightness levels of characters, figures, and natural images displayed on the screen of the image display means can be controlled independently of each other. As a result, television images such as natural images are displayed brightly and finely and computer images such as characters and figures are displayed legibly at a low brightness. By doing this, like the correspondence to the second object mentioned above, in the present invention which accomplishes the first object mentioned above, the brightness of an output image can be strengthened when necessary.

Furthermore, to accomplish particularly the fourth object mentioned above, the present invention realizes an image display system comprising a frequency conversion means for processing an input video signal digitally and converting it to a video signal at the predetermined horizontal and vertical scanning frequencies, a first clock generator circuit for generating a clock in synchronization with an input synchronizing signal, a second clock generator circuit for generating an asynchronizing clock signal, and a selection means for selecting one of the clock generator circuits on the basis of the aforementioned predetermined horizontal and vertical frequencies and generating a clock for the aforementioned digital process. By doing this, when the input signal is a stable signal, the selection means selects a clock in synchronization with this input signal, and when the input signal is an unstable signal, the selection means selects a stable clock which is generated in asynchronization the input signal, and outputs it as a reading side clock. Therefore, a display device which can handle a video signal at a scanning frequency within a wide range has an operation and function that even if an input signal including a phase and frequency jitter is inputted, a satisfactory image can be displayed. The operation of the present invention which accomplishes the first to third objects mentioned above can be realized more effectively.

The foregoing and other objects, advantages, manner of operation and novel features of the present invention will be understood from the following detailed description when read in connection with the accompanying drawings.

BRIEF DESCRIPTION OF THE DRAWINGS

FIG. 23 shows principle diagrams showing the scanning line structure of the CRT display in the ninth embodiment of the display device of the present invention.

DETAILED DESCRIPTION OF THE PREFERRED EMBODIMENTS

The first embodiment of the present invention will be described hereunder with reference to the accompanying drawings.

Figure 1:
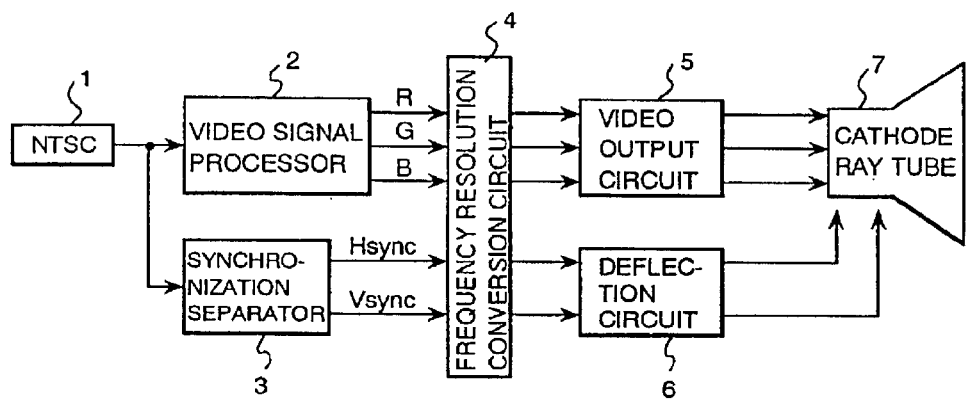
FIG. 1 is a block diagram showing the first embodiment of the display device of the present invention.

FIG. 1 is a block diagram showing the constitution of the display device which is the first embodiment of the present invention and particularly an example of a device for receiving a television signal of the NTSC system and displaying it by doubling the horizontal scanning frequency.

In FIG. 1, numeral 1 indicates an NTSC signal source for outputting a composite video signal, 2 a video signal processor for executing the signal processes such as DC regeneration and Y and C separation for an inputted composite video signal so as to convert it to primary video signals of red, green, and blue, 3 a synchronization separator for extracting and outputting a horizontal synchronizing signal and a vertical synchronizing signal from an inputted composite video signal, 4 a frequency resolution conversion circuit, 5 a video output circuit for amplifying a video signal which is subjected to the frequency resolution conversion process and driving a CRT display 7, and 6 a deflection circuit for controlling the deflection of the CRT display 7 according to a synchronizing signal outputted from the frequency resolution conversion circuit 4.

Next, the constitution of the frequency resolution conversion circuit 4 will be explained in detail with reference to FIG. 2.

Figure 2:
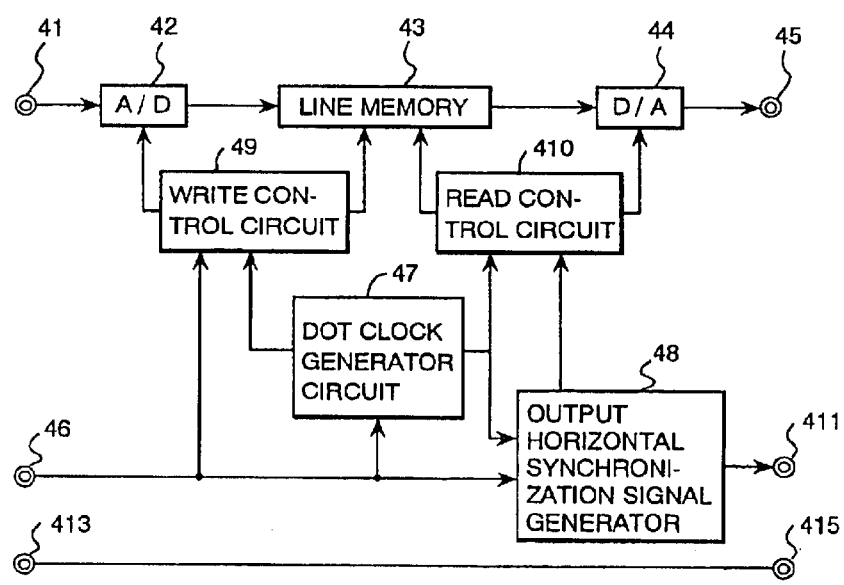
FIG. 2 is a block diagram of the frequency resolution conversion circuit of the display device of the present invention shown in FIG. 1.

In FIG. 2, numeral 41 indicates a video signal input terminal for inputting primary video signals of red, green, and blue, 42 an analog to digital converter for converting primary video signals inputted to the video signal input terminal 41 to digital video signals, 43 a line memory for storing a digital video signal of one scanning line outputted from the analog to digital converter 42, 44 a digital to analog converter for converting a digital video signal read from the line memory 43 to an analog video signal, 45 an output terminal of a video signal which is subjected to the frequency resolution conversion process, 46 a horizontal synchronizing signal input terminal, and 47 a dot clock generator circuit for multiplying a horizontal synchronizing signal inputted from the horizontal synchronizing signal input terminal 46 and generating a dot clock. In this embodiment, an example in which a horizontal synchronizing signal at 15.75 kHz is multiplied to 1820 times by using a PLL (phase locked loop) circuit so as to generate a dot clock at 28.6 MHz will be explained.

Numeral 413 indicates an input terminal of a vertical synchronizing signal, 48 an output horizontal synchronizing signal generator for dividing a dot clock generated by the dot clock generator circuit 47 and generating a horizontal synchronizing signal at a frequency which is two times of that of an inputted horizontal synchronizing signal, 49 a write control circuit for generating a sampling clock of the analog to digital circuit 42 and a write control signal of the line memory 43 on the basis of a horizontal synchronizing signal inputted from the horizontal synchronizing signal input terminal 46 and a dot clock generated by the dot clock generator circuit 47, and 410 a read control circuit for generating a clock of the digital to analog converter 44 and a read control signal of the line memory 43 on the basis of a horizontal synchronizing signal outputted from the output horizontal synchronizing signal generator 48 and a dot clock generated by the dot clock generator circuit 47.

Only one system of the video signal input terminal 41, the analog to digital converter 42, the line memory 43, the digital to analog converter 44, and the video signal output terminal 45 is shown for simplified explanation. Actually, the frequency resolution conversion circuit has one system for each color of red, green, and blue.

Figure 3:
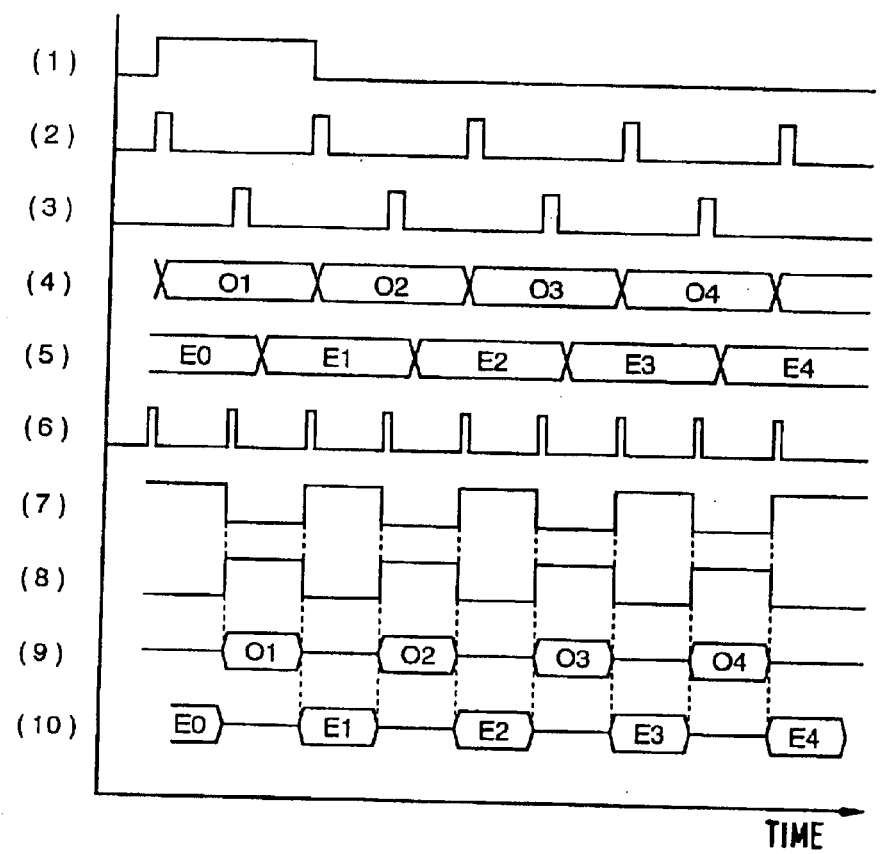
FIG. 3 shows waveform diagrams showing the operation timing of each unit of the frequency resolution conversion circuit of the display device of the present invention shown in FIG. 2.

FIG. 3 is a conceptual diagram showing the timing relation between an input video signal and an output video signal of the line memory 43 in this embodiment. (1) indicates a vertical synchronizing signal of the input video signal and (2) and (3) input horizontal synchronizing signals in an odd field and an even field. (4) and (5) indicate the timing of input data in an odd field and an even field, 01, 02, and 03 the input timing of the data on the 1st, 2nd, and 3rd scanning lines in the odd field respectively, and also E0, E1, E2, and E3 the input timing of the data on the 0th, 1st, 2nd, and 3rd scanning lines in the even field respectively. (6) indicates an output horizontal synchronizing signal, (7) and (8) read enable signals of the line memory 43 in an odd field and an even field, and (9) and (10) video signals read from the line memory 43 in an odd field and an even field.

Figure 4A:
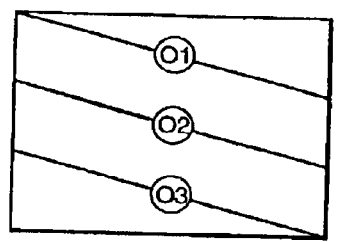
FIG. 4 shows schematic diagrams showing the scan line positions of a video signal of the NTSC system.
Figure 4B:
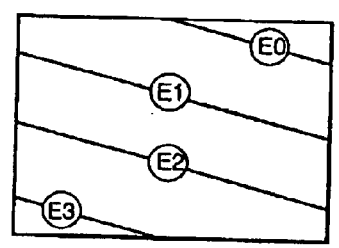

FIG. 4 shows schematic diagrams showing the scan line positions of a primary video signal inputted to the video signal input terminal 41. In this embodiment, an example of a device for performing frequency resolution conversion for a video signal of the NTSC system which is an interlace scanning signal is shown. Therefore, the scan line positions in an odd field are arranged so as to interpolate each other in each field as shown in (a) and the scan line positions in an even field are arranged so as to interpolate each other in each field as shown in (b).

Next, the operation of the frequency resolution conversion circuit 4 will be explained by referring to FIGS. 2 and 3. In FIG. 2, the dot clock generator circuit 47 multiplies a horizontal synchronizing signal at 15.75 kHz inputted to the horizontal synchronizing signal input terminal 46 to 1820 times so as to generate a dot clock at 28.6 MHz and supplies it to the write control circuit 49, the read control circuit 410, and the output horizontal synchronizing signal generator 48.

The write control circuit 49 divides the frequency of the dot clock at 28.6 MHz which is inputted from the dot clock generator circuit 47 by 2 so as to generate a clock at 14.3 MHz and supplies it to the analog to digital converter 42 as a sampling clock and furthermore generates a control signal of the line memory 43 from the inputted horizontal synchronizing signal and the 14.3-MHz clock and supplies it to the line memory 43.

The analog to digital converter 42 converts a primary video signal inputted to the video signal input terminal 41 to a digital signal at the timing of the leading edge of the sampling clock inputted from the write control circuit 49 and supplies it to the line memory 43. In this case, since the inputted primary video signal is an interlace scanning signal, the timing of the input signal of the line memory 43 is shifted by ½ of the horizontal scanning period in each field as shown in (4) and (5) in FIG. 3.

The output horizontal synchronizing signal generator 48 reads a 31.5-kHz output horizontal synchronizing signal which is generated by dividing the 28.6-MHz dot clock inputted from the dot clock generator circuit 47 and supplies it to the read control circuit 410 and the horizontal synchronizing signal output terminal 411. The read control circuit 410 performs a phase adjustment process for the 28.6-MHz dot clock inputted from the dot clock generator circuit 47 and supplies it to the digital to analog converter 44 and furthermore generates a read control signal of the line memory 43 on the basis of the 28.6-MHz dot clock and the 31.5-MHz output horizontal synchronizing signal and supplies it to the line memory 43. In the case of an odd field, as a read enable signal of the line memory 43, a signal in which H and L are switched every period of the output horizontal synchronizing signal as shown in (7) in FIG. 3 is generated and in the case of an even field inversely, a read enable signal of the line memory 43 in which L and H are switched every period of the output horizontal synchronizing signal as shown in (8) in FIG. 3 is generated inversely to the odd field and they are supplied to the line memory 43 respectively.

By controlling reading of the line memory 43 as mentioned above, when the enable signal is on the L level, the line memory 43 enters the active state and can read a video signal. As shown in (9) in FIG. 3, the line memory 43 stops reading of a video signal for one horizontal scanning period of the output horizontal synchronizing signal at the time of field start and reads a video signal for the next one horizontal scanning period. This operation is repeated for the subsequent lines.

In the case of an even field, the line memory 43 reads a video signal during the period that reading is stopped in the odd field as shown in (10) in FIG. 3 inversely to the aforementioned. Namely, video signals are read from the line memory 43 so as to interpolate video signals during the period that reading is stopped every field each other.

The digital to analog converter 44 converts a video signal which is read from the line memory 43 at the timing shown in (9) and (10) in FIG. 3 to an analog video signal at the leading timing of the 28.6-MHz clock inputted from the read control circuit 410 and outputs it to the video signal output terminal 45.

The video output circuit 5 shown in FIG. 1 amplifies a video signal after frequency resolution conversion which is outputted from the video signal output terminal 45 and supplies it to the CRT display 7. The deflection circuit 6 controls the deflection of the CRT display 7 on the basis of a synchronizing signal outputted to the horizontal synchronizing signal output terminal 411 and the vertical synchronizing signal output terminal 415.

Figure 5A:
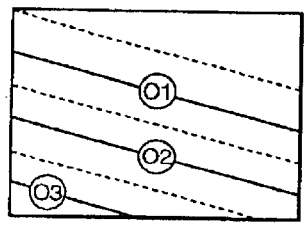
FIG. 5 shows schematic diagrams showing the scan line positions of a display image in the first embodiment of the display device of the present invention.
Figure 5B:
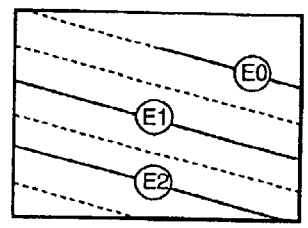

FIG. 5 shows schematic diagrams showing the scan line positions on the CRT display 7 when a video signal inputted from the NTSC signal source 1 is subjected to the frequency resolution conversion process as explained above. A symbol (a) indicates a case that an output video signal in an odd field is displayed and (b) indicates a case that an output video signal in an even field is displayed. In FIGS. 5(a) and 5(b), each solid line is an effective scanning line where a video signal is displayed and each dotted line is an ineffective scanning line where a video signal is not displayed actually because it is not read from the line memory 43. When the arrangement of the valid scanning lines shown in FIGS. 5(a) and 5(b) is compared with that of the scanning lines of the input video signal shown in FIGS. 4(a) and 4(b), although the scanning lines are shifted by ½ of the horizontal scanning period as a whole, the arrangement of the scanning lines and the interval of scanning lines are exactly the same. Therefore, the resolution is not degraded and an image can be displayed faithfully to an input video signal.

In this embodiment, an example in which the horizontal scanning frequency is doubled is described. However, there is no limit to double. Even if the horizontal scanning frequency is converted to n times by reading a video signal at a speed which is n times (n is a natural number) of the writing speed of the line memory 43, setting only one line as an effective scanning line, and setting the scanning lines of the remaining (n−1) lines as ineffective scanning lines, the frequency resolution conversion circuit of the display device of the present invention can respond to it.

Next, the second embodiment of the present invention will be explained by referring to the accompanying drawings.

Figure 6:
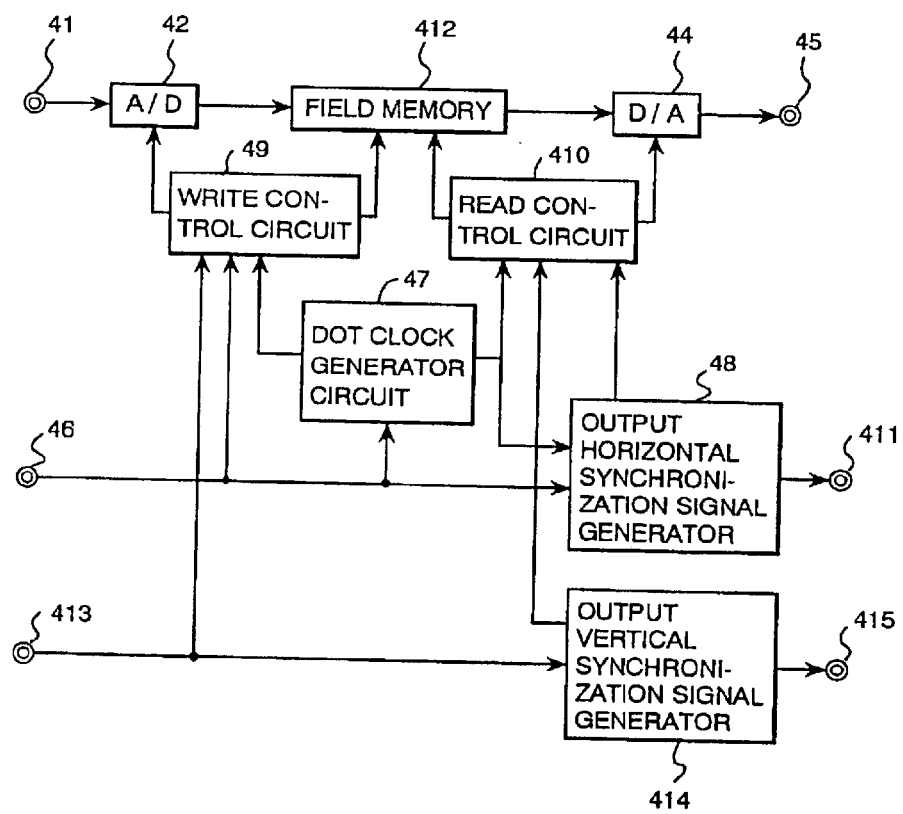
FIG. 6 is a block diagram of the frequency resolution conversion circuit in the second embodiment of the display device of the present invention.

FIG. 6 is a block diagram showing the constitution of the frequency resolution conversion circuit 4 of the display device which is the second embodiment of the present invention. The same reference numeral is assigned to each of the circuit means which are the same as those of the frequency resolution conversion circuit in the first embodiment shown in FIG. 2 so as to omit duplicated explanation.

For the frequency resolution conversion circuit 4 in the first embodiment mentioned above, an example of a device in which the vertical scanning frequency is constant, and the number of lines is doubled by interpolating the ineffective scanning lines, and the horizontal scanning frequency is doubled is described. On the other hand, in the second embodiment, an example of a device in which the horizontal scanning frequency is increased by 4 times by doubling the number of lines by interpolation of the ineffective scanning lines and also doubling the vertical scanning frequency is described. Therefore, the respect that a field memory 412 for storing one field of video signals is used and the respect that an output vertical synchronizing signal generator 414 for generating an output vertical synchronizing signal at a frequency which is two times of that of an input vertical synchronizing signal is installed are different from the first embodiment mentioned above. The operation in the second embodiment will be explained hereunder.

The dot clock generator circuit 47 multiplies a horizontal synchronizing signal inputted to the horizontal synchronizing signal input terminal 46 to 3640 times so as to generate a 57.2-MHz dot clock and supplies it to the write control circuit 49, the read control circuit 410, and the output horizontal synchronizing signal generator 48. The write control circuit 49 divides the inputted 57.2-MHz dot clock by 4 so as to generate a 14.3-MHz clock and supplies it to the analog to digital converter 42 as a sampling clock.

The output horizontal synchronizing signal generator 48 divides the inputted 57.2-MHz dot clock so as to generate an output horizontal synchronizing signal at a frequency which is 4 times of that of an input horizontal synchronizing signal. The output vertical synchronizing signal generator 414 divides the output horizontal synchronizing signal generated by the output horizontal synchronizing signal generator 48 so as to generate a 120-Hz output vertical synchronizing signal. The read control circuit 410 performs the phase adjustment process for the 57.2-MHz dot clock and supplies it to the digital to analog converter 44 and furthermore supplies the dot clock, the output horizontal synchronizing signal, and a read control signal of the field memory 412 which is generated by the read control circuit 410 on the basis of the output vertical synchronizing signal to the field memory 412.

In the field memory 412, in the same way as with the first embodiment, video signals in one field are read for each line at an interval of one output horizontal scanning period. However, although the reading speed of the frequency resolution conversion circuit 4 in the first embodiment is two times of the writing speed, the reading speed of the frequency resolution conversion circuit 4 in this embodiment is four times of the writing speed, so that even if the number of lines is doubled by interpolation of the ineffective scanning lines, the reading from the field memory 412 is completed during ½ of the output vertical scanning period. Therefore, by reading video signals in one field again during the period of the remaining ½ of the output vertical scanning period, the number of fields can be doubled.

Figure 7A:
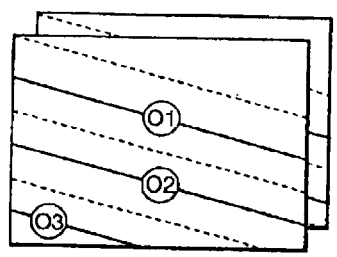
FIG. 7 shows schematic diagrams showing the scan line positions of a display image in the second embodiment of the display device of the present invention.
Figure 7B:
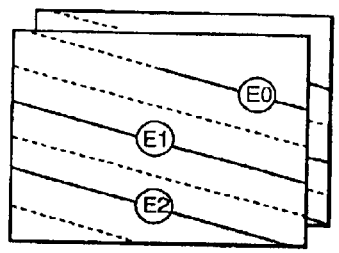

The digital to analog converter 44 converts video signals in the fields which are doubled in number like this to analog signals and supplies them to the video signal output terminal 45. FIG. 7 shows schematic diagrams when a video signal which is subjected to the frequency resolution conversion process by the frequency resolution conversion circuit 4 in this embodiment is displayed on the CRT display 7. A symbol (a) indicates the scan line positions and the number of fields in an odd field and (b) indicates the scan line positions and the number of fields in an even field. In the same way as with the first embodiment, each solid line is an effective scanning line where a video signal is displayed and each dotted line is an ineffective scanning line where no video signal is displayed. The scan line positions are exactly the same as those in the first embodiment, though the number of fields is doubled. Therefore, flickering in a large area can be suppressed.

In this embodiment, an example in which the vertical scanning frequency is doubled is described. However, there is no limit to double. Even if the vertical scanning frequency is converted to n times, the frequency resolution conversion circuit of the present invention can respond to it. Even in this case, in the same way as with the first there is no limit to a case that the vertical scanning frequency is doubled.

Next, the third embodiment of the present invention will be explained by referring to the accompanying drawing.

Figure 8:
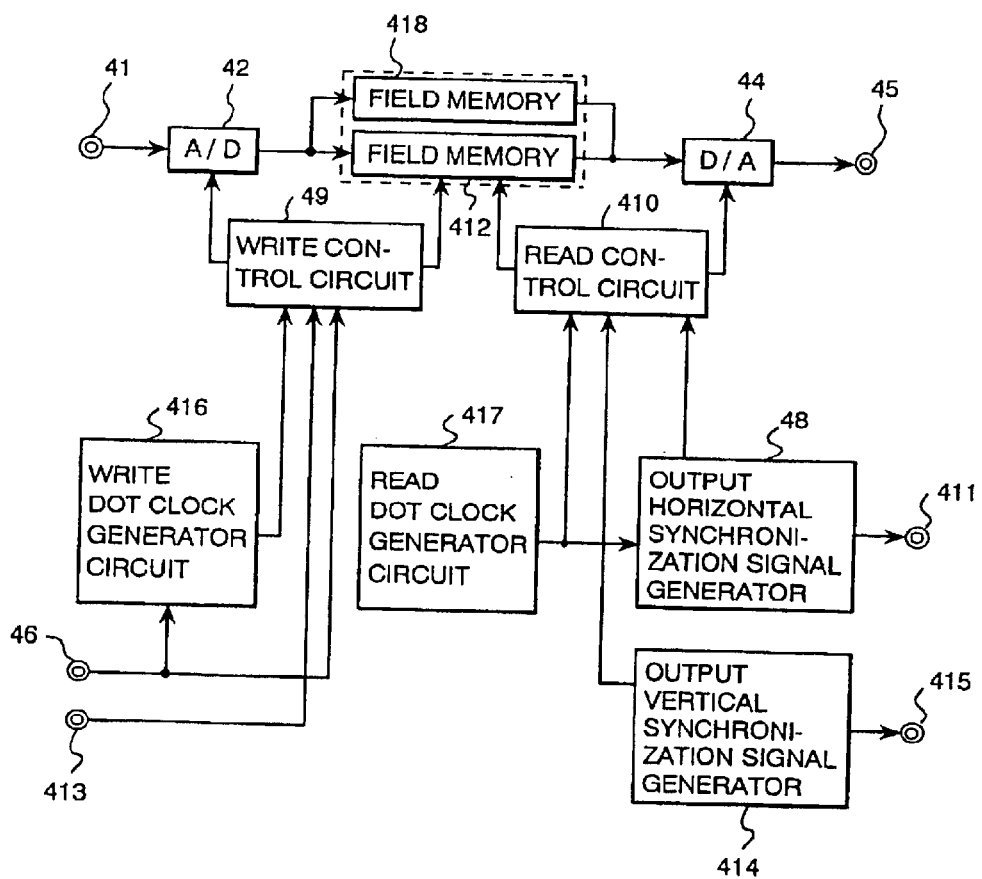
FIG. 8 is a block diagram of the frequency resolution conversion circuit in the third embodiment of the display device of the present invention.

FIG. 8 is a block diagram showing the constitution of the frequency resolution conversion circuit 4 of the display device which is the third embodiment of the present invention. The same reference numeral is assigned to each of the circuit means which are the same as those in the second embodiment shown in FIG. 6 so as to omit duplicated explanation.

In the second embodiment mentioned above, the write control circuit 49 and the read control circuit 410 generate a control signal of the field memory 412 on the basis of a dot clock supplied from the dot clock generator circuit 47. However, this embodiment is different from the second embodiment in the respect that an example of a device that a dot clock generator circuit 416 of a write system and a dot clock generator circuit 417 of a read system are installed independently of each other and reading is executed in asynchronization with writing in the field memory 412 is described.

In the case of such asynchronous writing and reading, the read address of the field memory 412 overtakes the write address, that is, an address overtaking phenomenon occurs. Therefore, in this embodiment, a second field memory 418 is installed, and a video signal is written into each field alternately, and a video signal in the field memory 412 or 418 which is completed in writing is read so as to suppress the degradation in image quality due to an address overtaking phenomenon. It is not necessary that the read dot clock generator circuit 417 synchronizes with the write dot clock generator circuit 416, so that for example, an independent crystal oscillator circuit can be used.

As mentioned above, in this embodiment, reading can be executed in asynchronization with writing in the field memories 412 and 418, so that for example, the scanning speed of a video signal of the NTSC system can be converted to the scanning speed of a video signal in an optional computer.

In this embodiment, an example in which an input video signal is a video signal of the NTSC system is described. However, there is no limit to a video signal of the NTSC system. Needless to say, a signal of the interlace scanning system such as, for example, a PAL system, SECAM system, or high definition television signal may be applied.

Next, the fourth embodiment of the present invention will be explained by referring to the accompanying drawings.

Figure 9:
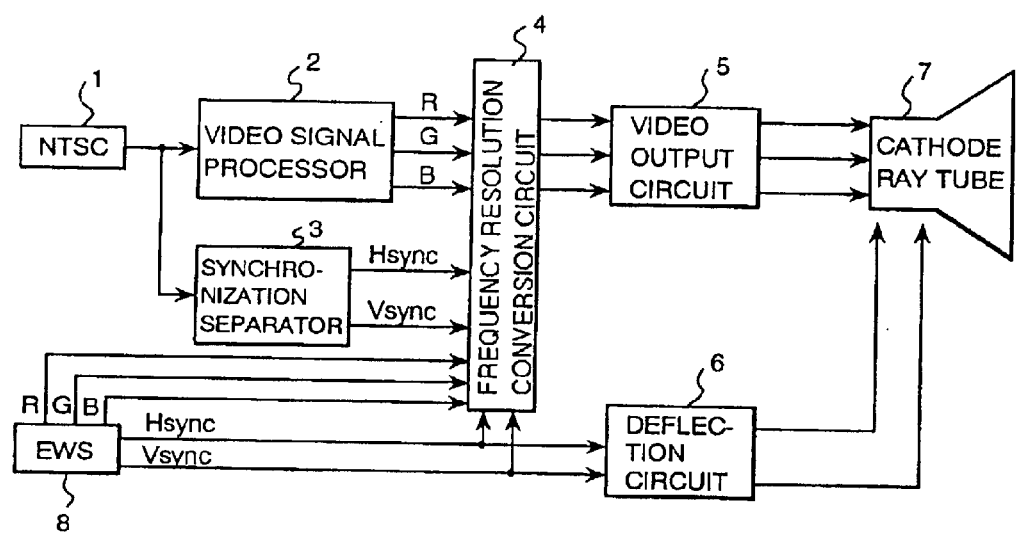
FIG. 9 is a block diagram showing the fourth embodiment of the display device of the present invention.

FIG. 9 is a block diagram showing the constitution of the display device which is the fourth embodiment of the present invention and an example of a device which composes two video signals having different scanning speeds and displays them on the same display screen is shown. The same reference numeral is assigned to each of the circuit means which are the same as those shown in FIG. 1 so as to omit duplicated explanation.

In FIG. 9, an engineering work station (hereinafter abbreviated to EWS signal source) 8 which is the second video signal source generates a video signal having a display resolution of, for example, 1280 dots in the horizontal direction and 1024 dots in the vertical direction. This embodiment shows an example of a device for composing an image of a video signal from the NTSC signal source 1 which is the first video signal source on the screen for displaying a video signal from this EWS signal source 8 and displaying it on the CRT display 7.

Figure 10:
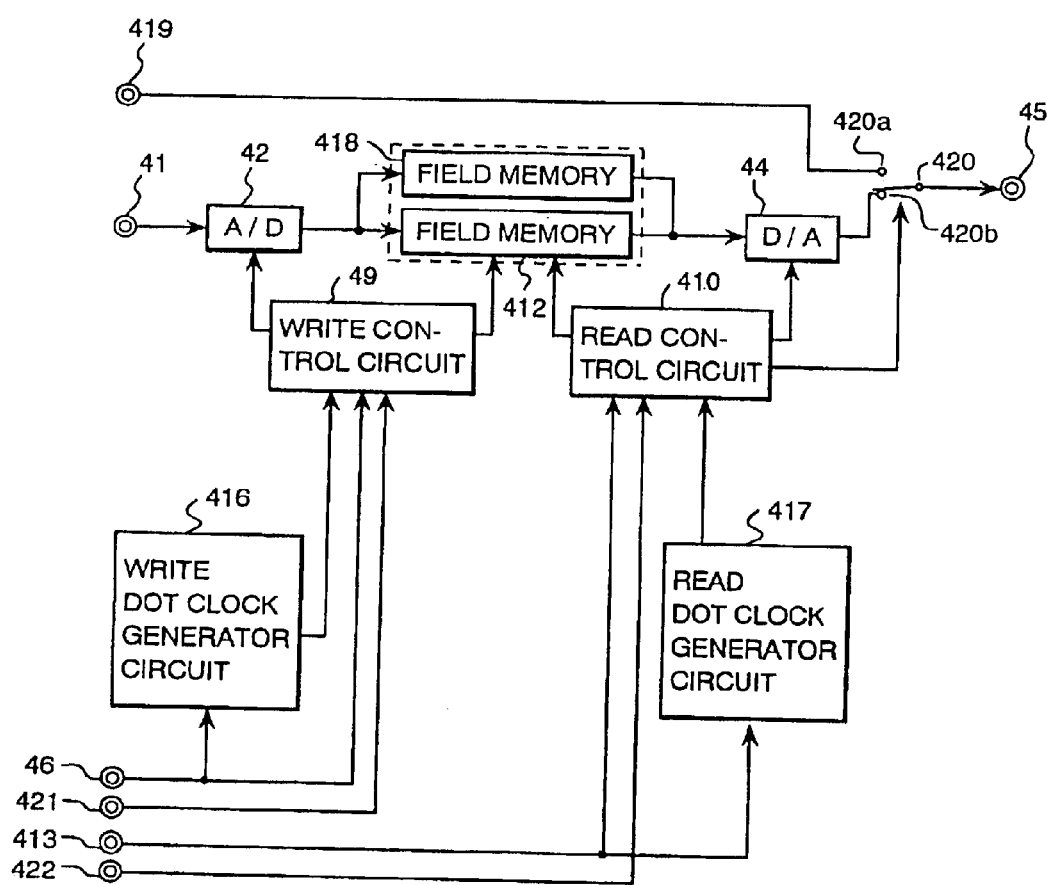
FIG. 10 is a block diagram of the frequency resolution conversion circuit in the fourth embodiment of the display device of the present invention shown in FIG. 9.

FIG. 10 is a block diagram showing the constitution of the frequency resolution conversion circuit 4 in this embodiment. Numeral 419 indicates an input terminal for a video signal from the EWS signal source 8 and 420 indicates a video signal switching circuit. The video signal switching circuit 420 inputs a video signal from the EWS signal source 8 to an input terminal 420a, inputs an output video signal from the digital to analog converter 44 which is subjected to the frequency resolution conversion process to an input terminal 420b, switches the video signal from the EWS signal source 8 and the output video signal from the digital to analog converter 44 on the basis of a switching control signal inputted from the read control circuit 410, and selectively outputs one of them to the video signal output terminal 45. Numeral 421 indicates an input terminal for a horizontal synchronizing signal from the EWS signal source 8 and 422 indicates an input terminal for a vertical synchronizing signal from the EWS signal source 8.

The write control circuit 49 converts a video signal of the NTSC system which is inputted to the video input terminal 41 to a digital video signal by the analog to digital converter 42 and writes it into the field memories 412 and 418 alternately for each field. The read control circuit 410 generates a control signal of the video signal switching circuit 420, that is, a control signal for indicating the display position of a video signal of the NTSC system, supplies it to the video signal switching circuit 420, and furthermore controls the field memories 412 and 418 so as to read from the field memories 412 and 418 while a video signal of the NTSC system is selected by the video signal switching circuit 420. The read control circuit 410 switches a part of the period for displaying a video signal from the EWS signal source 8 to a video signal of the NTSC system which is subjected to the frequency resolution conversion process by the video signal switching circuit 420 and supplies the video signal of the NTSC system to the video signal output terminal 45.

Figure 11A:
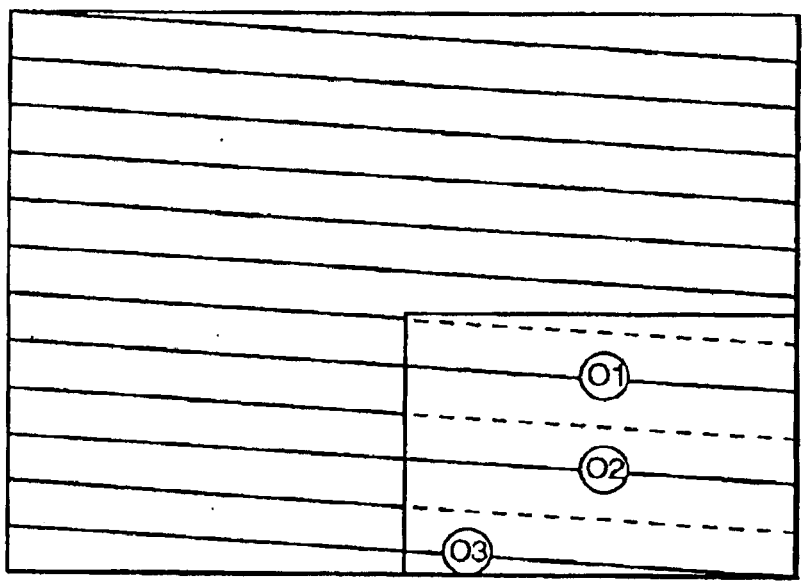
FIG. 11 shows schematic diagrams showing the scan line positions of a display image in the fourth embodiment of the display device of the present invention.
Figure 11B:
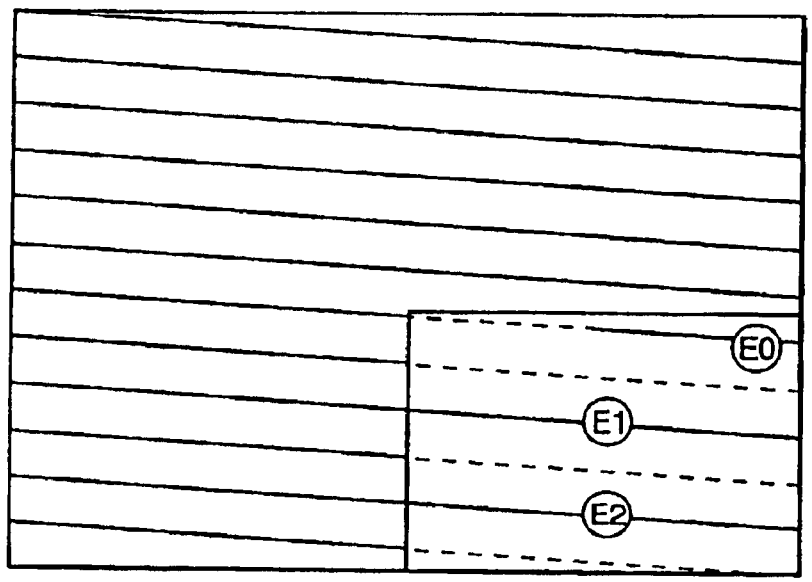

FIG. 11 shows schematic diagrams displayed on the CRT display 7 in this embodiment. A symbol (a) indicates the scan line positions in an odd frame and (b) indicates the scan line positions in an even frame. According to this embodiment, as shown in FIG. 11, an image of a video signal of the NTSC system can be displayed in a window form on the screen for displaying a video signal from the EWS signal source 8. It is obvious that the resolution of a displayed image of a video signal of the NTSC system in the window is not degraded in the same way as with the first to third embodiments.

In this embodiment, an example of a device for composing and displaying an image of a video signal from the NTSC signal source 1 in the screen of a video signal from the EWS signal source 8 is described. However, there is no limit to it. Needless to say, if a second video signal is a signal whose resolution is higher than that of a first video signal and the first video signal is an interlace scanning signal, any signal is acceptable.

Next, the fifth embodiment of the present invention will be explained by referring to the accompanying drawing. The display device described in the fifth embodiment is a device using a display of a matrix type such as liquid crystal, EL (Electro-Luminescence) display and DMD (Digital Microic Mirror Device). An example of a device using a liquid crystal type display will be explained hereunder by referring to FIG. 12.

Figure 12:
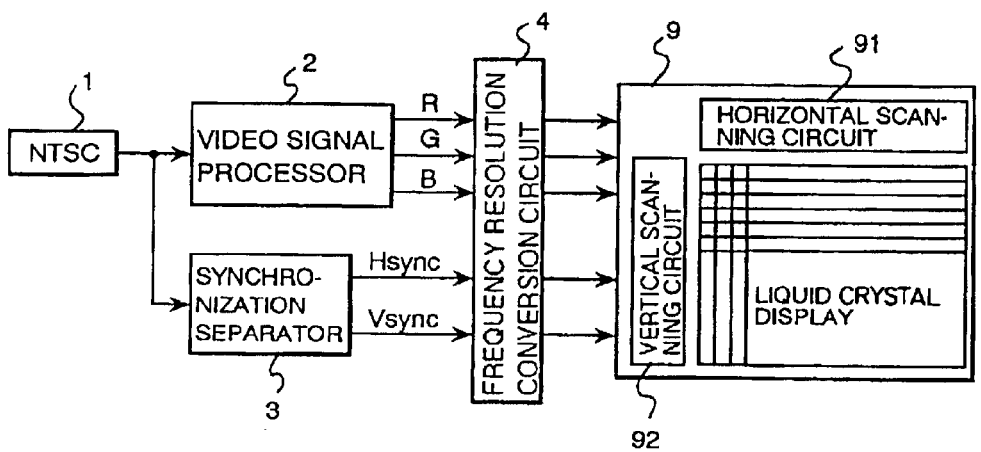
FIG. 12 is a block diagram showing the fifth embodiment of the display device of the present invention.

In FIG. 12, numeral 9 indicates a liquid crystal display having a resolution of 640 dots in the horizontal direction and 480 lines in the vertical direction and a horizontal scanning circuit 91 and a vertical scanning circuit 92 are built in it. As shown in FIG. 2, the liquid crystal display device 9 has the frequency resolution conversion circuit 4 of a system for doubling the number of lines using the line memory. A video signal of the NTSC system has 242.5 effective scanning lines per field, so that the frequency resolution conversion circuit 4 converts and outputs the number of effective scanning lines to 485 by doubling the number of lines. The liquid crystal display 9 has a resolution of 480 lines in the vertical direction, so that a video signal inputted from the frequency resolution conversion circuit 4 can be displayed almost overall the screen.

As to the display device in this embodiment, a case that the frequency resolution conversion circuit 4 shown in FIG.

2 is used is explained. However, there is no limit to it. The device may be deformed so as to use the frequency resolution conversion circuit 4 shown in FIG. 6, 8, or 10.

As mentioned above, as to the display device of the present invention, there is no limit to the CRT as a display. A display of a liquid crystal or matrix type may be used. When the display responds to input of a digital video signal, in the first to fifth embodiments mentioned above, needless to say, it is desirable to omit the digital to analog converter 44 and input a digital video signal to the display.

Figure 13:
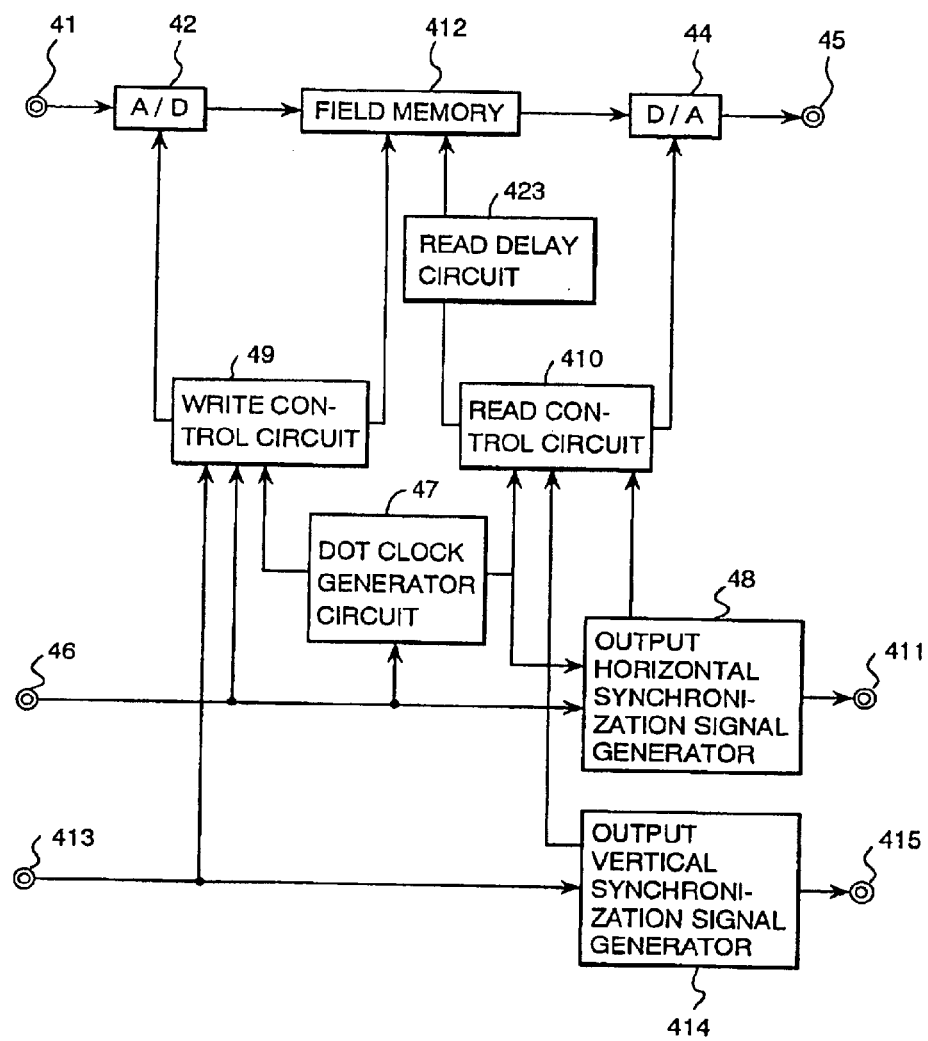
FIG. 13 is a block diagram of the frequency resolution conversion circuit in the sixth embodiment of the display device of the present invention.

Next, the sixth embodiment of the present invention will be explained by referring to the accompanying drawings. FIG. 13 is a block diagram of the frequency resolution conversion circuit 4 of the display device which is the sixth embodiment of the present invention. The same reference numeral is assigned to each of the circuit means which are the same as those in the aforementioned embodiment so as to omit duplicated explanation.

Figure 14:
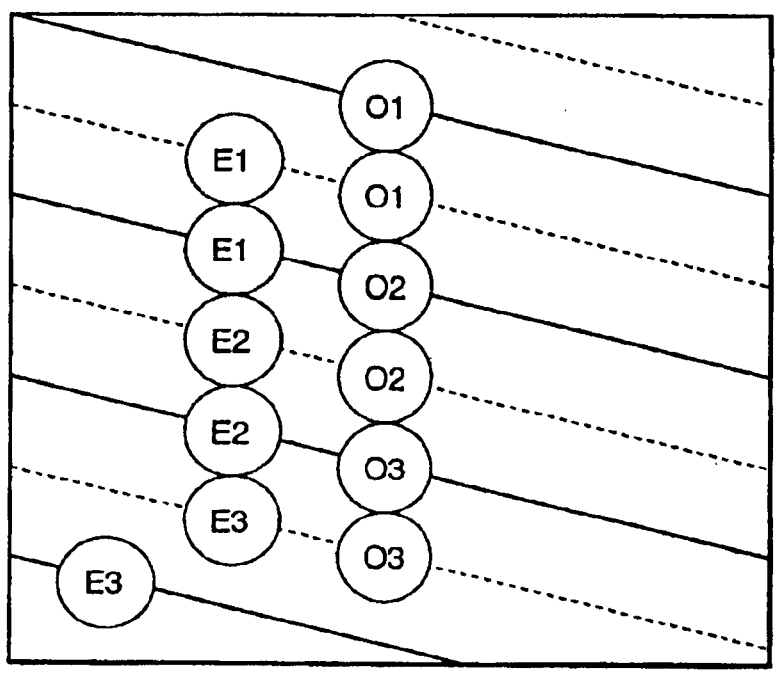
FIG. 14 is a schematic diagram showing the scan line positions of a display image in the sixth embodiment of the display device of the present invention.

In this embodiment, a display device for doubling the horizontal scanning frequency by doubling the number of fields is used and particularly a read delay circuit 423 for delaying a read start signal from the read control circuit 410 so as to delay a video signal in an even field which is read first from the field memory 412 by one horizontal scanning period is installed. FIG. 14 shows the scan line positions in this display device.

Figure 15:
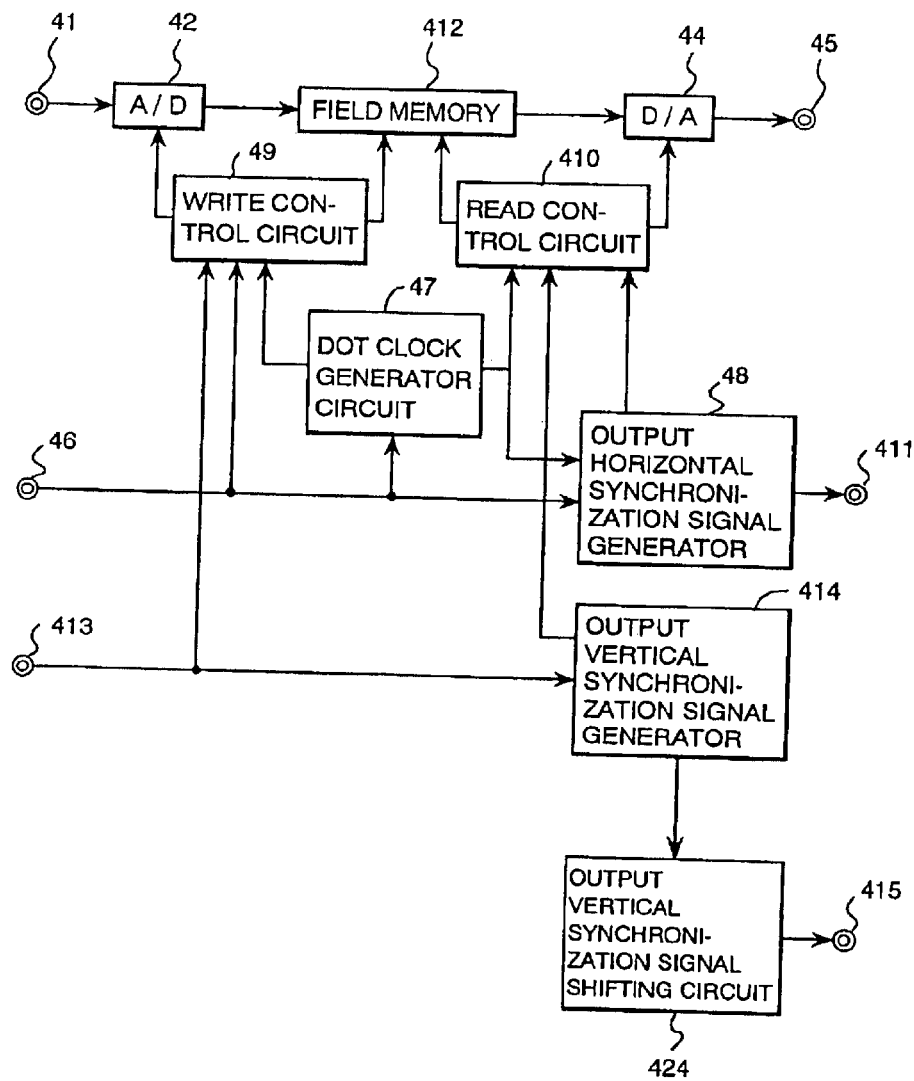
FIG. 15 is a block diagram of the frequency resolution conversion circuit in the seventh embodiment of the display device of the present invention.

Next, the seventh embodiment of the present invention will be explained by referring to the accompanying drawings. FIG. 15 is a block diagram of the frequency resolution conversion circuit 4 of the display device which is the seventh embodiment of the present invention. The same reference numeral is assigned to each of the circuit means which are the same as those in the aforementioned embodiment so as to omit duplicated explanation.

Figure 16:
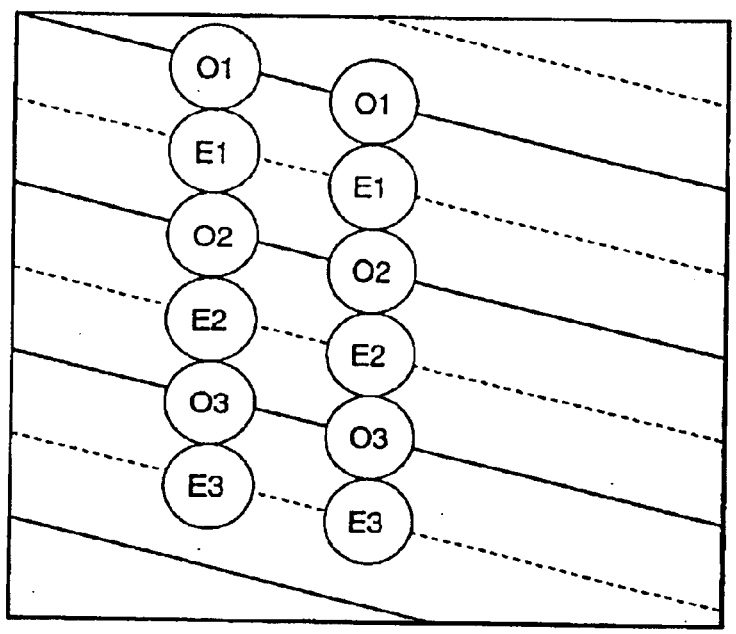
FIG. 16 is a schematic diagram showing the scan line positions of a display image in the seventh embodiment of the display device of the present invention.

In this embodiment, a display device for doubling the horizontal scanning frequency by doubling the number of fields is used and particularly an output vertical synchronizing signal shifting circuit 424 for shifting an output vertical synchronizing signal so that output video signals in the continuous same field are displayed in the same scan positions is installed. FIG. 16 shows the scan line positions in this display device.

Figure 17:
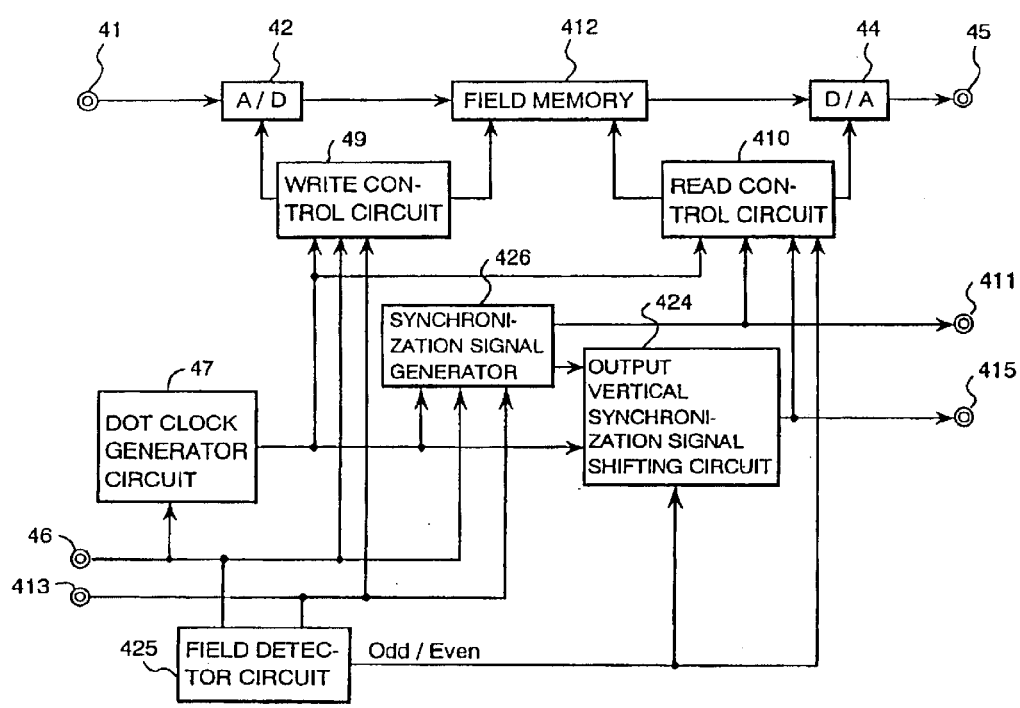
FIG. 17 is a block diagram of the frequency resolution conversion circuit in the eighth embodiment of the display device of the present invention.

Next, the eighth embodiment of the present invention will be explained by referring to the accompanying drawings. FIG. 17 is a block diagram of the frequency resolution conversion circuit 4 of the display device which is the eighth embodiment of the present invention.

In this embodiment, an example of a device in which a field detector circuit 425 for discriminating whether an input video signal is a signal in an odd field or an even field and outputting the discrimination result is installed and an output vertical synchronizing signal shifting circuit 424 shifts the phase of an output vertical synchronizing signal outputted from the output synchronizing signal generator 426 selectively in dot clock units on the basis of the field detection signal outputted from the field detector circuit 425. The same reference numeral is assigned to each of the circuit means which are the same as those in the seventh embodiment shown in FIG. 15 so as to omit duplicated explanation.

Figure 18:
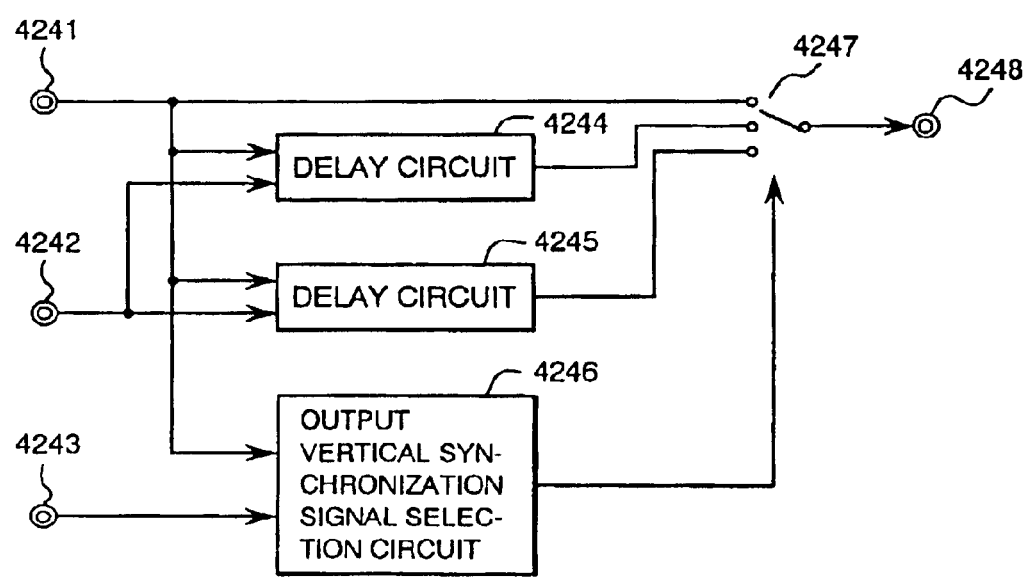
FIG. 18 is a block diagram of the output synchronizing signal shifting circuit of the frequency resolution conversion circuit in the eighth embodiment of the display device of the present invention shown in FIG. 17.

FIG. 18 is a block diagram of the output vertical synchronizing signal shifting circuit 424 of the frequency resolution conversion circuit 4 in this embodiment. In FIG. 18, numeral 4241 indicates an input terminal for an output vertical synchronizing signal outputted from the synchronizing signal generator 426, 4242 an input terminal for a dot clock outputted from the dot clock generator circuit 47, 4243 an input terminal for a field detection signal outputted from the field detector circuit 425, 4244 a first delay circuit, 4245 a second delay circuit, 4246 an output vertical synchronizing signal selection circuit, 4247 a change-over switch, and 4248 a vertical synchronizing signal output terminal of the output vertical synchronizing signal shifting circuit.

Figure 19:
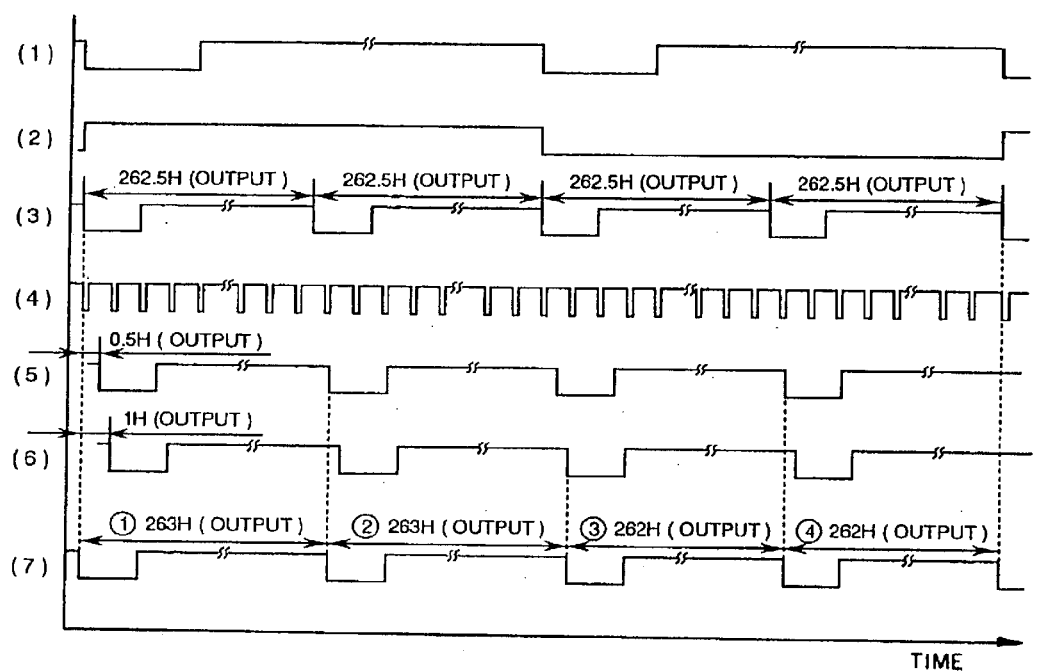
FIG. 19 shows signal waveform diagrams showing the operation timing of the main circuit means in the frequency resolution conversion circuit in the eighth embodiment of the display device of the present invention.

Next, the operation of this embodiment will be explained by referring to FIG. 19. FIG. 19 shows output signal waveforms of the main circuit means in this embodiment. (1) indicates an input vertical synchronizing signal of an inputted video signal, (2) a field detection signal outputted from the field detector circuit 425, (3) an output vertical synchronizing signal outputted from the output synchronizing signal generator 425, (4) an output horizontal synchronizing signal outputted from the output synchronizing signal generator 426, (5) an output signal of the first delay circuit 4244, (6) an output signal of the second delay circuit 4244, and (7) an output vertical synchronizing signal outputted to the output terminal 4248.

The field detector circuit 425 counts the number of horizontal synchronizing signals of an inputted video signal for one vertical scanning period and discriminates whether the inputted video signal is in an odd field or an even field. When it is in an odd field as shown in (2), the field detector circuit 425 outputs an H level field detection signal and when it is in an even field, the field detector circuit 425 outputs an L level field detection signal.

In the output vertical synchronizing signal shifting circuit 424, the first delay circuit 4244 and the second delay circuit 4245 performs the delay process for an output vertical synchronizing signal inputted to the input terminal 4241 in dot clock units and outputs it. In this embodiment, the delay amount of the first delay circuit 4244 is set to 0.5 of the output horizontal scanning period as shown in (5) and the delay amount of the second delay circuit 4245 is set to one output horizontal scanning period as shown in (6). The reason for selecting such set values will be described later.

The output vertical synchronizing signal selection circuit 4246 counts an output vertical synchronizing signal inputted to the input terminal 4241. In this case, when the count value is cleared at the leading edge of a field selection signal inputted from the input terminal 4243, the selection circuit recognizes the field immediately after the leading edge of the field detection signal as a first field of output and the subsequent fields as second, third, and fourth fields. The selection circuit controls the change-over switch 4247 so that as shown in (7), the output vertical synchronizing signal shown in (3) which is not subjected to the delay process is selected in the first field of output, and the output vertical synchronizing signal shown in (5) which is subjected to the delay process of 0.5 of the output horizontal scanning period by the first delay circuit 4244 is selected in the second field of output, and the output vertical synchronizing signal shown in (6) which is subjected to the delay process of one output horizontal scanning period by the second delay circuit 4245 is selected in the third field of output, and the output vertical synchronizing signal shown in (5) which is subjected to the delay process of 0.5 of the output horizontal scanning period again by the first delay circuit 4244 is selected in the fourth field of output.

When the output vertical synchronizing signal selection circuit 4246 controls the change-over switch 4247 like this, an output vertical synchronizing signal outputted from the output terminal 4248 is delivered as 263 output horizontal scanning periods in the first field of output, as 263 output horizontal scanning periods in the second field, as 262 output horizontal scanning periods in the third field, and as 262 output horizontal scanning periods in the fourth field, and this cycle is repeated in the subsequent fields.

The first delay circuit 4244, the second delay circuit 4245, and the output vertical synchronizing signal selection circuit 4246 can be structured simply, for example, by a counter and shift register or latch. Therefore, a detailed explanation will be omitted.

Next, the scanning line structure in the CRT display 7 using the frequency resolution conversion circuit 4 mentioned above will be explained by referring to FIG. 20. For brief explanation, the center of the vertical deflection of the deflection circuit 6 is located at the center of the screen.

Figures 20A, 20B, 20C, 20D:
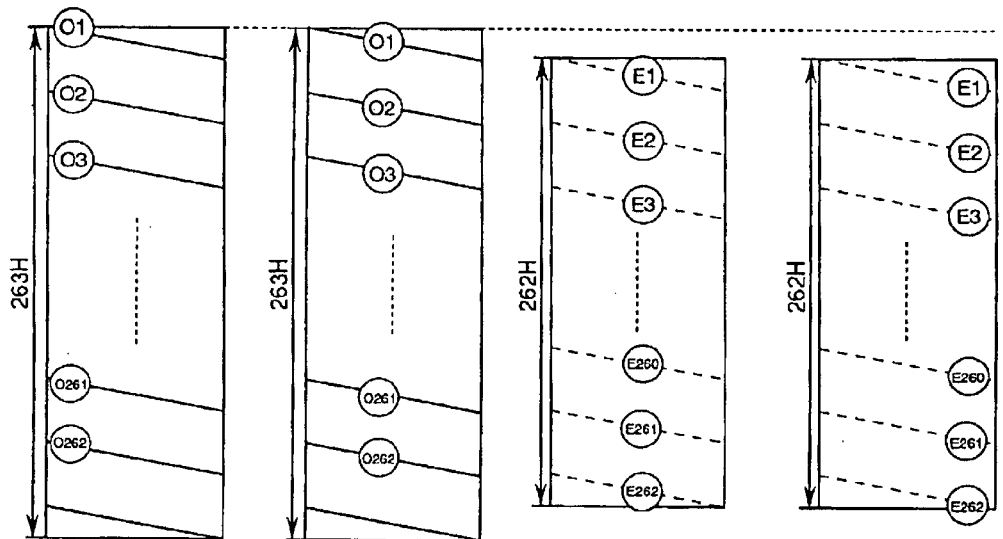
FIG. 20 shows principle diagrams showing the scanning line structure of the CRT display in the eighth embodiment of the display device of the present invention.
Figure 20E:
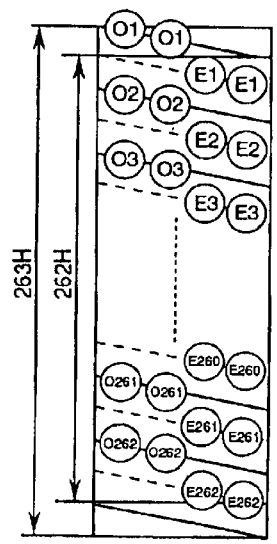

In FIG. 20, (a) to (d) indicate principle diagrams showing the scan line positions and the vertical size of the screen on the CRT display 7 in the first field of output to the fourth field mentioned above and (e) indicates a principle diagram showing the position relation of scanning lines on the screen where the aforementioned four fields are composed.

The vertical size of the first and second fields of output is the 263-horizontal scanning period as shown in (a) and (b) and the vertical size of the third and fourth fields of output is the 262-horizontal scanning period as shown in (c) and (d). Therefore, the vertical size of the screens of the third and fourth fields is smaller than that of the screens of the first and second fields of output by one horizontal scanning period. Since the center of vertical deflection of the CRT display 7 is at the center of the screen, when the screens of fields of different vertical sizes are displayed as mentioned above, the center of the screen of each field coincides with each other. Therefore, compared with the screens of the first and second fields, on the screens of the third and fourth fields, a space of 0.5 of the horizontal scanning period generates at the upper and lower parts respectively. Namely, the scanning lines of the third and fourth fields are shifted from the scanning lines of the first and second fields by 0.5 of the horizontal scanning period.

On the other hand, a video signal in an odd field and a video signal in an even field are read from the field memory 412 respectively two times, so that the video signal in the odd field which is read first is displayed in the positions in (a) and the video signal in the odd field which is read again is displayed in the same positions as those of the video signal in the odd field which is read first as shown in (b). The video signal in the even field which is read first is also displayed in the positions in (c) and the video signal in the even field which is read again is displayed in the same positions as those of the video signal in the odd field which is read first as shown in (d). Since these four fields are composed on the CRT display 7, as shown in (e), the position relation of scanning lines of an input video signal can be reproduced and the vertical resolution will not be degraded.

As to the aforementioned frequency resolution conversion circuit 4, in a display device having a frequency resolution conversion circuit of a system for doubling the horizontal scanning frequency by doubling the field frequency, there is no need to change the vertical deflection circuit, so that the cost and wide usability are very advantageous.

In this embodiment, an example of a device in which the center of vertical deflection of the deflection circuit 6 is at the center of the screen is explained. However, there is no limit to it. Since the output vertical synchronizing signal shifting circuit 424 of the frequency resolution conversion circuit 4 of the display device of the present invention can change the phase of an output vertical synchronizing signal in dot clock units, even if the center of vertical deflection of the deflection circuit 6 is not at the center of the screen, the display device can respond to it.

Next, the ninth embodiment of the present invention will be explained by referring to the accompanying drawings. In this embodiment, an example of a device using the deflection circuit 6 for deflecting the CRT display 7 so that the upper ends of the screens coincide with each other when fields having different numbers of lines are displayed is described. The same reference numeral is assigned to each of the circuit means which are the same as those in the eighth embodiment so as to omit duplicated explanation.

Figure 21:
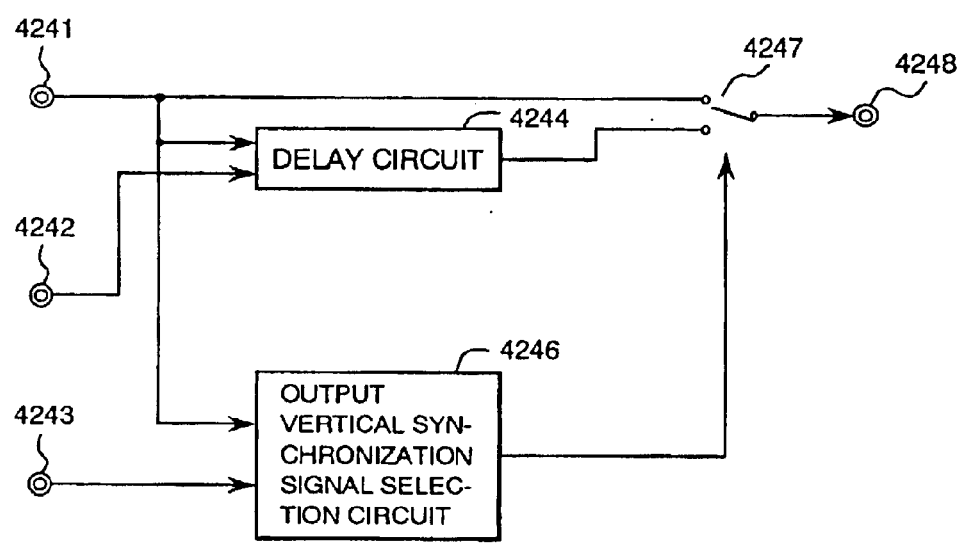
FIG. 21 is a block diagram of the output synchronizing signal shifting circuit in the frequency resolution conversion circuit in the ninth embodiment of the display device of the present invention.

FIG. 21 is a block diagram of the output vertical synchronizing signal shifting circuit 424 of the frequency resolution conversion circuit 4 in this embodiment. The respect that only one system of the delay circuit 4244 is used for the output vertical synchronizing signal shifting circuit 424 in the eighth embodiment (the delay circuit 4245 is omitted) is different.

Figure 22:
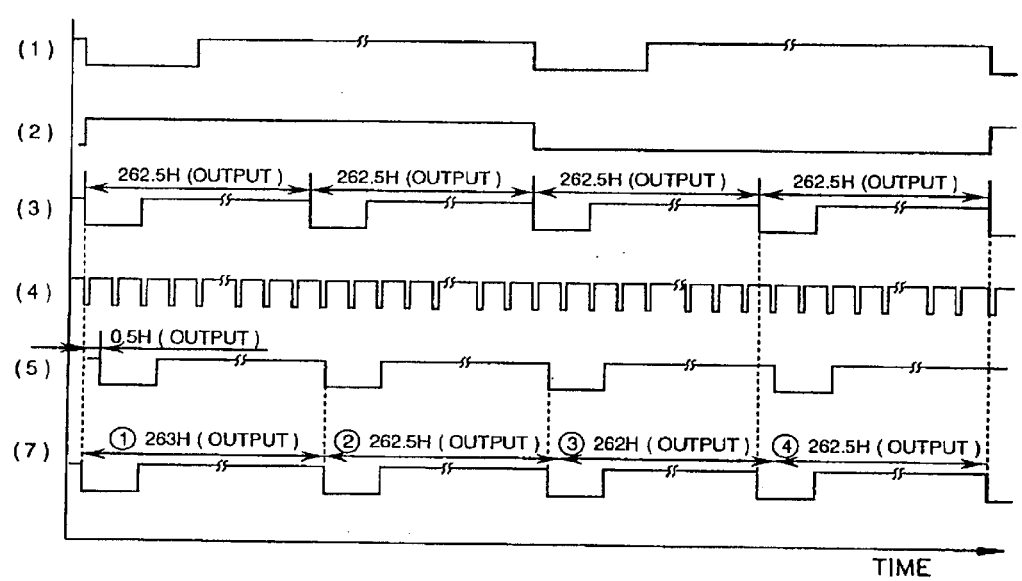
FIG. 22 shows signal waveform diagrams showing the operation timing of the main circuit means in the frequency resolution conversion circuit in the ninth embodiment of the display device of the present invention.

Next, the operation of this embodiment will be explained by referring to FIG. 22. FIG. 22 shows output signal waveforms of the main circuit means in this embodiment.

In the output vertical synchronizing signal shifting circuit 424, the first delay circuit 4244 performs the delay process for an output vertical synchronizing signal inputted to the input terminal 4241 in dot clock units and outputs it. In this embodiment, the delay amount of the first delay circuit 4244 is set to 0.5 of the output horizontal scanning period as shown in (5) in FIG. 19.

The output vertical synchronizing signal selection circuit 4246 controls the change-over switch 4247 so that, as shown in (7) in FIG. 22, the output vertical synchronizing signal shown in (3) which is not subjected to the delay process is selected in the first field of output, and the output vertical synchronizing signal shown in (5) which is subjected to the delay process of 0.5 of the output horizontal scanning period by the first delay circuit 4244 is selected in the second and third fields of output, and the output vertical synchronizing signal shown in (3) which is not subjected to the delay process is selected again in the fourth field of output.

When the output vertical synchronizing signal selection circuit 4246 controls the change-over switch 4247 like this, an output vertical synchronizing signal outputted from the output terminal 4248 is delivered as 262.5 output horizontal scanning periods in the first field of output, as 263 output horizontal scanning periods in the second field, as 262 output horizontal scanning periods in the third field, and as 262.5 output horizontal scanning periods in the fourth field, and this cycle is repeated in the subsequent fields.

Next, the scanning line structure in the CRT display 7 using the frequency resolution conversion circuit 4 mentioned above will be explained by referring to FIG. 23.

In FIG. 23, (a) to (d) indicate principle diagrams showing the scan line positions and the vertical size of the screen on the CRT display 7 in the first field of output to the fourth field mentioned above and (e) indicates a principle diagram showing the position relation of scanning lines on the screen where the aforementioned four fields are composed.

As described above, since the deflection circuit 6 for deflecting the CRT display 7 so that the upper ends of the screens coincide with each other when fields having different numbers of lines are displayed is used, the upper end of the screen of each field coincides with each other. Since the screens of these fields are composed on the CRT display 7, as shown in (e), the position relation of scanning lines of an input video signal can be reproduced and the vertical resolution will not be degraded.

According to this embodiment, the scanning speed of an interlace scanning signal having a low horizontal scanning frequency such as an NTSC signal can be doubled without degrading the vertical resolution and a high definition image in which flickering in a large area is suppressed can be displayed on a display having a conventional display driving circuit.

As mentioned above, the display device of the present invention does not require the conventional signal interpolation process for converting the scanning speed of an interlace scanning signal, so that the scanning speed of a video signal can be converted by a simple constitution without increasing the memory capacity particularly. Furthermore, by shifting the phase of an output vertical synchronizing so as to correct the scanning positions, the scanning lines in an odd field of a video signal on the screen of the CRT and the scanning lines in an even field can be displayed always in the correct positions without being mixed.

Next, the embodiments mainly corresponding to the second object mentioned above will be described in detail.

Figure 24:
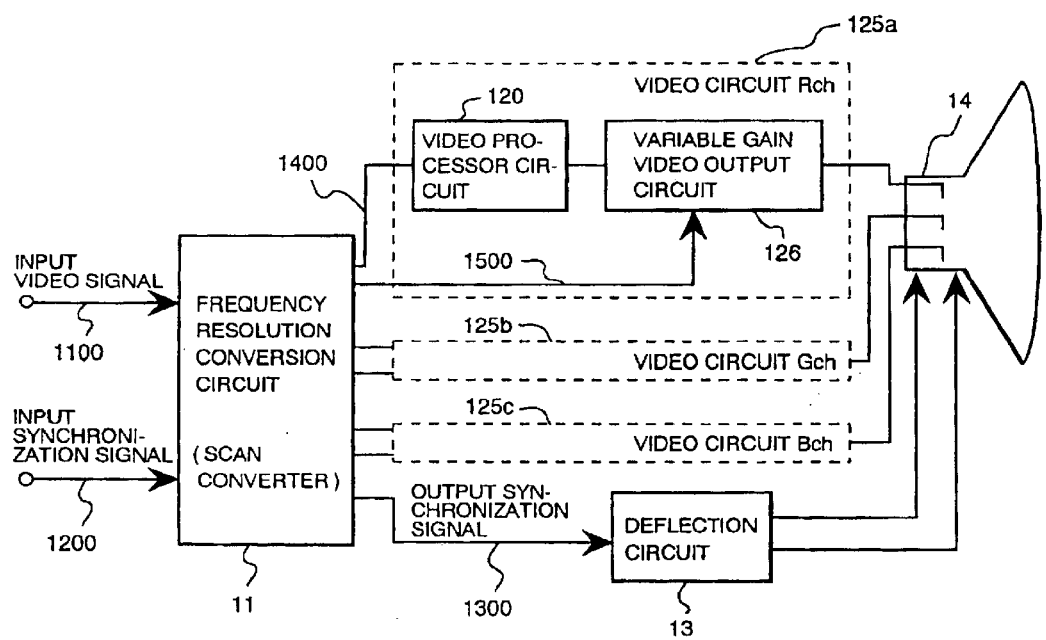
FIG. 24 is a block diagram showing the rough constitution of the display device in the ninth embodiment of the present invention.

FIG. 24 is a block diagram showing the rough constitution of the display device in the ninth embodiment of the present invention. In FIG. 24, numeral 11 indicates a scan converter, 13 a deflection circuit, 14 a cathode ray tube (CRT), 120 a video processor circuit, 125a, 125b, and 125c a video circuit (Rch), a video circuit (Gch), and a video circuit (Bch) respectively, 126 a variable gain video output circuit, 1100 an input video signal, 1200 an input synchronizing signal, 1300 an output synchronizing signal, 1400 an output video signal, and 1500 a gain control signal.

As shown in FIG. 24, the input video signal 1100 and the input synchronizing signal 1200 under various standards such as a computer signal or television signal are inputted to the scan converter 11 and converted and outputted to the output video signal 1400 and the output synchronizing signal 1300 at the desired horizontal and vertical scanning frequencies.

The output video signal 1400 is inputted to the video circuit (Rch) 125a and in the video circuit (Rch) 125a, various processes such as brightness control and contrast control are performed by the video processor circuit 120. The processed output signal of the video processor circuit. 120 is inputted to the variable gain video output circuit 126 and amplified to a signal voltage for driving the cathode ray tube (CRT) 14 at the gain which is set by the,gain control signal 1500 outputted from the scan converter 11 in the variable gain video output circuit 126.

As an actual operation, for example, assuming that the gain of the variable gain video output circuit 126 when a signal in which it is desirable that the brightness is higher such a television or high definition video signal is inputted to the scan converter 11 is G1 and the gain of the variable gain video output circuit 126 when a signal in which it is desirable that the brightness is lower such a computer signal is inputted to the scan converter 11 is G2, the gain control signal 1500 is outputted from the scan converter 11 so that G1 becomes greater than G2.

The output synchronizing signal 1300 from the scan converter 11 is inputted to the deflection circuit 13.

The constitution and operation of each of the video circuit (Gch) 125b and the video circuit (Bch) 125c are exactly the same as those of the video circuit (Rch) 125a mentioned above.

When the display device is structured as mentioned above, a video signal under various standards, for example, a computer signal, television signal, or high definition signal is inputted, each signal can be displayed at an optimum brightness.

Figure 25:
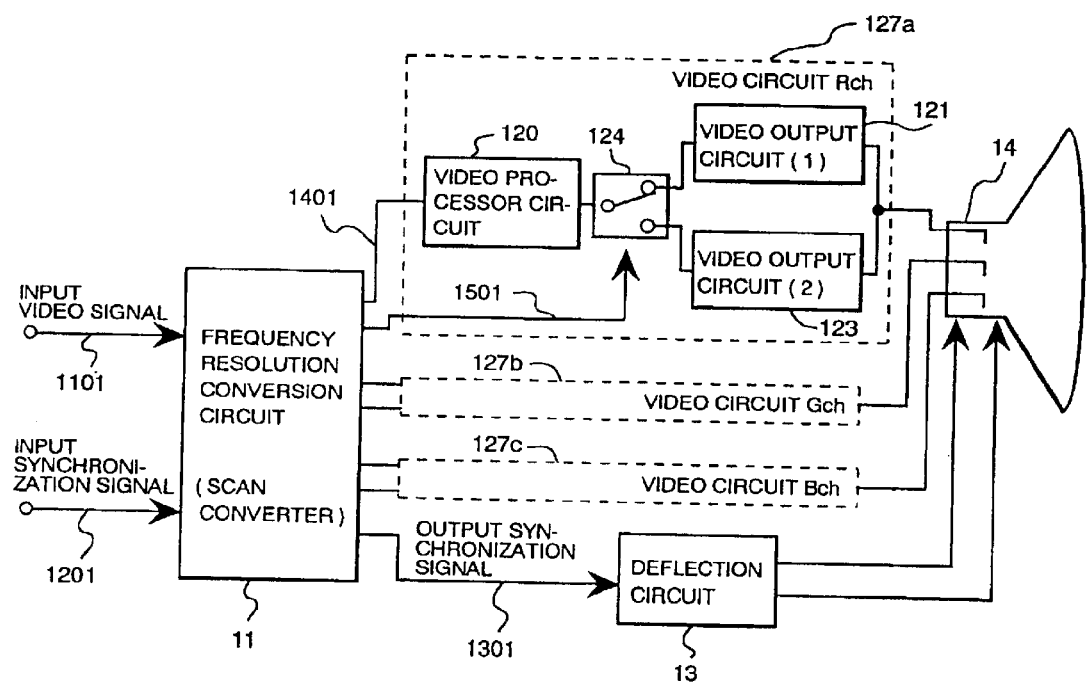
FIG. 25 is a block diagram showing the rough constitution of the display device in the ninth embodiment of the present invention which has a video circuit which is different from that shown in FIG. 24.

FIG. 25 is a drawing showing another actual example of the video circuit in the display device in the ninth embodiment. In FIG. 25, numeral 11 indicates a scan converter, 13 a deflection circuit, 14 a cathode ray tube (CRT), 120 a video processor circuit, 127a, 127b, and 127c a video circuit (Rch), a video circuit (Gch), and a video circuit (Bch) respectively, 121 a video output circuit (1), 123 a video output circuit (2), 124 a switch having a terminal 1 of input and a terminal 2 of output, 1101 an input video signal, 1201 an input synchronizing signal, 1301 an output synchronizing signal, 1401 an output video signal, and 1501 a gain control signal.

As shown in FIG. 25, the input video signal 1101 and the input synchronizing signal 1201 under various standards such as a computer signal or television signal are inputted to the scan converter 11 and converted and outputted to the output video signal 1401 and the output synchronizing signal 1301 at the desired horizontal and vertical scanning frequencies.

The output video signal 1401 is inputted to the video circuit (Rch) 127a and in the video circuit (Rch) 127a, various processes such as brightness control and contrast control are performed by the video processor circuit 120. The output terminal of the video processor circuit 120 is connected to the input terminal of the switch 124, and one output terminal of the switch 124 is connected to the video output circuit (1) 121, and the other output terminal of the switch 124 is connected to the video output circuit (2) 123. The aforementioned processed video signal in the video processor circuit 120 is amplified to a signal voltage for driving the cathode ray tube (CRT) 14 in the video output circuit (1) 121 or the video output circuit (2) 123. The switch 124 is switched by the gain control signal 1501 outputted from the scan converter 11.

The gain control signal 1501 is outputted from the scan converter 11 so that for example, when a signal in which it is desirable that the brightness is higher such a television or high definition video signal is inputted to the scan converter 11, the switch is switched to the video output circuit (1) 121 whose gain is G1 and when a signal in which it is desirable that the brightness is lower such a computer signal is inputted to the scan converter 11, the switch is switched to the video output circuit (2) 123 whose gain is G2. Also in this case, the relation of gain G1>gain G2 is held.

The output synchronizing signal 1301 from the scan converter 11 is inputted to the deflection circuit 13.

The constitution and operation of each of the video circuit (Gch) 127b and the video circuit (Bch) 127c are exactly the same as those of the video circuit (Rch) 127a mentioned above.

In this embodiment, the switch 124 for switching the gain is installed between the video processor circuit 120 and the video output circuits (1) 121 and (2) 123. However, needless to say, even if the switch is connected between the video output circuits (1) 121 and (2) 123 and the cathode ray tube (CRT) 14, the effect can be obtained.

When the display device is structured as mentioned above, a video signal under various standards, for example, a computer signal, television signal, or high definition signal is inputted, each signal can be displayed at an optimum brightness.

Figure 26:
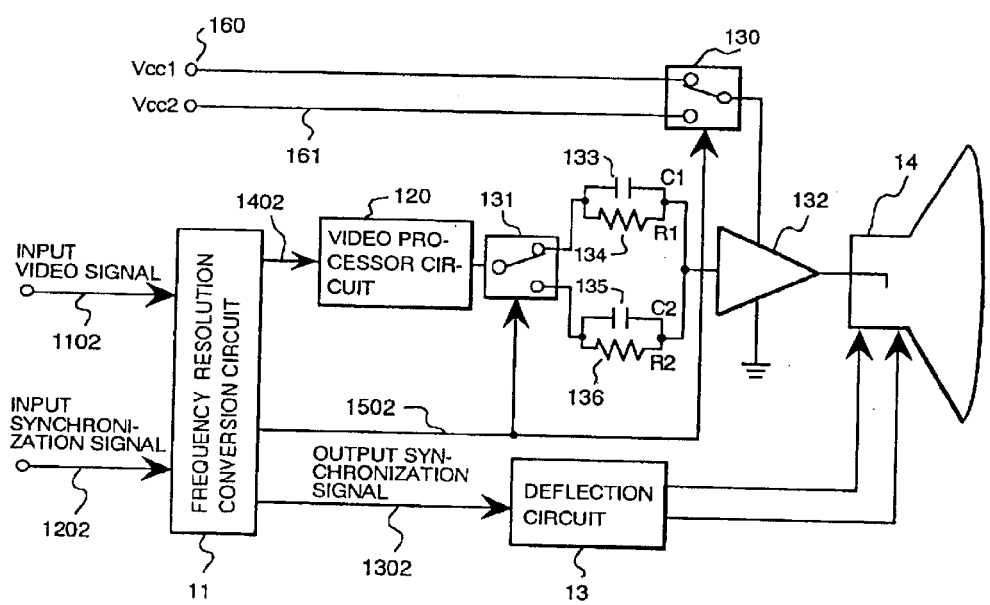
FIG. 26 is a block diagram showing the rough constitution of the display device in the ninth embodiment of the present invention which has a video circuit which is different from those shown in FIGS. 24 and 25.

FIG. 26 is a drawing showing still another actual example of the video circuit in the display device in the ninth embodiment. In FIG. 26, numeral 11 indicates a scan converter, 13 a deflection circuit, 14 a cathode ray tube (CRT), 120 a video processor circuit, 132 a video output amplifier, 130 a switch having a terminal 2 of input and a terminal 1 of output, 131 a switch having a terminal 1 of input and a terminal 2 of output, 133 and 135 condensers C (1) and C (2), 134 and 136 resistors R (1) and R (2), 1102 an input video signal, 1202 an input synchronizing signal, 1302 an output synchronizing signal, 1402 an output video signal, and 1502 a gain control signal.

As shown in FIG. 26, the input video signal 1102 and the input synchronizing signal 1202 under various standards such as a computer signal or television signal are inputted to the scan converter 11 and converted and outputted to the output video signal 1402 and the output synchronizing signal 1302 at the desired horizontal and vertical scanning frequencies.

The output video signal 1402 is subjected to various processes such as brightness control and contrast control first by the video processor circuit 120. The output terminal of the video processor circuit 120 is connected to the input terminal of the switch 131, and one output terminal of the switch 131 is connected to one terminal of each of the condenser C (1) 133 and the resistor R (1) 134, and the other terminal of each of the condenser C (1) 133 and the resistor R (1) 134 is connected to the input terminal of the video output amplifier 132. On the other hand, the other output terminal of the switch 131 is connected to one terminal of each of the condenser C (2) 135 and the resistor R (2) 136 and the other terminal of each of the condenser C (2) 135 and the resistor R (2) 136 is connected to the input terminal of the video output amplifier 132.

The condenser C (1) 133 and the condenser C (2) 135 are peaking condensers for improving the high frequency characteristic of the video output amplifier 132. The video output amplifier 132 is a current feedback amplifier and has a built-in feedback resistor of a fixed value. The gain thereof is decided by the resistor R (1) 134 or R (2) 136 which is an input resistor and when the input resistance is decreased, the gain will be increased. The supply voltage of the video output amplifier 132 is switched to a supply voltage Vcc (1) 160 or a supply voltage Vcc (2) 161 by the switch 130.

A signal processed in the video processor circuit 120 is amplified to a signal voltage for driving the cathode ray tube (CRT) 14 in the video output amplifier 132. The switches 130 and 131 are switched by the gain control signal 1502 outputted from the scan converter 11.

As an actual operation, the gain control signal 1502 for which the switches 131 and 130 are switched respectively so that a video signal is inputted to the video output amplifier 132 via the resistor R (1) 134 and the condenser C (1) 133 and the supply voltage of the video output amplifier 132 becomes the Vcc (1) 160, for example, when a signal in which it is desirable that the brightness is higher such a television or high definition video signal is inputted to the scan converter 11 is outputted from the scan converter 11. On the other hand, the gain control signal 1502 for which the switches 131 and 130 are switched respectively so that a video signal is inputted to the video output amplifier 132 via the resistor R (1) 136 and the condenser C (1) 135 and the supply voltage of the video output amplifier 132 becomes the Vcc (2) 161 when a signal in which it is desirable that the brightness is lower such a computer signal is inputted to the scan converter 11 is outputted from the scan converter 11. In this case, R (1)<R (2) and Vcc (1)≧Vcc (2) are held.

The output synchronizing signal 1302 from the scan converter 11 is inputted to the deflection circuit 13.

When the display device is structured as mentioned above, a video signal under various standards, for example, a computer signal, television signal, or high definition signal is inputted, each signal can be displayed at an optimum brightness.

In this embodiment, the switch 131 for switching the gain is installed between the video processor amplifier 120 and the input resistor. However, needless to say, even if the switch is connected between the input resistor and the video output amplifier 132, the effect can be obtained. Furthermore, in this embodiment, a constitution of only one channel of video circuit is described. However, in the case of a color display device, it is desirable to provide three channels of R, G, and B of video circuits having the aforementioned constitution.

Figure 27:
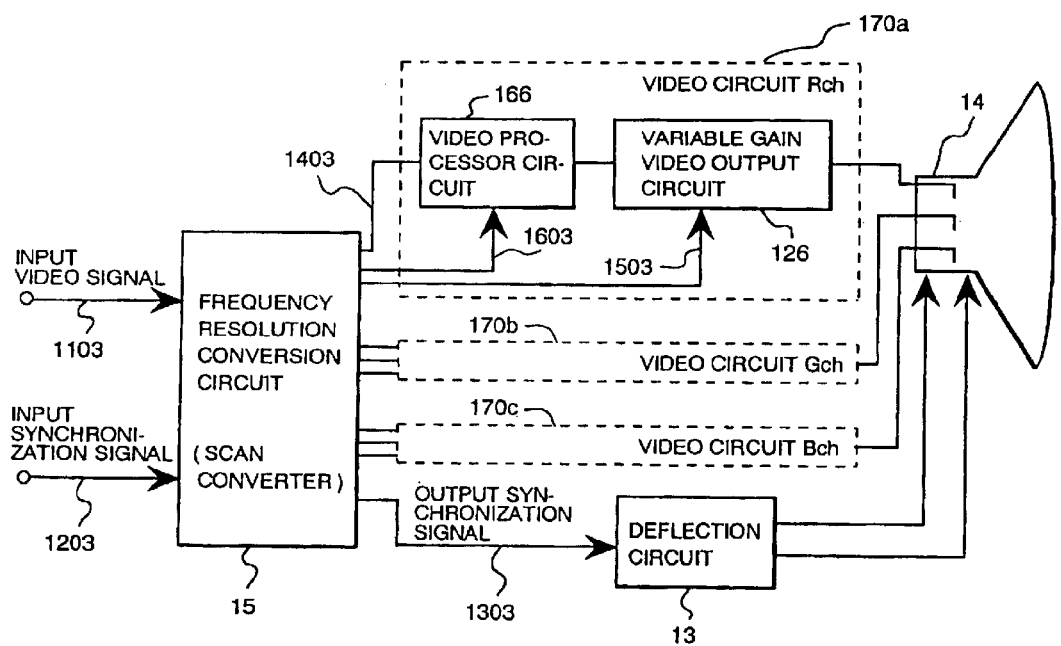
FIG. 27 is a block diagram showing the rough constitution of the display device in the tenth embodiment of the present invention.

FIG. 27 is a block diagram showing the rough constitution of the display device in the tenth embodiment of the present invention. In this embodiment, the display device has a constitution in which the color temperature of an image can be changed when a video signal under various standards is inputted in addition to the characteristics of the display device in the ninth embodiment shown in FIG. 24.

In FIG. 27, numeral 15 indicates a scan converter, 13 a deflection circuit, 14 a cathode ray tube (CRT), 166 a video processor circuit, 170a, 170b, and 170c a video circuit (Rch), a video circuit (Gch), and a video circuit (Bch) respectively, 126 a variable gain video output circuit, 1103 an input video signal, 1203 an input synchronizing signal, 1303 an output synchronizing signal, 1403 an output video signal, 1503 a gain control signal, and 1603 a color temperature control signal.

The color temperature of a television (NTSC) signal is generally 6500 K (Kelvin) on the transmission side but it is changed to a suitable value (about 9300 K, etc.) on the receiver side. A high definition signal is standardized as 6500 K. A computer signal is not standardized but set to about 9300 K. The optimum color temperature varies with a video signal like this. When one display device displays video signals under various standards, it is desirable to display each video signal at a color temperature suited to the signal.

As shown in FIG. 27, the input video signal 1103 and the input synchronizing signal 1203 under various standards such as a computer signal or television signal are inputted to the scan converter 11 and converted and outputted to the output video signal 1403 and the output synchronizing signal 1503 at the desired horizontal and vertical scanning frequencies.

The output video signal 1403 is inputted to the video circuit (Rch) 170a and in the video circuit (Rch) 170a, various processes such as brightness control, contrast control, and color temperature setting by the color temperature control signal 1603 outputted from the scan converter 15 are performed by the video processor circuit 166. The processed output signal of the video processor circuit 166 is inputted to the variable gain video output circuit 126 and amplified to a signal voltage for driving the cathode ray tube (CRT) 14 at the gain which is set by the gain control signal 1503 outputted from the scan converter 15 in the variable gain video output circuit 126.

As an actual operation, for example, when a video signal which is a high definition signal is inputted, the color temperature control signal 1603 outputs a control signal for controlling the color temperature to 6500 K and the gain control signal 1503 outputs a control signal for increasing the brightness. On the other hand, when a computer signal is inputted, the color temperature control signal 1603 outputs a control signal for controlling the color temperature to 9300 K and the gain control signal 1503 outputs a control signal for decreasing the brightness.

The output synchronizing signal 1303 from the scan converter 15 is inputted to the deflection circuit 13.

When the display device is structured as mentioned above, an increase in the number of portions to be adjusted and an increase in cost can be suppressed, and a video signal at a scanning frequency within an extremely wide range can be handled, and when a video signal under various standards, for example, a computer signal, television signal, or high definition signal is inputted, each signal can be displayed at an optimum brightness and color temperature.

Figure 28:
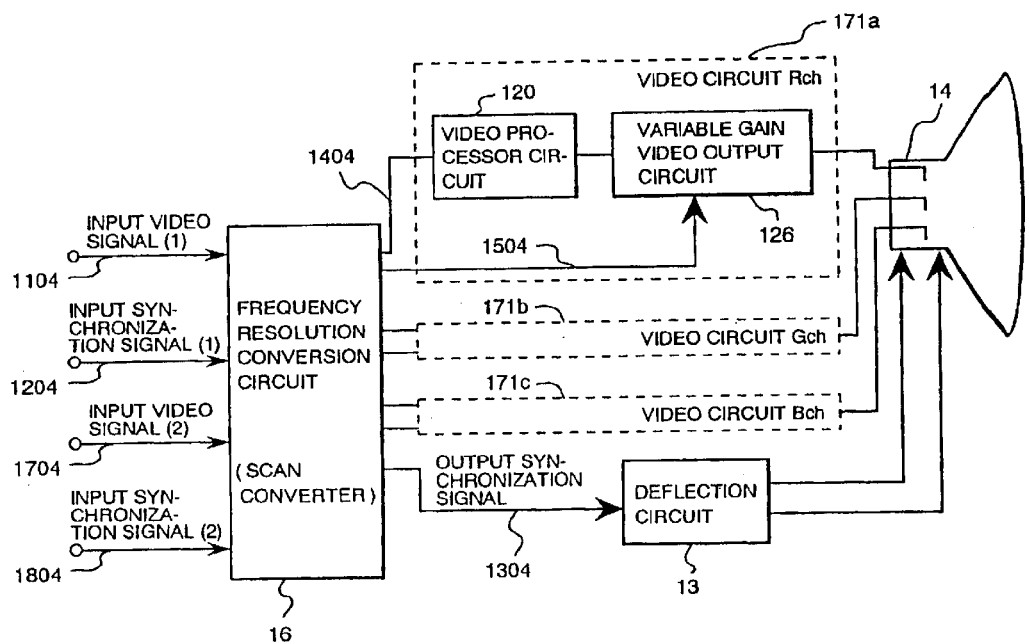
FIG. 28 is a block diagram showing the rough constitution of the display device in the eleventh embodiment of the present invention.

FIG. 28 is a block diagram showing the rough constitution of the display device in the eleventh embodiment of the present invention. In FIG. 28, numeral 16 indicates a scan converter, 13 a deflection circuit, 14 a cathode ray tube (CRT), 120 a video processor circuit, 171a, 171b, and 171c a video circuit (Rch), a video circuit (Gch), and a video circuit (Bch) respectively, 126 a variable gain video output circuit, 1104 an input video signal (1), 1204 an input synchronizing signal (1), 1304 an output synchronizing signal, 1404 an output video signal, 1504 a gain control signal, 1704 an input video signal (2), and 1804 an input synchronizing signal (2).

According to this embodiment, a system for composing and displaying video signals such as television (NTSC) signals, high definition signals, or CG (computer graphics) on a computer screen is structured so that the screen brightness of television (TV) or high definition television (HDTV) images can be made higher than that of computer images.

As shown in FIG. 28, the input video signal (1) 1104 and the input synchronizing signal (1) 1204 under various standards such as a computer signal or television signal and the input video signal (2) 1704 and the input synchronizing signal (2) 1804 such as a television (NTSC) signal, high definition signal, or CG (computer graphics) are inputted to the scan converter 16, subjected to the conversion process to a signal at the desired horizontal and vertical scanning frequencies and the composition process (subscreen display or window display) for the aforementioned plurality of video signal screens, and outputted as the output video signal 1404 and the output synchronizing signal 1304.

The output video signal 1404 is inputted to the video circuit (Rch) 171a and in the video circuit (Rch) 171a, various processes such as brightness control and contrast control are performed by the video processor circuit 120. The output signal of the video processor circuit 120 is inputted to the variable gain video output circuit 126 and amplified to a signal voltage for driving the cathode ray tube (CRT) 14 at the gain which is set by the gain control signal 1504 outputted from the scan converter 16 in the variable gain video output circuit 126.

As an actual operation, the gain control signal 1504 is outputted from the scan converter 16 so that the variable gain video output circuit 126 increases the gain only during the window display period, for example, when a signal in which it is desirable that the brightness is higher such a television (NTSC) or high definition video signal is a signal on a window screen (a screen which is partitioned at a part of the overall screen and displayed).

The output synchronizing signal 1304 from the scan converter 16 is inputted to the deflection circuit 13.

When the display device is structured as mentioned above and video signals such as television (NTSC) signals, high definition signals, or CG are composed and displayed on a computer screen, the brightness of television (TV) or high definition television (HDTV) images can be made higher than that of computer images.

According to this embodiment, in a system for composing and displaying video signals such as television signals, high definition signals, or CG on a computer screen, the screen brightness of television (TV) or high definition television (HDTV) images can be made higher than that of computer images. However, the screen brightness of computer images can be made higher than that of television (TV) or high definition television (HDTV) images. Needless to say, by using this embodiment as a system for generating a window on a screen of television (NTSC) signals, high definition signals, or CG and displaying a computer screen, the screen brightness of television (TV) or high definition television (HDTV) images can be made higher than that of computer images. Furthermore, by using this embodiment as a system for generating a window on a screen of television (NTSC) signals, high definition signals, or CG and displaying a computer screen, the screen brightness of computer images can be made higher than that of television (TV) or high definition television (HDTV) images.

The three channels of R, G, and B can be executed in the same constitution and the same effect can be obtained.

Figure 29:
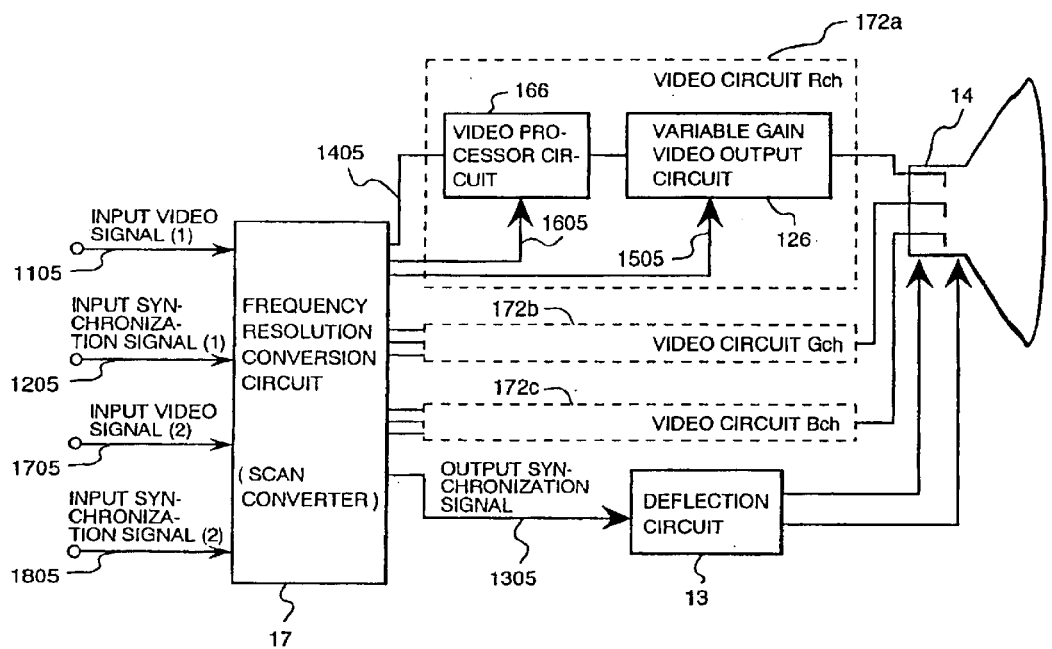
FIG. 29 is a block diagram showing the rough constitution of the display device in the twelfth embodiment of the present invention.

FIG. 29 is a block diagram showing the rough constitution of the display device in the twelfth embodiment of the present invention. In FIG. 29, numeral 1 indicates a scan converter, 13 a deflection circuit, 14 a cathode ray tube (CRT), 166 a video processor circuit, 172a, 172b, and 172c a video circuit (Rch), a video circuit (Gch), and a video circuit (Bch) respectively, 126 a variable gain video output circuit, 1105 an input video signal (1), 1205 an input synchronizing signal (1), 1305 an output synchronizing signal, 1405 an output video signal, 1505 a gain control signal, 1605 a color temperature control signal, 1705 an input video signal (2), and 1805 an input synchronizing signal (2).

According to this embodiment, a system for providing a window and displaying video signals such as television (NTSC) signals, high definition signals, or CG on a computer screen is structured so that the screen brightness of television (TV) or high definition television (HDTV) images can be made higher and displayed at a suitable color temperature respectively.

As shown in FIG. 29, the input video signal (1) 1105 and the input synchronizing signal (1) 1205 under various standards such as a computer signal and the input video signal (2) 1705 and the input synchronizing signal (2) 1805 such as a television (NTSC) signal, high definition signal, or CG are inputted to the scan converter 17, converted to a signal at the desired horizontal and vertical scanning frequencies respectively, subjected to the window screen composition process, and outputted as the output video signal 1405 and the output synchronizing signal 1305.

The output video signal 1405 is inputted to the video circuit (Rch) 172a and in the video circuit (Rch) 172a, various processes such as brightness control, contrast control, and color temperature setting by the color temperature control signal 1605 outputted from the scan converter 17 are performed by the video processor circuit 166. The processed output signal of the video processor circuit 166 is inputted to the variable gain video output circuit 126 and amplified to a signal voltage for driving the cathode ray tube (CRT) 14 at the gain which is set by the gain control signal 1505 outputted from the scan converter 17 in the variable gain video output circuit 126.

As an actual operation, the gain control signal 1505 is outputted from the scan converter 17 so that the variable gain video output circuit 126 increases the gain during the window display period larger than the gain during other than the window display period, for example, when a signal in which it is desirable that the brightness is higher such a high definition video signal is a signal on a window screen. The color temperature control signal 1605 outputs a control signal for controlling the color temperature to 6500 K only during the window display period and outputs a control signal for controlling the color temperature to 9300 K on a screen during other than the window display period.

The output synchronizing signal 1305 from the scan converter 17 is inputted to the deflection circuit 13.

When the display device is structured as mentioned above and video signals such as television (NTSC) signals, high definition signals, or CG are composed and displayed on a computer screen, the brightness of television (TV) or high definition television (HDTV) images can be made higher than that of computer images and those images can be displayed at a suitable color temperature respectively.

According to this embodiment, in a system for composing and displaying video signals such as television (NTSC) signals, high definition signals, or CG on a computer screen, the screen brightness of television (TV) or high definition television (HDTV) images can be made higher than that of computer images and those images can be displayed at a suitable color temperature respectively. However, the screen brightness of computer images can be made higher than that of television (TV) or high definition television (HDTV) images and those images can be displayed at a suitable color temperature respectively. Needless to say, by using this embodiment as a system for generating a window on a screen of television (NTSC) signals, high definition signals, or CG and displaying a computer screen, the screen brightness of television (TV) or high definition television (HDTV) images can be made higher than that of computer images and those images can be displayed at a suitable color temperature respectively. Furthermore, by using this embodiment as a system for composing and displaying computer screens on a screen of television (NTSC) signals, high definition signals, or CG, the screen brightness of computer images can be made higher than that of television (TV) or high definition television (HDTV) images and those images can be displayed at a suitable color temperature respectively.

The three channels of R, G, and B can be executed in the same constitution and the same effect can be obtained.

The present invention has been explained above using the illustrated embodiments. However, needless to say, those who are skilled in the art in the field of the present invention can deform the present invention variously within a range which is not deviated from the spirit of the present invention. It is natural that each embodiment can be combined and executed suitably. It is also possible to install a means for changing and setting the gamma correction factor of an image in accordance with an input video signal to be displayed in the video circuit, control the means by a control signal from the scan converter, and set a suitable gamma correction factor.

As mentioned above, the present invention described in the ninth to twelfth embodiments comprises a scan converter for inputting an input video signal or an input synchronizing signal under various standards and converting and outputting it to a signal at the desired horizontal and vertical scanning frequencies, a video processor circuit for inputting an output video signal from the scan converter and performing processes such as brightness control and contrast control, a variable gain video output circuit for inputting an output signal of the video processor circuit, amplifying it to a signal voltage amplitude for driving a cathode ray tube (CRT), and furthermore changing the gain by a control signal from the scan converter according to a video signal, a deflection circuit for inputting an output synchronizing signal from the scan converter, and a cathode ray tube (CRT) and can suppress an increase in the number of portions to be adjusted by changing the gain of the variable gain video output circuit suitably according to a video signal under various standards, handle a video signal at a scanning frequency within an extremely wide range, and display an image at an optimum brightness according to a vide signal under various standards.

The present invention makes it possible to strengthen and adjust the brightness of output images in the other embodiments and is effective in mutual compensation for defects in the other embodiments.

Next, the embodiments mainly corresponding to the third object mentioned above will be described in detail.

Figure 31:
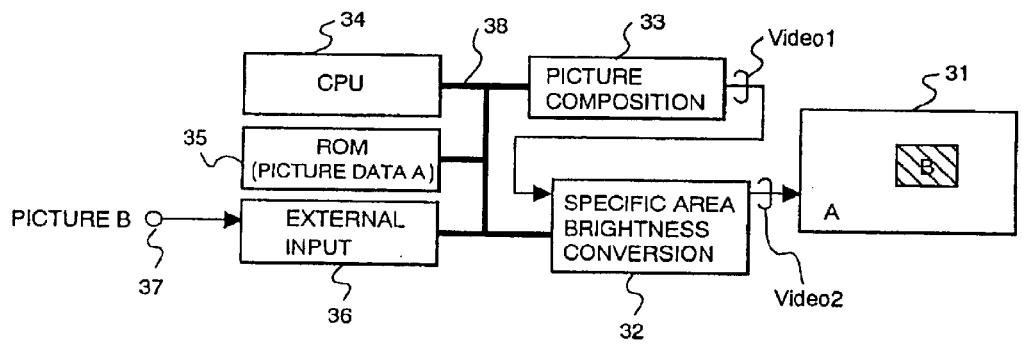
FIG. 31 is a block diagram showing the thirteenth embodiment of the image display system and image display device of the present invention.

FIG. 31 is a block diagram showing the thirteenth embodiment of the image display system and image display of the present invention. Numeral 31 indicates a picture display means, 32 a specific area brightness conversion means, 33 a picture composition means, 34 a CPU circuit, 35 a ROM circuit, 36 an external input circuit, 37 an input terminal, and 38 a signal bus.

In the drawing, the specific area brightness conversion means 32, the picture composition means 33, the CPU circuit 34, the ROM circuit 35, and the external input circuit 36 are connected to the signal bus 38. A device comprising the picture composition means 33, the CPU circuit 34, the ROM circuit 35, and the external input circuit 36 may have, for example, the same constitution as that of a computer. The picture composition means 33 composes two pictures and may comprise, for example, a frame memory. The specific area brightness conversion means 32 converts the brightness level in a specific area displayed on the picture display means 31.

The operation of this embodiment will be explained hereunder. In this embodiment, a picture B is composed in a picture A and they are displayed on the picture display means 31.

The CPU circuit 34 converts, for example, picture data A stored in the ROM circuit 35 to a video signal by the picture composition means 33 on the basis of program information stored in the ROM circuit 35. This video signal is supplied to the picture display means 31 via the specific area brightness conversion means 32. By doing this, the picture A is displayed on the picture display means 31.

On the other hand, the external input means 36 is, for example, an input device of a television video signal and reads a picture signal B inputted from the input terminal 37 and sends it to the picture composition means 33. Needless to say, a line which is installed separately from the signal bus 38 may be used for signal transmission from the external input means 36 to the picture composition means 33. The picture data B is composed in the previous picture data A by the picture composition means 33 and supplied and displayed on the picture display means 31. On the display means, the picture B which is composed in the picture A is displayed as shown in the drawing.

The specific area brightness conversion means 32 can change the brightness levels of the pictures A and B displayed on the picture display means 31 separately from each other.

Figure 33:
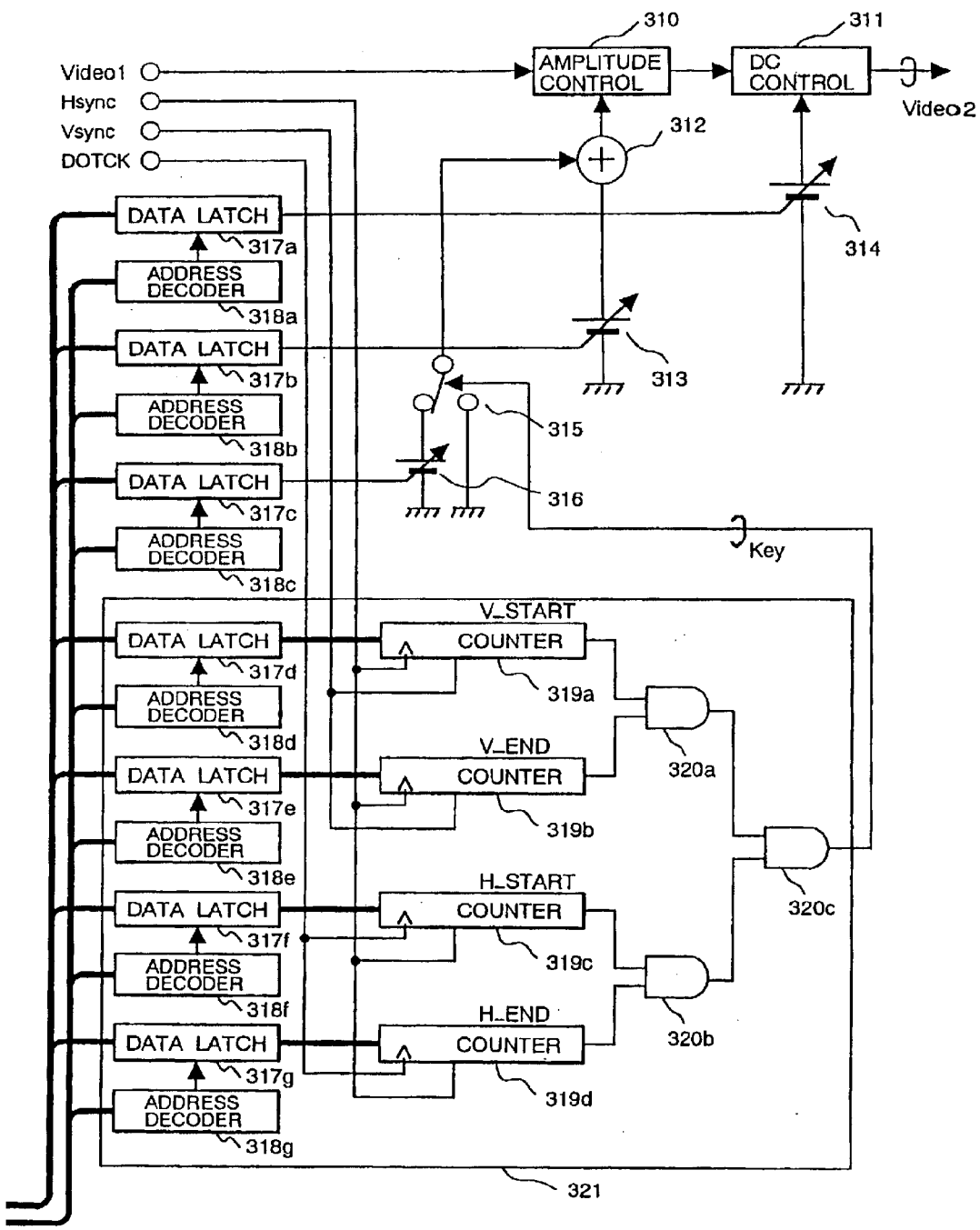
FIG. 33 is a block diagram showing an actual example of the specific area brightness conversion means shown in FIG. 31.

FIG. 33 is a block diagram showing an actual example of the specific area brightness conversion means 32. Numeral 310 indicates an amplitude control means, 311 a DC level control means, 312 an adder, 313, 314, and 315 variable power sources, 315 a change-over switch, 317a to 317c data latches, 318a to 318c address decoders, 319a to 319d counters, 320a to 320c AND gates, and 321 a timing generator.

In the drawing, this actual example comprises the amplitude control means 310 for controlling the amplitude of a picture signal, the DC level control means 311 for controlling the DC level of a picture signal, the adder 312, the variable power sources 313, 314, and 316, the change-over switch 315, the data latches 317a to 317c for setting the voltages of the variable power sources 313, 314, and 316, the address decoders 318a to 318c for latching data in the data latches 317a to 317c, and the timing generator 312 for generating a timing signal key for controlling switching of the changeover switch 315.

The timing generator 321 generates a timing signal key for specifying the composition position of the picture B in the picture A and comprises the counter circuits 319a to 319d for specifying the start addresses and end addresses of the picture B in the vertical and horizontal directions, the AND gates 320a to 320c, the data latches 317d to 317g for setting addresses in the counter circuits 319a to 319d respectively, and the address decoders 318d to 318g.

Data for deciding the DC level of a composite picture overall the screen which is to be supplied from the CPU circuit 34 via the signal bus 38 (FIG. 31) is stored in the data latch 317a, and data for deciding the amplitude overall the screen is stored in the data latch 317b, and data for deciding the amplitude of the composing portion (the portion of the picture B in this case) is stored in the data latch 317c, and the vertical start address of this composing portion is stored in the data latch 317d, and the vertical end address of this composing portion is stored in the data latch 317e, and the horizontal start address of this composing portion is stored in the data latch 317f, and the horizontal end address of this composing portion is stored in the data latch 317g.

In the vertical start counter 319a and the vertical end counter 319b, data in the data latch 317d and data in the data latch 317e are preset respectively by a vertical synchronizing signal Vsync and in the horizontal start counter 319c and the horizontal end counter 319d, data in the data latch 317f and data in the data latch 317g are preset respectively by a horizontal synchronizing signal Hsync. The vertical start counter 319a and the vertical end counter 319b set the horizontal synchronizing signal Hsync as a counter clock signal respectively and the horizontal start counter 319c and the horizontal end counter 319d set a dot clock signal DOTCK as a counter clock signal respectively. Outputs of the vertical start counter 319a and the vertical end counter 319b are ANDed by the AND gate 320a and outputs of the horizontal start counter 319c and the horizontal end counter 319d are ANDed by the AND gate 320b. Furthermore, outputs of these AND gates 320a and 320b are ANDed by the AND gate 320c and a timing signal key indicating the composition position of the picture B is obtained.

Figure 32:
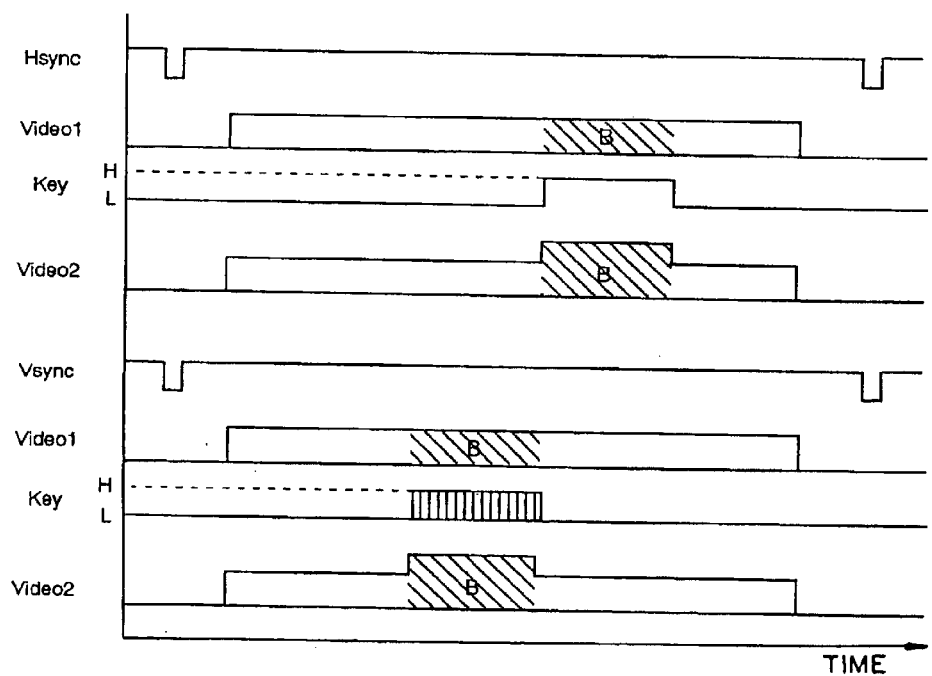
FIG. 32 is a timing chart showing the operation of the embodiment shown in FIG. 31.

FIG. 32 shows the relation between the timing signal key and the video signal level for each of the is horizontal scanning period and the vertical scanning period.

In the drawing, the hatched part of the input picture signal Video1 indicates the composition portion (picture B). The timing signal key is changed from L (low level) to H (high level) in the hatched part of this picture signal Video1 and closes the change-over switch 315 on the side of the variable power source 316.

By doing this, the control voltage which is applied to the amplitude control means 310 only for the display period of the picture B by the picture display means 31 (FIG. 31) becomes a voltage obtained by adding the voltages of the variable power sources 313 and 316 by the adder 312. Accordingly, the amplitude is increased and the brightness level of only the portion of the picture B of the input picture signal Video2 of the picture display means 31 can be changed.

For example, when the picture A is a text screen and the picture B is a television screen, a bright and clear television screen and a readable text screen with a controlled brightness can be displayed at the same time.

Needless to say, the external input means 36 may be a digital system corresponding to CATV, LAN, or ISDN which is used in the VOD system.

Figure 34:
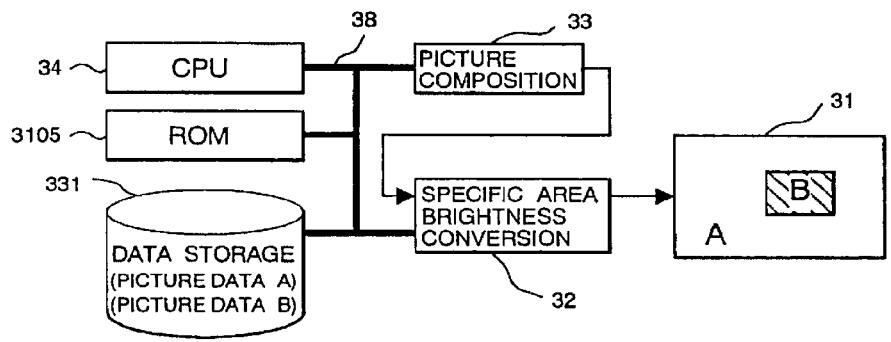
FIG. 34 is a block diagram showing a deformation example of the thirteenth embodiment shown in FIG. 31.

As shown in FIG. 34, a data storage 331 may be used in place of the external input means 36. This data storage 331 may be a hard disk, magnetic disk, magneto-optical disk, or CDROM and stores picture data equivalent to the pictures A and B.

Figure 35:
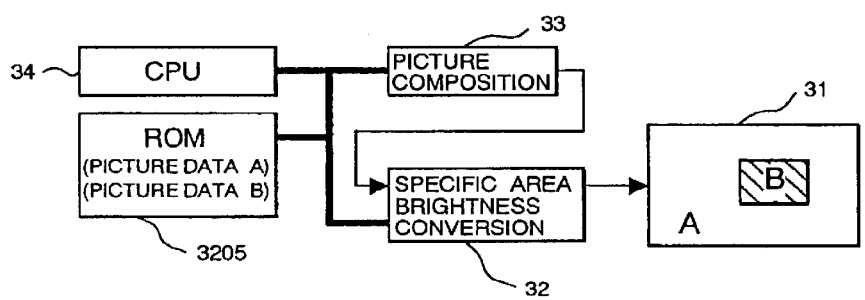
FIG. 35 is a block diagram showing another deformation example of the thirteenth embodiment shown in FIG. 31.
Figure 36:
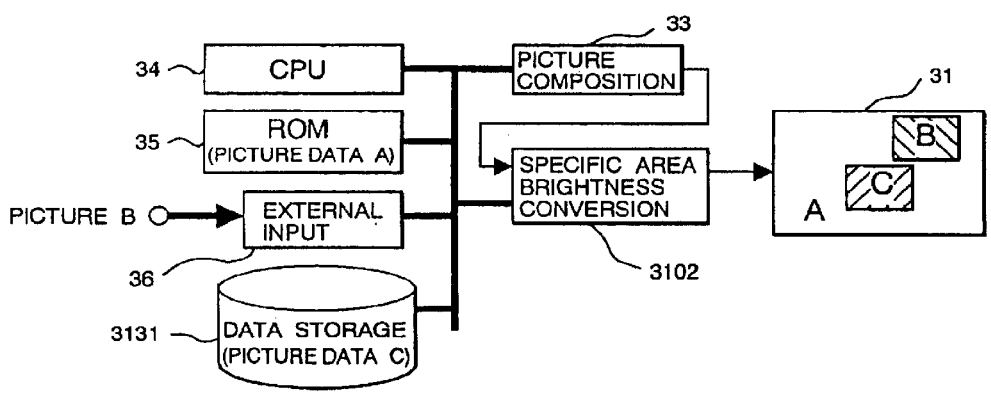
FIG. 36 is a block diagram showing still another deformation example of the thirteenth embodiment shown in FIG. 31.

As shown in FIG. 35, a ROM 3205 for storing picture data equivalent to the pictures A and B may be used in place of the external input means 36 or as shown in FIG. 36, the external input means 36 and a data storage 3131 may be installed additionally.

Figure 37:
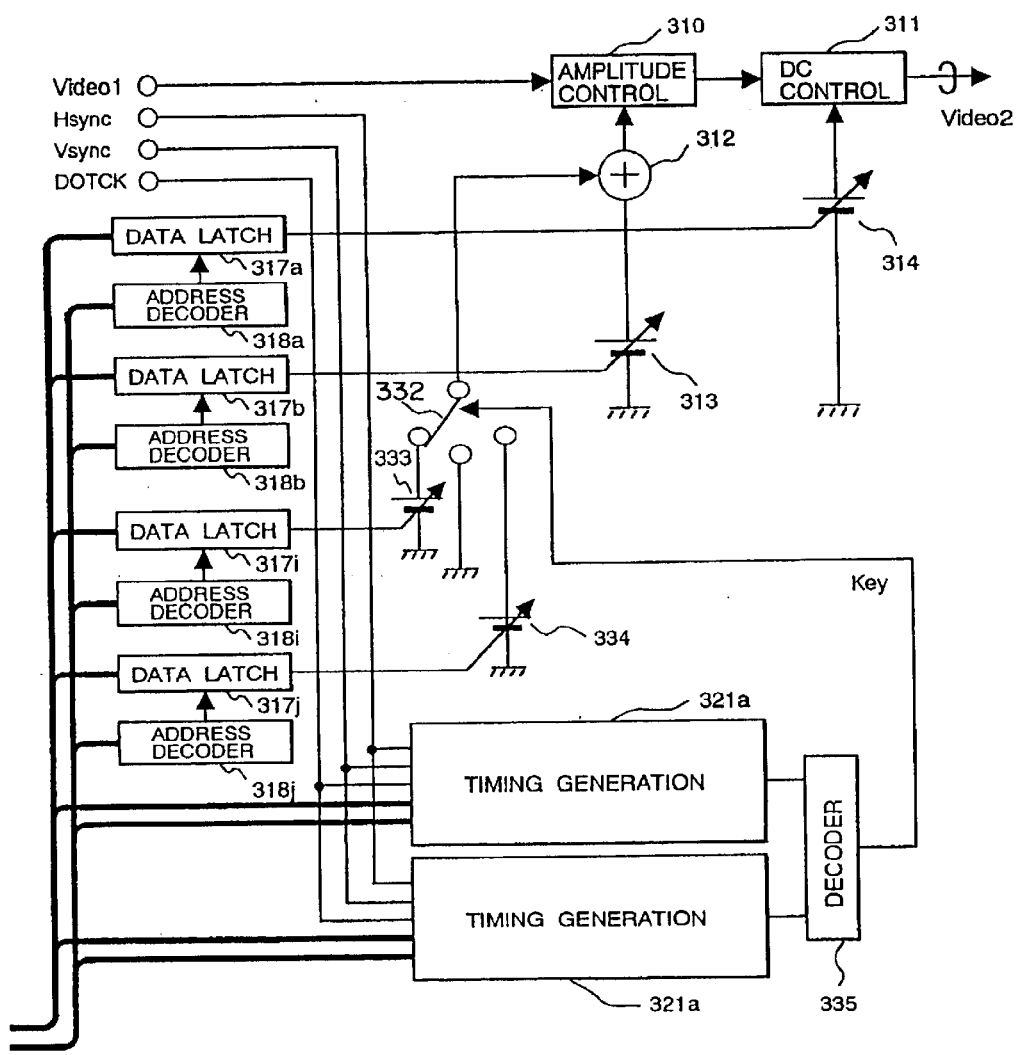
FIG. 37 is a block diagram showing an actual example of the specific area brightness conversion means shown in FIG. 36.

In the embodiment shown in FIG. 36, needless to say, three pictures of the pictures A, B, and C can be displayed in the picture display means 31 at the same time. An actual example of the specific area brightness conversion means 3102 in this case is shown in FIG. 37. Numerals 317i and 317j indicate data latches, 318i and 318j address decoders, 321a and 321b timing generators, 332 a change-over switch, 333 and 334 variable power sources, and 335 a decoder and the same numeral is assigned to each of the parts corresponding to those shown in FIG. 33 so as to omit duplicated explanation.

In FIG. 37, the timing generator 321a generates a timing signal indicating the picture B display period of the picture display means 31 shown in FIG. 36 and the timing generator 321b generates a timing signal indicating the picture C display period. Output signals of these timing generators 321a and 321b are supplied to the change-over switch 332 via the decoder 335. When the timing generator 321a generates a timing signal, the change-over switch 332 is closed on the side of variable power source 333 and when the timing generator 321b generates a timing signal, the change-over switch 332 is closed on the side of variable power source 334. In other cases, the change-over switch 332 selects a voltage of 0.

The voltage from the change-over switch 332.is added to the voltage of the variable power source 313 by the adder circuit 312 and supplied to the amplitude control means 310. The voltage of the variable power source 333 is set according to data of the data latch 317i and the voltage of the variable power source 334 is also set according to data of the data latch 317j.

Therefore, by setting data of the data latches 317i and 317j suitably, the amplitudes of the pictures B and C can be set suitably.

It is obvious that if the number of timing generators increases, the brightness levels of an optional number of composite screens also can be set suitably.

By doing this, only the brightness of a composite picture can be controlled independently. For example, when the picture A is a text screen and the picture B is a television screen, a bright and clear television screen and a readable text screen with a controlled brightness can be displayed at the same time.

Figure 38:
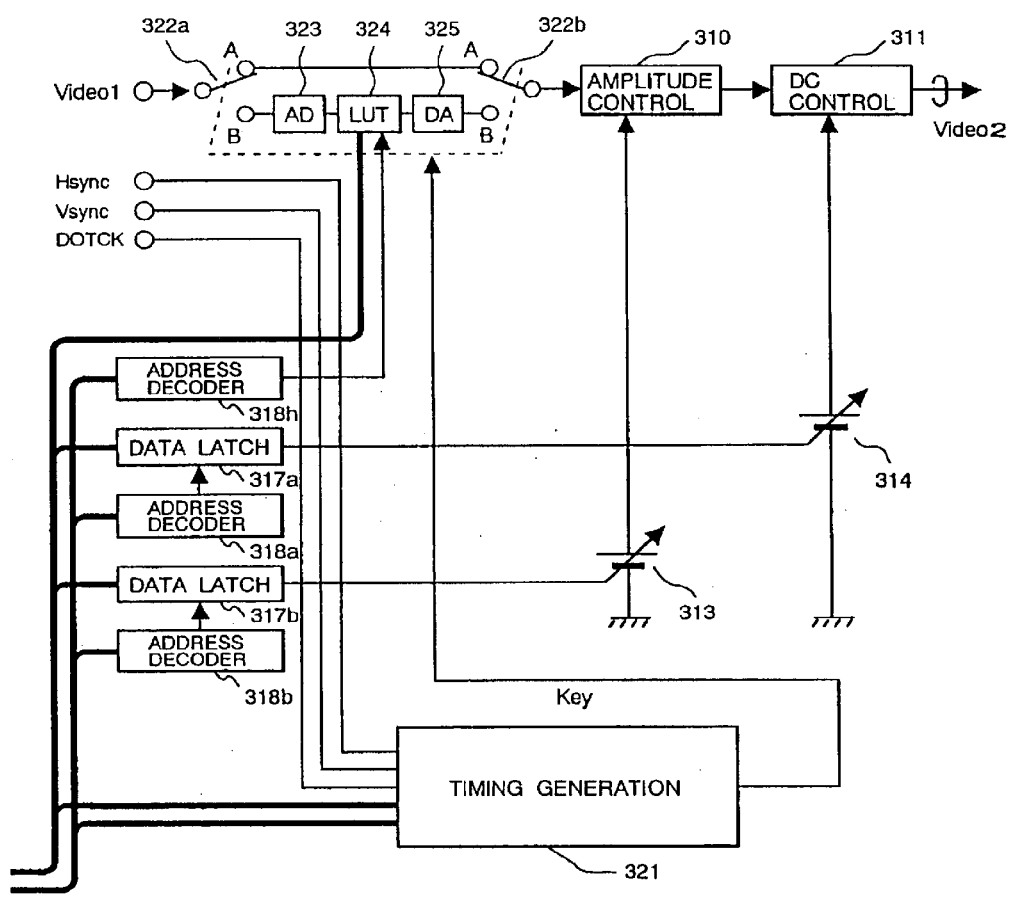
FIG. 38 is a block diagram showing an actual example of the specific area brightness conversion means in the fourteenth embodiment of the image display system and image display device of the present invention.

FIG. 38 is a block diagram showing an actual example of the specific area brightness conversion means 32 in the fourteenth embodiment of the image display system and image display of the present invention. Numeral 318h indicates an address decoder, 322a and 332b change-over switches, 323 an analog to digital converter, 324 an LUT (lookup table), and 325 a digital to analog converter and the same numeral is assigned to each of the parts corresponding to those shown in FIG. 33 so as to omit duplicated explanation.

The whole constitution of the fourteenth embodiment is the constitution shown in FIG. 31. However, the specific area brightness conversion means 32 is different from the specific area brightness conversion means 14 shown in FIG. 33 in the thirteenth embodiment mentioned above. The respect that this actual example is greatly different from the actual example shown in FIG. 33 is that the brightness level of the composition portion is converted by the digital signal process. A processing means for that purpose comprises the analog to digital converter 323 for converting an analog video signal to a digital video signal, the LUT 324 as a digital data converter, the digital to analog converter 352 for converting a digital video signal to an analog digital signal, and the change-over switches 322a and 322b.

Next, the operation of the actual example will be explained.

By the timing signal key from the timing generator 321, the change-over switches 322a and 322b are closed on the B side for the time zone of the composition portion. In this case, the signal in the portion of the picture B of the video signal Video1 is digitized by the analog to digital converter 323 and supplied to the LUT 324. Converted data is inputted in the LUT 324 from the CPU circuit 34 via the signal bus 38 (FIG. 31) and the amplitude and DC level of the video signal Video1 are set to the desired values by this converted data. This LUT 324 can comprise, for example, a memory such as EEPROM and data can be rewritten freely from the CPU circuit 34.

Output data of this LUT 324 is converted to an analog video signal by the digital to analog converter 325, and controlled in level by the amplitude control means 310 and the DC level control means 311, and outputted as a video signal Video2. By doing this, the brightness level can be controlled by the LUT 324 only during the period of the picture B.

During the period of the picture A, the change-over switches 322a and 322b are closed on the A side and the brightness is not controlled by the LUT 324. The whole amplitude and DC level are controlled via the variable power sources 313 and 314 in the same way as with the actual example shown in FIG. 33.

By doing this, the brightness level of only the composition portion (picture B) can be changed. Particularly in the case of the digital system shown in FIG. 38, various items such as not only the amplitude but also the DC level, gamma level, and hue can be controlled.

In FIG. 38, the change-over switches 322a and 322b are arranged before the analog to digital converter 323 and after the digital to analog converter 325 respectively so as to switch an analog video signal. However, the change-over switches 322a and 322b may be arranged after the analog to digital converter 323 and before the digital to analog converter 325 respectively so as to switch a digital video signal.

Figure 39:
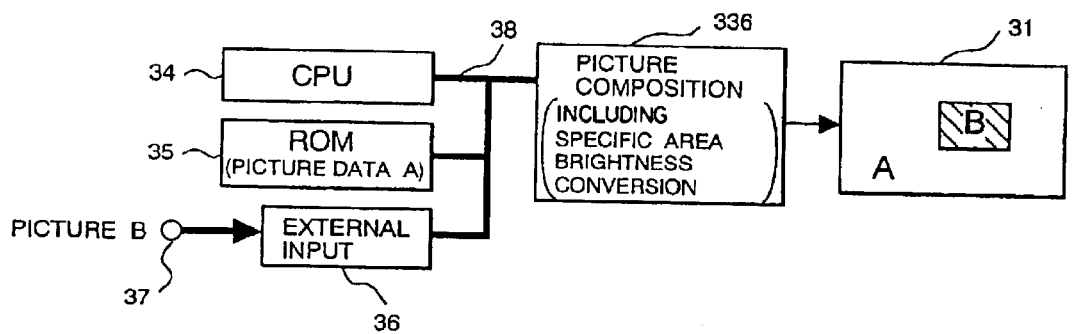
FIG. 39 is a block diagram showing the fifteenth embodiment of the image display system and image display device of the present invention.

FIG. 39 is a block diagram showing the fifteenth embodiment of the image display system and image display of the present invention. Numeral 336 indicates a picture composition means and the same numeral is assigned to each of the parts corresponding to those shown in FIG. 31 so as to omit duplicated explanation.

The characteristic of this embodiment is that a specific area brightness conversion function is added to the picture composition means 363 as shown in FIG. 39. The circuit configuration is simple compared with the embodiment shown in FIG. 31.

Figure 40:
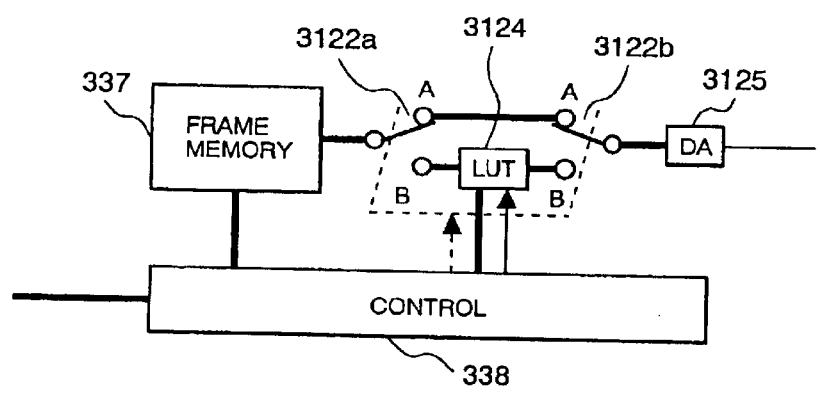
FIG. 40 is a block diagram showing an actual example of the image composition circuit shown in FIG. 39.

FIG. 40 is a block diagram showing an actual example of the picture composition means 363. Numeral 337 indicates a frame memory, 338 a controller, 3122a and 3122b change-over switches, 3124 an LUT, and 3125 a digital to analog converter.

In FIG. 40, this actual example comprises the frame memory 337 for writing and reading picture data, the LUT 3124 for converting digital data, the digital to analog converter 3125 for converting a digital video signal to an analog video signal, the change-over switches 3122a and 3122b, and the controller 338 for controlling reading and writing of the frame memory 337, controlling switching of the change-over switches 3122a and 3122b, and rewriting data of the LUT 3124.

The controller 338 decides the storage areas for picture data A and B in the frame memory and the picture data A and B are written into or read from the designated areas respectively. By doing this, the picture B is composed in the picture A in the frame memory 337. Therefore, the controller 338 can judge whether the reading position in the frame memory 337 is a storage area of the picture data A or a storage area of the picture data B and controls switching of the change-over switches 3122a and 3122b on the basis of this judgment.

In the frame memory 337, the picture data A and B are transferred and stored from the CPU circuit 34 (FIG. 39). When the frame memory 337 outputs the portion of the picture data A, the change-over switches 3122a and 3122b are closed on the A side and the picture data A is supplied to the digital to analog converter 3125 via the change-over switches 3122a and 3122b, converted to an analog video signal there, and then outputted.

In the time zone of the picture data B, the change-over switches 3122a and 3122b are closed on the B side and data is converted by the LUT 3124. As explained also in FIG. 38, the amplitude and DC level of a video signal can be changed freely by the LUT 3124, so that only the brightness level of the picture B can be controlled freely.

By doing this, only the brightness level of the composition portion can be adjusted independently by a comparatively simple constitution and for example, when the picture A is a text screen and the picture B is a television screen, a bright and clear television screen and a readable text screen with a controlled brightness can be displayed at the same time.

Figure 41:
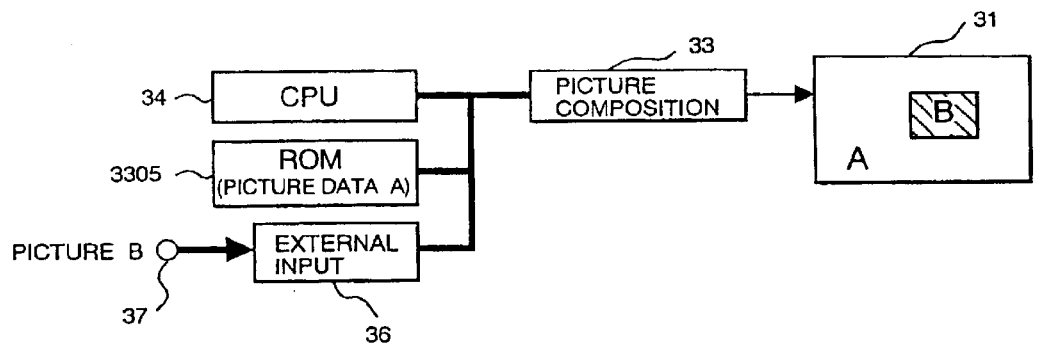
FIG. 41 is a block diagram showing the sixteenth embodiment of the image display system and image display device of the present invention.

FIG. 41 is a block diagram showing the sixteenth embodiment of the image display system and image display of the present invention. Numeral 3305 indicates an ROM and the same numeral is assigned to each of the parts corresponding to those shown in FIG. 31 so as to omit duplicated explanation.

In the drawing, a program of the CPU circuit 34 as well as the picture data A are stored in the ROM 3305 and the CPU circuit 34 performs processes such as setting of a composition area and execution of various operations on the basis of this program. In this case, the CPU circuit 34 sets the brightness level of the composition portion by software operation and by doing this, the hardware configuration becomes simpler than that of the embodiment shown in FIG. 31.

Figure 42:
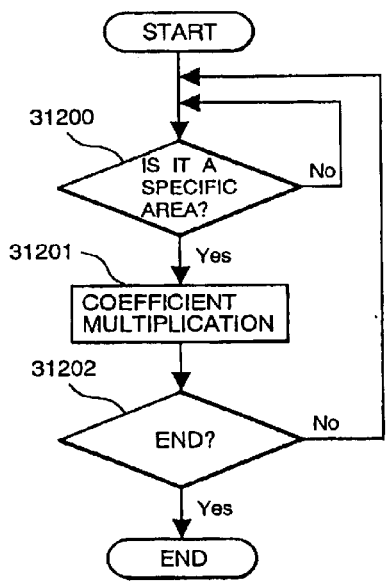
FIG. 42 is a flow chart showing the operation of the embodiment shown in FIG. 41.

Next, the software process in this embodiment will be explained by referring to FIG. 42.

The CPU circuit 34 decides whether the area is a specific area, that is, a composition portion or not (Step 31200) first. When the area is not a composition portion, the CPU circuit 34 reads the picture data A from the ROM 3305 and transfers it to the picture composition means 33. When the CPU circuit 34 decides that the area is a composition portion, the CPU circuit 34 multiplies the picture data B read from the external input means 36 by the desired coefficient so as to adjust the amplitude and transfers it to the picture composition means 33 (Step 31201). By doing this, the picture B whose amplitude is adjusted is composed in the picture A by the picture composition means 33. This operation is performed until the aforementioned specific area ends and when the specific area ends (Step 31202), the CPU circuit 34 returns to Step 31200 again and transfers the picture data A to the picture composition means 33.

In this embodiment, needless to say, the DC level also can be adjusted. In this case, it is desirable that the predetermined value is added to the picture data B.

By doing this, the brightness level of the composition portion can be adjusted independently.

Figure 43:
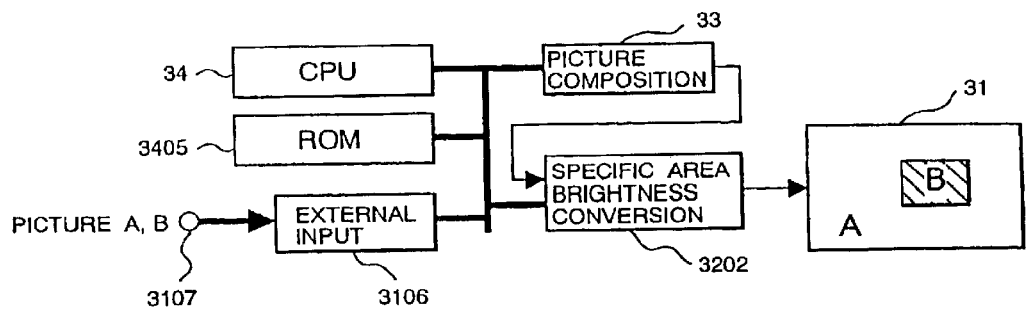
FIG. 43 is a block diagram showing the seventeenth embodiment of the image display system and image display device of the present invention.

FIG. 43 is a block diagram showing the seventeenth embodiment of the image display system and image display of the present invention. Numeral 3106 indicates an external input means, 3107 an input terminal, 3202 a specific area brightness conversion means, and 3405 an ROM and the same numeral is assigned to each of the parts corresponding to those shown in FIG. 31 so as to omit duplicated explanation.

The characteristic of this embodiment is that even if a video signal to be inputted to the external input means 3106 is already composed, the present invention can detect the composition portion and control the brightness level of the composition portion independently. This process is executed by the specific area brightness conversion means 3202 in FIG. 43. The other parts of the constitution are the same as those in the embodiment shown in FIG. 31.

Figure 44:
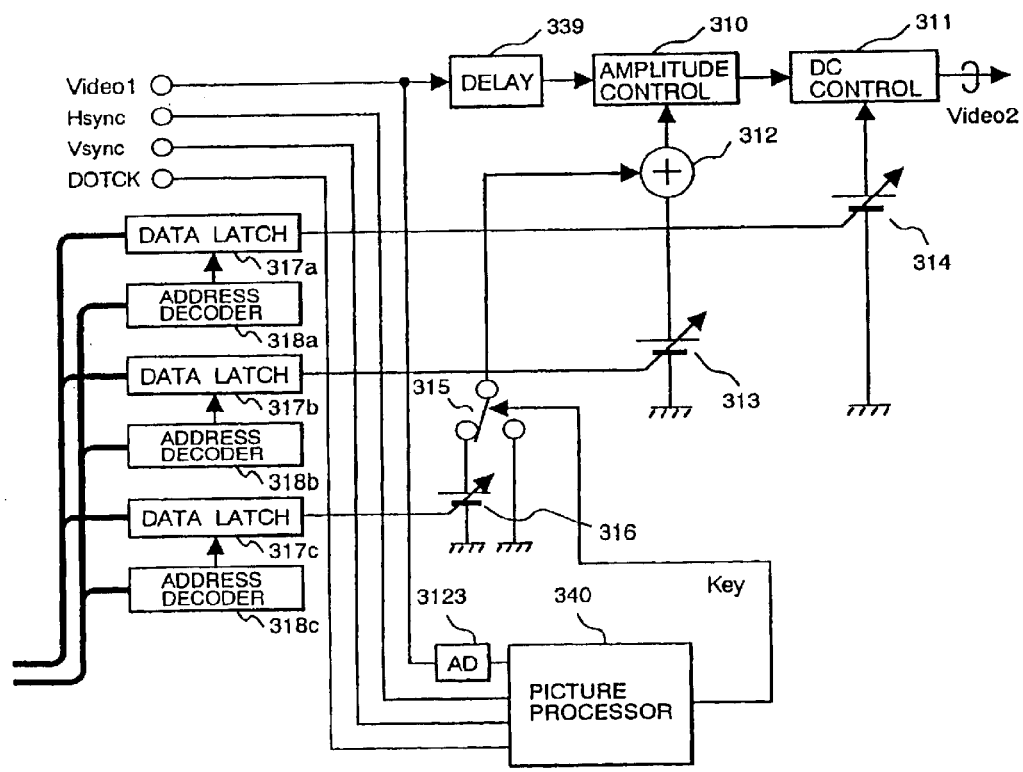
FIG. 44 is a block diagram showing an actual example of the specific area brightness conversion means shown in FIG. 43.

FIG. 44 is a block diagram showing an actual example of the specific area brightness conversion means 3202. Numeral 339 indicates a delay circuit, 340 a picture processor, and 3123 an analog to digital converter and the same numeral is assigned to each of the parts corresponding to those shown in FIG. 33 so as to omit duplicated explanation.

In the drawing, this actual example provides the picture processor 340 in place of the timing generator 321 shown in FIG. 33, decides the composition portion of the picture B (FIG. 43), and controls the change-over switch 315.

Figure 45:
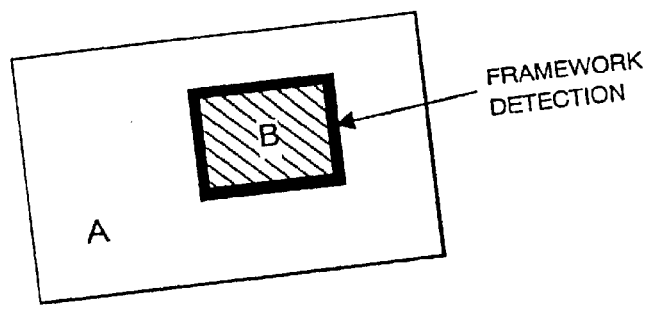
FIG. 45 is an illustration showing an example of the detection method for a composition image of the picture processor 340 shown in FIG. 44.
Figure 46:
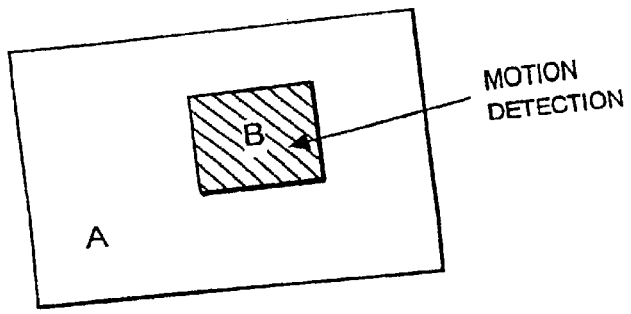
FIG. 46 is an illustration showing another example of the detection method for a composition image of the picture processor 340 shown in FIG. 44.
Figure 47:
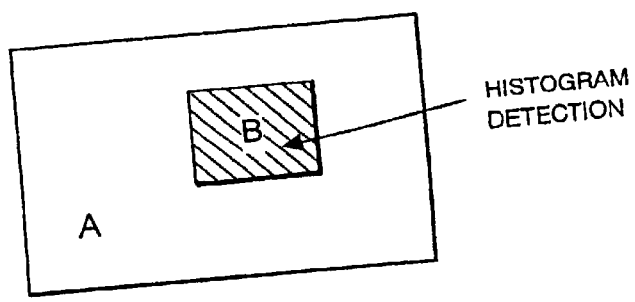
FIG. 47 is an illustration showing still another example of the detection method for a composition image of the picture processor 340 shown in FIG. 44.

Decision processes executed by the picture processor 340 are detection of the framework of a composition portion (picture B) as shown in FIG. 45, or detection of a moving screen as shown in FIG. 46, or detection of a composition portion by a histogram as shown in FIG. 47. Furthermore, by combining them, the detection accuracy can be improved more.

The picture processor 340 generates a timing signal key as in the actual example shown in FIG. 33 on the basis of the information which is detected like this and controls the change-over switch 315 by it.

The delay circuit 339 is used to offset a delay in the picture processor 340.

By doing this, even if a picture is composed in a video signal beforehand, the picture processor 340 can detect the composition position and change only the brightness level of the portion independently.

Figure 48:
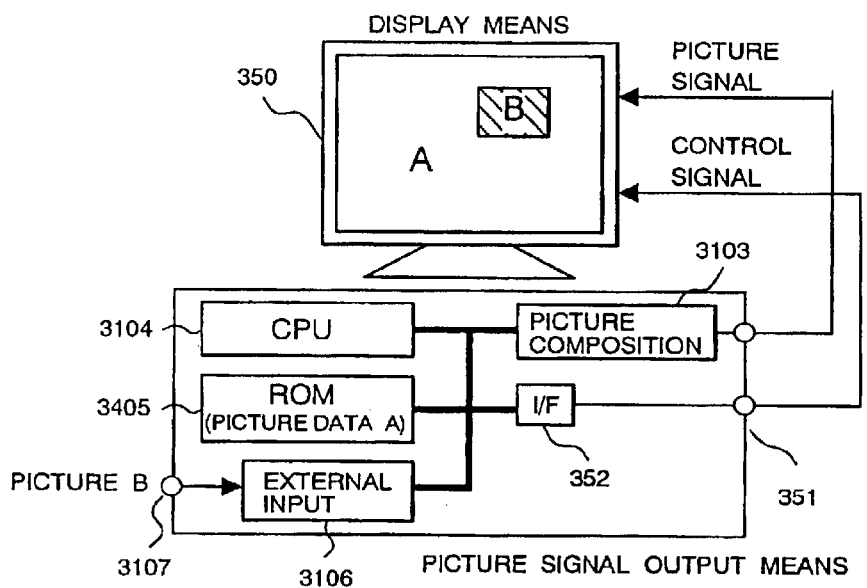
FIG. 48 is a block diagram showing an actual example of the image display means in the eighteenth embodiment of the image display system and image display device of the present invention.

FIG. 48 is a block diagram showing the eighteenth embodiment of the image display system and image display of the present invention. Numeral 350 indicates a picture display means, 351 a picture signal output means, 352 an interface, 3103 a picture composition means, and 3104 a CPU circuit and the same numeral is assigned to each of the parts corresponding to those shown in FIG. 43 so as to omit duplicated explanation.

In the drawing, this embodiment comprises the picture display means 350 and the picture signal output means 351 and a specific area brightness conversion means is integrated with the picture display means 350. The picture signal output means 351 has a constitution which is similar to the parts excluding the picture display means 31 and the specific area brightness conversion means 32 shown in FIGS. 31 and 43 which are integrated with each other. A picture signal outputted from the picture composition means 3103 and a control signal passing through the interface 352 are supplied to the picture display means 350 from the picture signal output means 351.

As an actual constitution of this embodiment, for example, the picture signal output means 351 is a computer body such as a personal computer or a work station and the picture display means 350 is a monitor display device.

Figure 49:
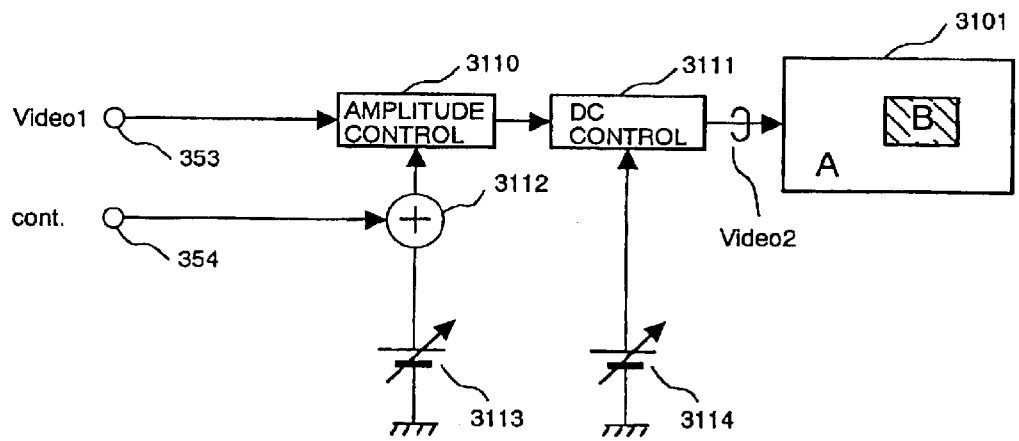
FIG. 49 is a block diagram showing an actual example of the image display means shown in FIG. 48.

FIG. 49 is a block diagram showing an actual example of the picture display means 350. Numerals 353 and 354 indicate input terminals, 3101 a picture display device, 3110 an amplitude control means, 3111 a DC level control means, 3112 an adder, and 3113 and 3114 variable power sources.

In the drawing, the picture display means 350 comprises the picture display device 3101, the DC level control means 3111 for a picture signal, the amplitude control means 3110 for a picture signal, the adder 3112, and the variable power sources 3113 and 3114.

The amplitude of a picture signal Video1 supplied to the input terminal 353 from the picture signal output means 351 shown in FIG. 48 is controlled by the amplitude control means 3110. A control voltage cont. is supplied to the input terminal 354 from the picture signal output means 351 in the composition portion of the picture B on the screen of the picture display device 3101 and the control voltage cont. is added to the voltage of the variable power source 3113 by the adder 3112 and supplied to the amplitude control means 3110. In the portion other than the composition portion of the picture B on the screen of the picture display device 3101, the voltage of the variable power source 3113 is supplied to the amplitude control means 3110. In the amplitude control means 3110, the amplitude of the picture signal Video1 is controlled by this supply voltage.

An output picture signal of the amplitude control means 3110 is supplied to the DC level control means 3111 and the DC level thereof is set by the voltage of the variable power source 3114. An output picture signal Video2 of the DC level control means 3111 is supplied to the picture display device 3101 and a picture thereof is displayed.

By doing this, the brightness level of the composition portion of the picture B can be changed at the voltage level of the control voltage cont. supplied to the input terminal 354 and the supply timing thereof.

Figure 50:
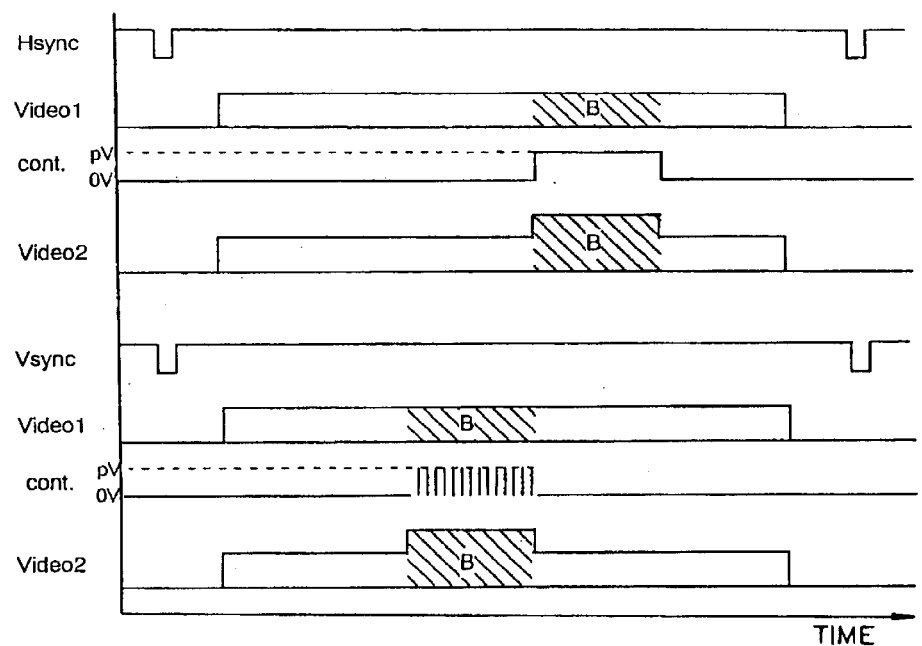
FIG. 50 is a timing chart showing the operation of the actual example shown in FIG. 49.

FIG. 50 shows the relation between the supply timing of the control voltage cont. and the voltage level for each of the horizontal scanning period and the vertical scanning period.

In the drawing, each hatched part of the picture signal Video1 indicates the composition portion of the picture B. In this case, the control voltage cont. supplied to the input terminal 354 is changed from 0 (V) to p (V) in the hatched part of the picture signal Video1. By doing this, the level of the input picture signal Video2 of the picture display device 3101 is increased in amplitude by the composition portion of the picture B.

As a result, when the picture B is composed and displayed in the text picture A on the picture display device 3101, television pictures are seen brightly and clearly and in the other area, the brightness is kept unchanged and characters and figures are displayed at the same legible brightness level.

By doing this, a picture display for controlling only the brightness level of the composition portion can be realized.

Figure 51:
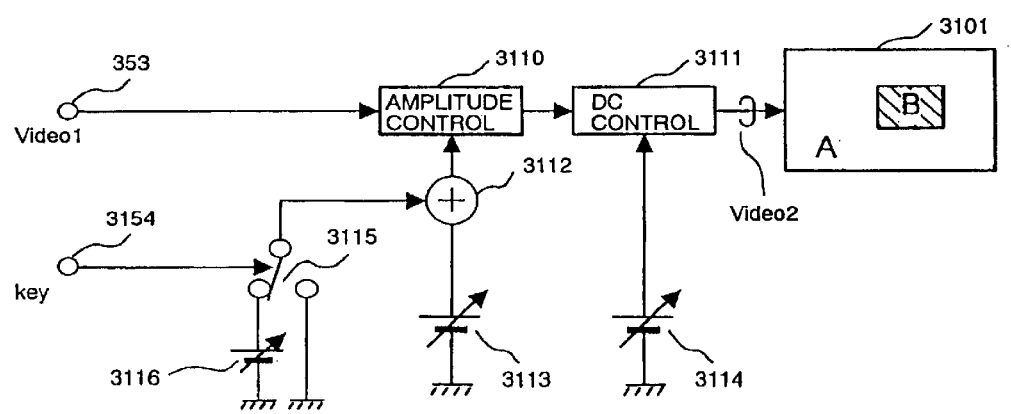
FIG. 51 is a block diagram showing an actual example of the image display means in the nineteenth embodiment of the image display system and image display device of the present invention.

FIG. 51 is a block diagram showing an actual example of the picture display means in the nineteenth embodiment of the image display system and image display of the present invention. Numeral 3115 indicates a change-over switch, 3116 a variable power source, and 3154 an input terminal and the same numeral is assigned to each of the parts corresponding to those shown in FIG. 49 so as to omit duplicated explanation.

The whole constitution of this embodiment is the same as that shown in FIG. 48. However, a signal supplied to the picture display means 350 from the interface 352 is the timing signal key indicating the composition position of the picture B.

In FIG. 51, the timing signal key indicating the composition position of the picture B is inputted from the input terminal 3154 and the change-over switch 3115 is closed on the side of the variable power source 3116. By doing this, the voltage of the variable power source 3116 is added to the voltage of the variable power source 3113 by the adder 3112 and the amplitude control means 3110 is controlled by the added voltage. As a result, only the brightness level of the composition portion is controlled to the desired value.

In this case, the timing signal key may be a binary digital signal, accordingly the constitution of the interface circuit 352 (FIG. 48) of the picture signal output means 351 is simplified.

Figure 52:
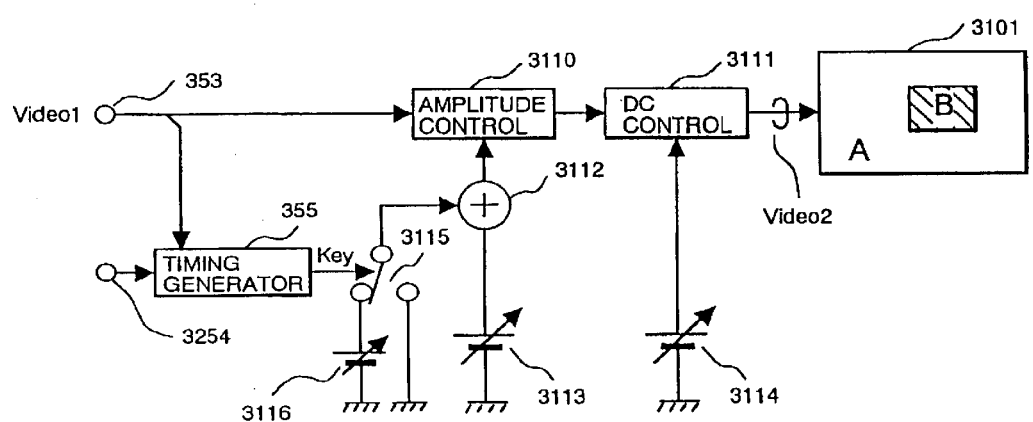
FIG. 52 is a block diagram showing an actual example of the image display means in the twentieth embodiment of the image display system and image display device of the present invention.

FIG. 52 is a block diagram showing an actual example of the picture display means in the twentieth embodiment of the image display system and image display of the present invention. Numeral 355 indicates a timing generator and 3254 an input terminal and the same numeral is assigned to each of the parts corresponding to those shown in FIG. 51 so as to omit duplicated explanation.

Figure 53:
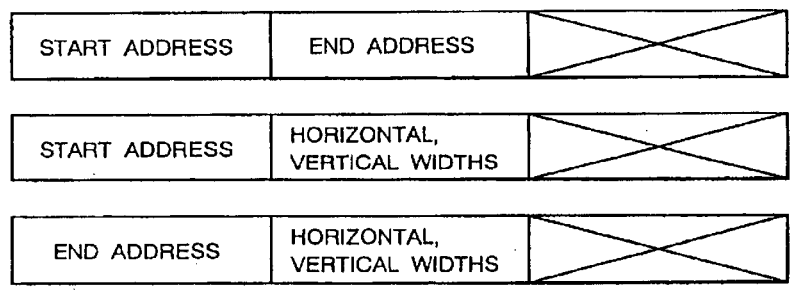
FIG. 53 is a drawing showing an actual example of the composition position data to be used in the actual example shown in FIG. 52.

The whole constitution of this embodiment is also the same as that shown in FIG. 48. However, a signal supplied to the picture display means 350 from the interface 352 is data (composition position data) which is obtained by coding the composition position of the picture B. This composition position data, as shown in FIG. 53, is data indicating the start address and end address of the composition position, or data indicating the start address of the composition position and the horizontal and vertical widths of the composition position, or data indicating the end address of the composition position and the horizontal and vertical widths of the composition position.

In FIG. 52, when composition position data is inputted from the input terminal 3254, it is supplied to the timing generator 355 together with a synchronizing signal of the the picture signal Video1 and a dot clock signal and a timing signal key of the composition position of the picture B which is the same as the timing signal key shown in FIG. 51 is generated. The change-over switch 3115 is controlled by this timing signal key. The portion other than it is the same as that of the actual example shown in FIG. 51.

Figure 54:
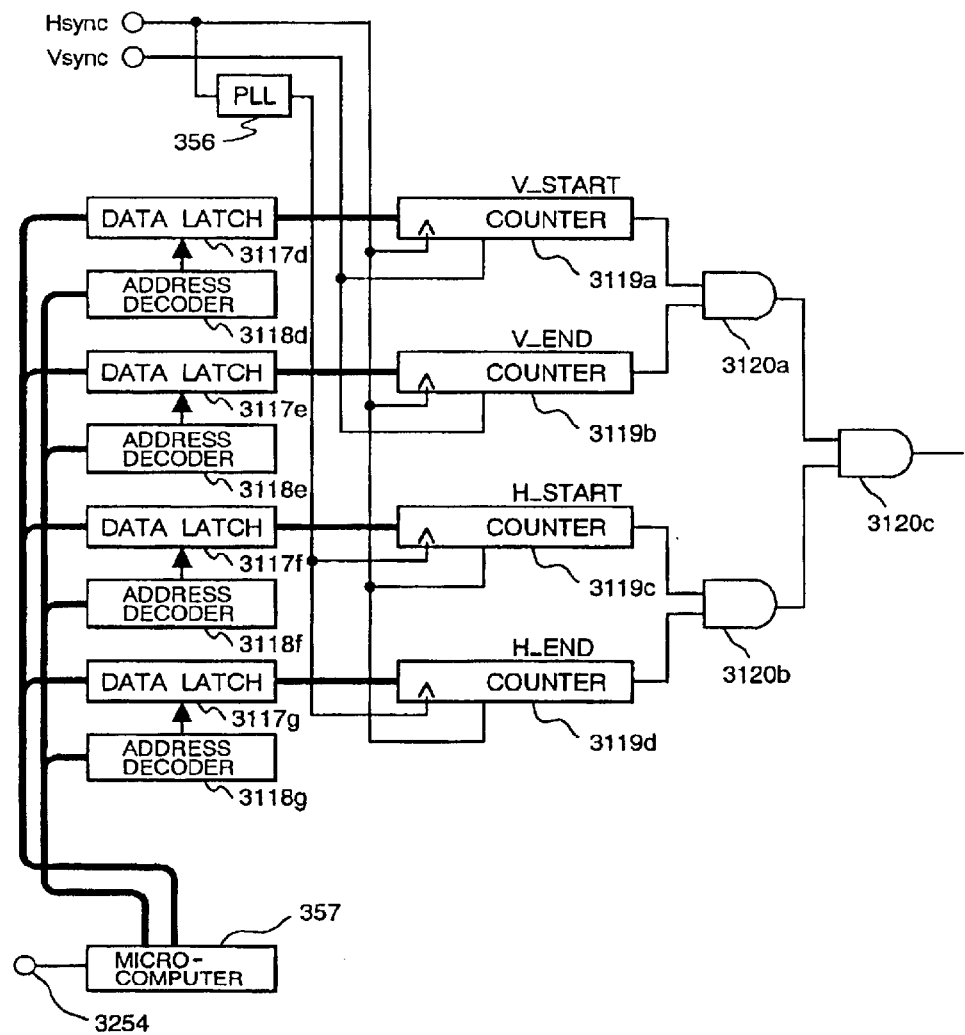
FIG. 54 is a block diagram showing an actual example of the timing generator circuit shown in FIG. 52.

The timing generator 355 has, for example, the constitution shown in FIG. 37 basically. An actual example thereof is shown in FIG. 54. Numeral 356 indicates a PLL (phase locked loop) circuit, 357 a micro computer, 3117d to 3117g data latches, 3118d to 3118g address latches, 3119a to 3119d counters, and 3120a to 3120c AND gates.

In FIG. 54, composition position data inputted from the input terminal 3254 is decoded by the micro computer 357 and transferred and latched by the data latches 3117d to 3117g. The vertical timing start counter 3119a and the vertical timing end counter 3119b are initialized by a vertical synchronizing signal Vsync and then the data of the data latches 3117d and 3117e are preset. The horizontal timing start counter 3119c and the horizontal timing end counter 3119d are initialized by a horizontal synchronizing signal Hsync and then the data of the data latches 3117f and 3117g are preset. The vertical timing start counter 3119a and the vertical timing end counter 3119b set a dot clock signal which is obtained by multiplying the horizontal synchronizing signal Hsync by the PLL circuit 356 as a counter clock signal respectively and the horizontal timing start counter 3119c and the horizontal timing end counter 3119d set a dot clock signal which is obtained by multiplying the horizontal synchronizing signal Hsync by the PLL circuit 356 as a counter clock signal respectively. Counter outputs of the vertical timing start counter 3119a and the vertical timing end counter 3119b are ANDed by the AND gate 3120a and counter outputs of the horizontal timing start counter 3119c and the horizontal timing end counter 3119d are ANDed by the AND gate 3120b. Furthermore, outputs of the AND gates 3120a and 3120b are ANDed by the AND gate 3120c and a timing signal key indicating the composition position is obtained.

In this embodiment, as composition position data to be inputted from the input terminal 3254, for example, data under the specification used for a personal computer such as RS-232C or a computer such as a work station may be used. Therefore, a standard product can be used for the interface circuit 352 (FIG. 48) of the picture signal output means 351 and the cost can be decreased.

By doing this, only the brightness level of the composition portion can be controlled.

Figures 55, 56:
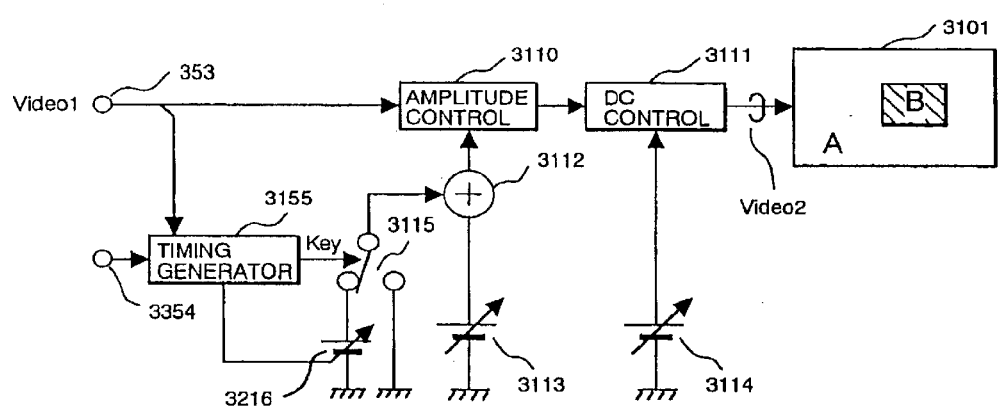
FIG. 55 is a block diagram showing an actual example of the image display means in the twenty-first embodiment of the image display system and image display device of the present invention.
FIG. 56 is a drawing showing an actual example of the composition position/brightness level data to be used in the actual example shown in FIG. 55.

FIG. 55 is a block diagram showing an actual example of the picture display means in the twenty-first embodiment of the image display system and image display of the present invention. Numeral 3155 indicates a timing generator, 3216 a variable power source, and 3354 an input terminal and the same numeral is assigned to each of the parts corresponding to those shown in FIG. 52 so as to omit duplicated explanation.

The whole constitution of this embodiment is also the same as that shown in FIG. 48. However, a signal supplied to the picture display means 350 from the interface 352 is coded data (composition position/brightness level data) for instructing the composition position of the picture B and the brightness level thereof. This composition position/brightness level data, as shown in FIG. 56, is the composition position data shown in FIG. 53 to which the brightness level data is added.

The timing generator 3155 comprises the circuit for generating a timing signal key for control of the changeover switch 3115 which is shown in FIG. 54 and a circuit for controlling the variable power source 3216 according to the brightness level data (FIG. 56). The circuit for controlling the variable power source 3216 may have, for example, the same constitution as that of the circuit for controlling the variable power sources 313, 314, and 316 shown in FIG. 33.

Figure 57:
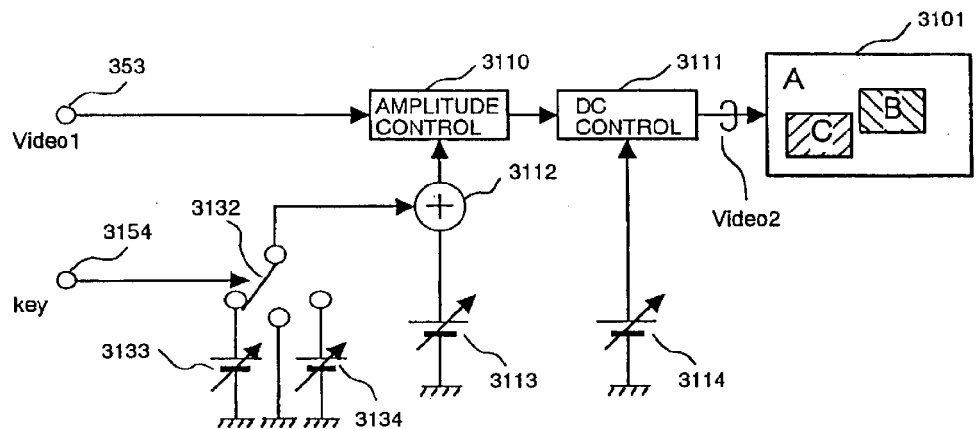
FIG. 57 is a block diagram showing an actual example of the image display means in the twenty-second embodiment of the image display system and image display device of the present invention.

FIG. 57 is a block diagram showing an actual example of the picture display means in the twenty-second embodiment of the image display system and image display of the present invention. Numeral 3132 indicates a change-over switch and 3133 and 3134 variable power sources and the same numeral is assigned to each of the parts corresponding to those shown in FIG. 51 so as to omit duplicated explanation.

The whole constitution of this embodiment is also the same as that shown in FIG. 48. However, there are a plurality of composition pictures available such as B and C.

In FIG. 57, the variable power sources 3133 and 3134 are used to decide the amplitudes of the pictures B and C in the composition positions on the screen of the picture display device 3101 and selected by the change-over switch 3132 which is controlled in switching by the timing signal key inputted from the input terminal 3154. The timing signal key is, for example, a ternary signal. The other parts are the same as those of the picture display means shown in FIG. 51.

Figure 58:
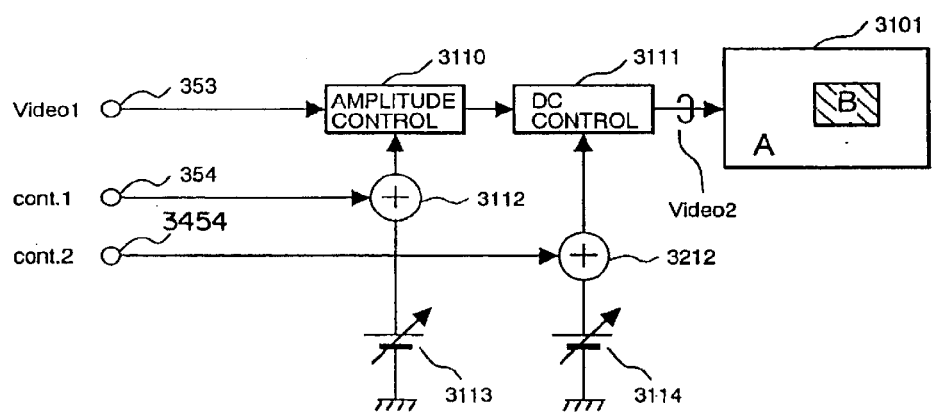
FIG. 58 is a block diagram showing an actual example of the image display means in the twenty-third embodiment of the image display system and image display device of the present invention.

FIG. 58 is a block diagram showing an actual example of the picture display means in the twenty-third embodiment of the image display system and image display of the present invention. Numeral 3212 indicates an adder and 3354 an input terminal and the same numeral is assigned to each of the parts corresponding to those shown in FIG. 49 so as to omit duplicated explanation.

The whole constitution of this embodiment is also the same as that shown in FIG. 48. However, the DC level of the picture B to be composed also can be controlled.

In FIG. 57, in the composition position of the picture B, a control voltage cont.1 is supplied from the input terminal 354, added to the voltage of the variable voltage source 3113 by the adder 3112, and supplied to the amplitude control means 3110, and at the same time, a control voltage cont.2 is supplied from the input terminal 3354, added to the voltage of the variable voltage source 3114 by the adder 3212, and supplied to the DC level control means 3111. By doing this, the amplitude and DC level of the picture B to be composed can be controlled independently.

Figure 59:
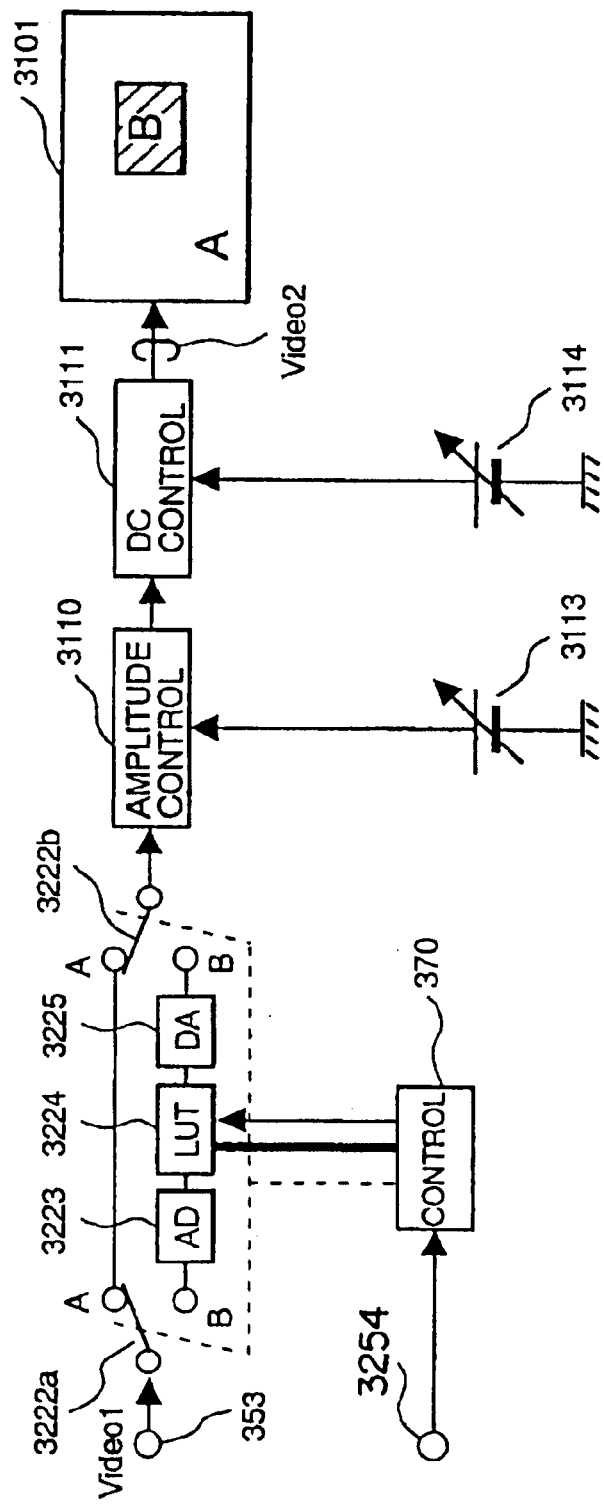
FIG. 59 is a block diagram showing an actual example of the image display means in the twenty-fourth embodiment of the image display system and image display device of the present invention.

FIG. 59 is a block diagram showing an actual example of the picture display means in the twenty-fourth embodiment of the image display system and image display of the present invention. Numeral 370 indicates a controller, 3222a and 3222b change-over switches, 3223 an analog to digital converter, 3224 an LUT, 3225 a digital to analog converter, and 3454 an input terminal and the same numeral is assigned to each of the parts corresponding to those shown in FIG. 49 so as to omit duplicated explanation.

The whole constitution of this embodiment is also the same as that shown in FIG. 48. However, as in the actual example shown in FIG. 38, the brightness level of the picture B to be composed is controlled by data conversion by the LUT.

In FIG. 59, under control of the controller 370 to which data is supplied from the input terminal 3454, the change-over switches 3222a and 3222b are closed on the B side in the composition position of the picture B and in the other position, they are closed on the A side. When the changeover switches 3222a and 3222b are closed on the A side, the picture signal Video.1 inputted from the input terminal 353 is supplied directly to the amplitude control means 3110. However, when the change-over switches 3222a and 3222b are closed on the B side, the picture signal Video.1 is converted to digital data by the analog to digital converter 3223, converted to data having the desired amplitude and DC level by the LUT 3224, converted to an analog video signal by the digital to analog converter 3225, and then supplied to the amplitude control means 3110.

Data is rewritten by the LUT 3224 on the basis of information inputted from the input terminal 3454 via the controller 370.

Figure 60:
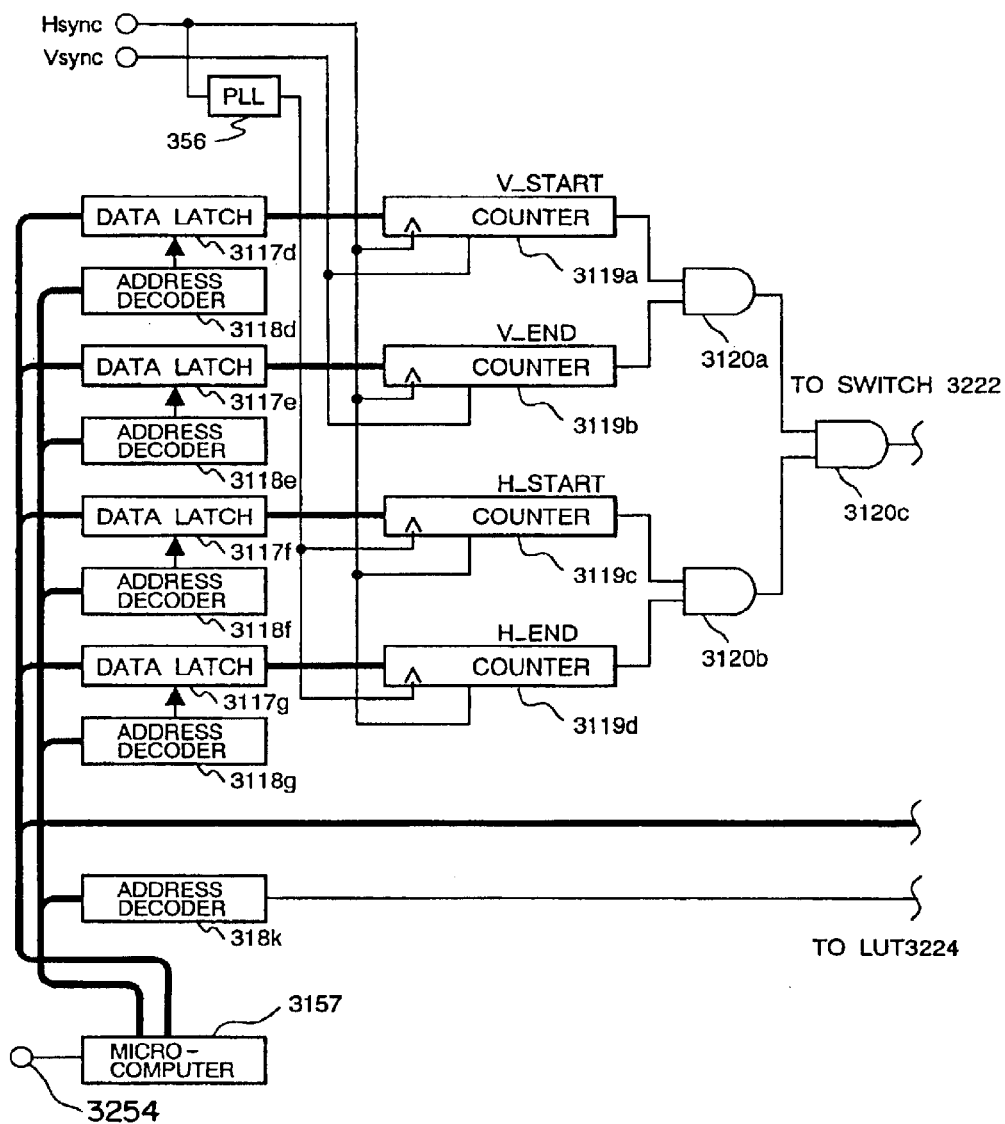
FIG. 60 is a block diagram showing an actual example of the control circuit shown in FIG. 59.

FIG. 60 is a block diagram showing an actual example of the controller 370 shown in FIG. 59. Numeral 18k indicates an address counter and 3157 a micro computer and the same numeral is assigned to each of the parts corresponding to those shown in FIG. 54.

In the drawing, the portions of the change-over switches 3222a and 3222b shown in FIG. 59 for generating a switching control signal have the same constitution as that shown in FIG. 54. In this actual example, the data rewriting means of the LUT 3224 is added to this constitution.

Namely, the micro computer 3157 decodes the composition position on the basis of data from the input terminal 3454 and outputs data to be written by the LUT 3224 and address data indicating the rewriting position thereof. The data is supplied to the LUT 3224 (FIG. 59) and the address data is decoded by the address decoder 18k and supplied to the LUT 3224 at the same time.

According to this embodiment, needless to say, not only the amplitude and DC level of a video signal but also the gamma characteristic and hue thereof can be changed.

Figure 61:
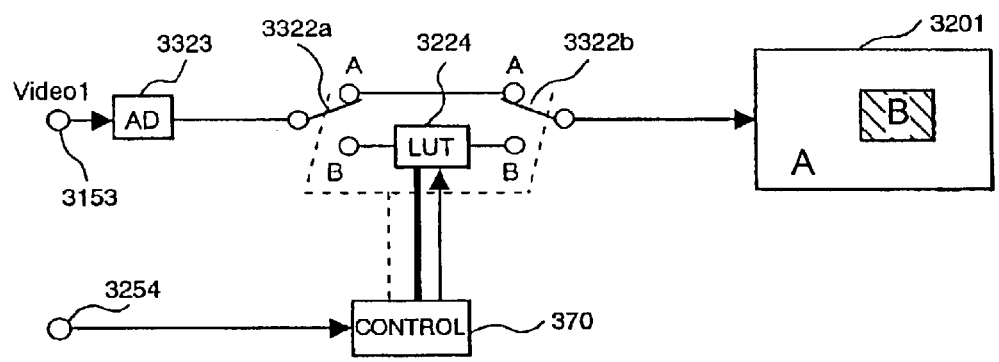
FIG. 61 is a block diagram showing an actual example of the image display means in the twenty-fifth embodiment of the image display system and image display device of the present invention.

FIG. 61 is a block diagram showing an actual example of the picture display means in the twenty-fifth embodiment of the image display system and image display of the present invention. Numeral 3135 indicates an input terminal, 3201 a picture display device, 3254 an input terminal, 3322a and 3322b change-over switches, and 3323 an analog to digital converter and the same numeral is assigned to each of the parts corresponding to those shown in FIG. 59 so as to omit duplicated explanation.

The whole constitution of this embodiment is also the same as that shown in FIG. 48 and as in the actual example shown in FIG. 59, the brightness level of the picture B to be composed is controlled by data conversion by the LUT. However, as a picture display device, a digital video signal is inputted like a matrix type display including a liquid crystal display or a plasma display.

In FIG. 61, the picture display device 3201 inputs such a digital video signal. A video signal Video.1 inputted from the input terminal 3153 is converted to a digital signal by the analog to digital converter 3223. Under control of the controller 370, the change-over switches 3322a and 3322b are switched on the B side in the composition position of the picture B, and the digital video signal from the analog to digital converter 3323 is converted in data by the LUT 3224 so that the brightness level is controlled and then supplied to the picture display device 201, and in the time zone other than the picture B, the change-over switches 3322a and 3322b are switched on the A side, and the digital video signal from the analog to digital converter 3323 is supplied directly to the picture video display 3201.

This embodiment has an advantage that many parts are not required and the cost is decreased.

Figure 62:
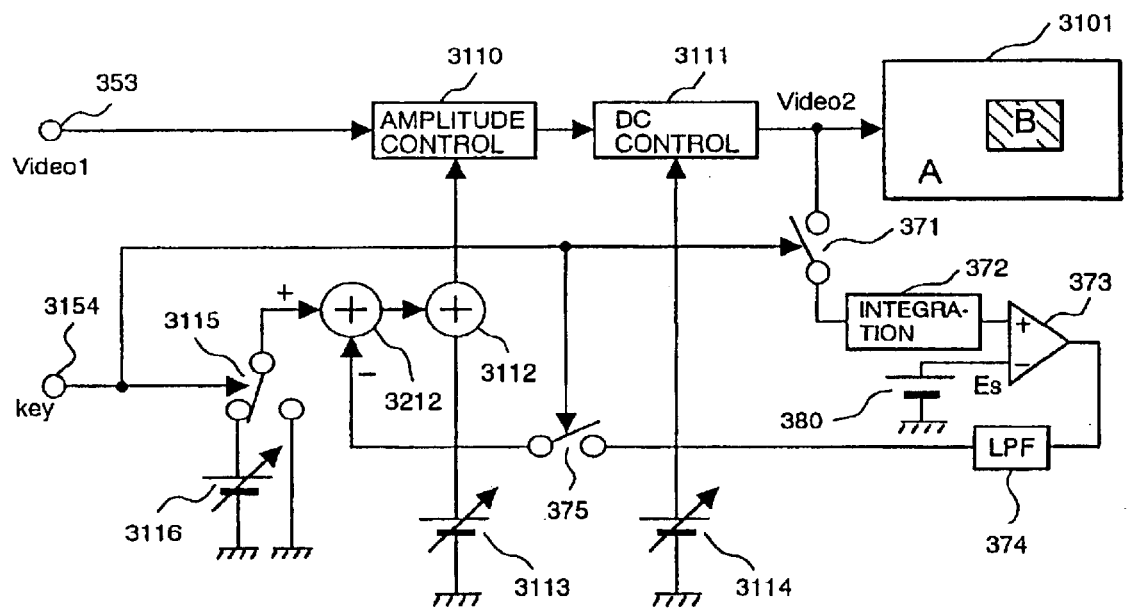
FIG. 62 is a block diagram showing an actual example of the image display means in the twenty-sixth embodiment of the image display system and image display device of the present invention.

FIG. 62 is a block diagram showing an actual example of the picture display means in the twenty-sixth embodiment of the image display system and image display of the present invention. Numeral 371 indicates a switch, 372 an integrator, 373 a comparator, 374 an LPF (low pass filter), 375 a switch, 380 a reference power source, and 3212 an adder and the same numeral is assigned to each of the parts corresponding to those shown in FIG. 51 so as to omit duplicated explanation.

The whole constitution of this embodiment is also the same as that shown in FIG. 48. However, the mean brightness level of the picture. B in the composition portion is kept constant. For example, in a cathode ray tube, when the mean brightness is extremely increased and a beam current flows extremely, it will affect the life time of the cathode ray tube, so that the aforementioned means is required. Even in a plasma display device, the means is necessary for prevention of abnormal generation of heat.

In FIG. 62, by a timing signal key from the input terminal 3154, the switches 371 and 375 are closed only in the time zone of the picture B, and an input video signal Video2 of the picture display device 3101 is supplied to the integrator 372 in this time zone, and the mean level of the video signal Video2 during the period of the picture B is detected. This mean level is compared with the reference voltage Es of the reference power source 380 by the comparator 373. This reference voltage Es is set at a value equal to the maximum allowable value of the mean level of the video signal Video2. The pulsation component is excluded from the output of the comparator 373, that is, the comparison result by the LPF 374, and the remainder is supplied to the adder 3212 via the switch 375, and the voltage from the LPF 374 is subtracted from the voltage of the variable power source 3116 which is supplied only the period of the picture B. The output voltage of the adder 3212 is added to the voltage of the variable power source 3113 by the adder 3112 and supplied to the amplitude control means 3110.

According to the present invention having the aforementioned constitution, negative feedback control is applied to the brightness level of the picture B to be composed.

Therefore, for example, assuming that since the voltage of the variable power source 3116 is set too high, the mean brightness level of the composition picture B becomes higher than the reference voltage Es which is set in the reference power source 380, the brightness of only the composition picture B is controlled by the aforementioned negative feedback control.

As a result, by keeping the brightness level of the portion of the picture A constant, the brightness of only the composition picture B can be controlled. Therefore, for example, when the picture A is a text screen and the picture B is a television screen, a bright and clear television screen and a readable text screen with a controlled brightness can be displayed at the same time. Furthermore, even if the brightness of the composition picture B is adjusted too high, the mean brightness is kept lower than the predetermined value.

In the case of a cathode ray tube, needless to say, a video signal is not set as an object for detection as mentioned above but a beam current from the anode may be detected and subjected to negative feedback control because it is generally executed.

Figure 63:
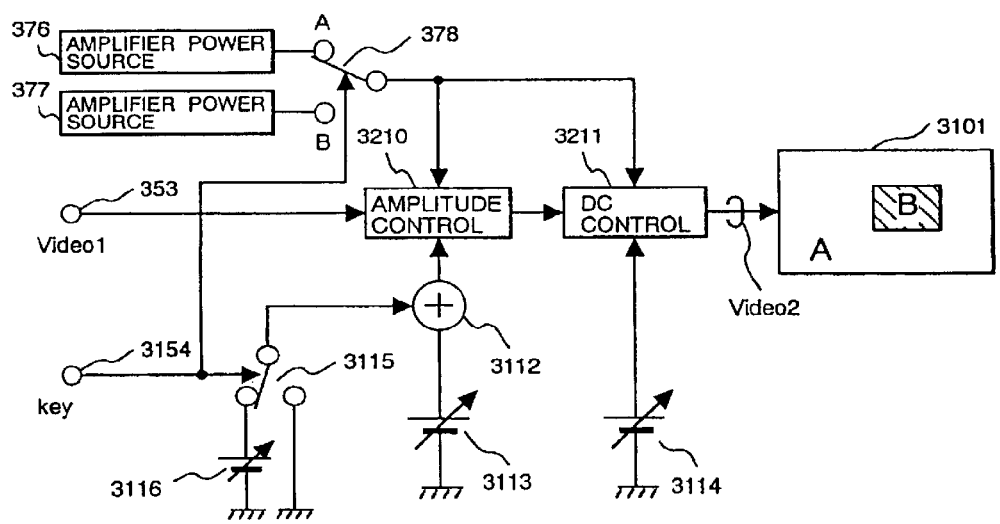
FIG. 63 is a block diagram showing an actual example of the image display means in the twenty-seventh embodiment of the image display system and image display device of the present invention.

FIG. 63 is a block diagram showing an actual example of the picture display means in the twenty-seventh embodiment of the image display system and image display of the present invention. Numeral 376 and 377 indicate amplifier power sources, 378 a change-over switch, 3210 an amplitude control means, and 3211 a DC level control means and the same numeral is assigned to each of the parts corresponding to those shown in FIG. 51 so as to omit duplicated explanation.

The whole constitution of this embodiment is also the same as that shown in FIG. 48. However, as shown in FIG. 63, the supply voltages for the amplitude control means 3210 and the DC level control means 3211 are increased only during the display period of the picture B in the composition portion so as to reserve the amplitude of the video signal Video1. By doing this, an unnecessary DC bias voltage can be eliminated so as to reduce the loss and enlargement of the display set due to an increase in heat capacity can be prevented.

In this case, it is assumed that the supply voltage from the amplifier power source 376 is higher than the supply voltage from the amplifier power source 377.

Next, the operation of this actual example will be explained.

By a timing signal key from the input terminal 3154, the change-over switch 378 is closed on the A side in the time zone of the picture B and the supply voltages are supplied to the amplitude control means 3210 and the DC level control means 3211 from the amplifier power source 376. In other than the time zone of the picture B, the change-over switch 378 is closed on the B side and the supply voltages are supplied to the amplitude control means 3210 and the DC level control means 3211 from the amplifier power source 377.

By doing this, in the time zone of the picture B, the amplitude of the input video signal Video2 of the picture display device 3101 is reserved at a high DC bias voltage and in other than the time zone of the picture B, the loss can be suppressed at a lower DC bias voltage.

By doing this, a practical display set for controlling the brightness of only the composition picture B can be realized.

Needless to say, as the picture display device 3101 mentioned above, any display device such as not only a direct viewing type cathode ray tube and a projection type cathode ray tube but also a liquid crystal display and a plasma display may be used.

As explained above, according to the present invention shown in Embodiments 13 to 27, the brightness of only a composition picture can be controlled, so that when television images such as natural images are composed and displayed in computer images of characters and figures, a bright and clear television screen and a readable text screen with a controlled brightness can be displayed at the same time. Furthermore, the brightness of an output image in another embodiment of the present invention can be increased and adjusted when necessary.

Next, the embodiments mainly corresponding to the fourth object mentioned above will be described in detail.

Figure 64:
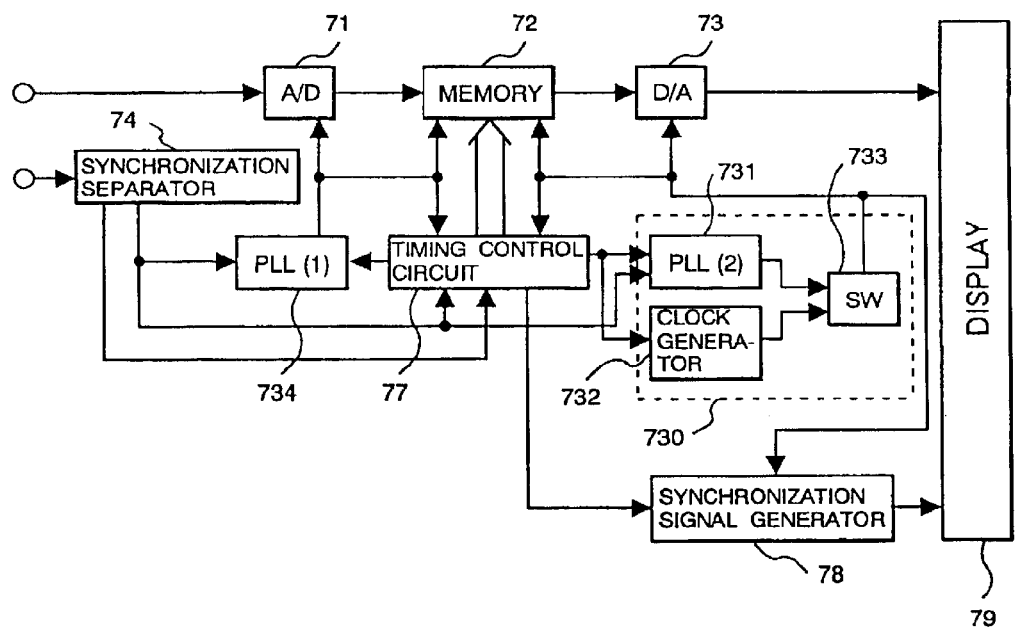
FIG. 64 is a block diagram of the display device shown in the twenty-eighth embodiment of the present invention.

FIG. 64 is a block diagram showing the twenty-eighth embodiment of the display device of the present invention. In FIG. 64, numeral 71 indicates an analog to digital converter, 72 a memory, 73 a digital to analog converter, 74 a synchronization separator, 734 a first PLL (phase locked loop) circuit (1) constituting the writing side clock generator, 730 a reading side clock generator comprising a second PLL circuit (2) 731, an independent asynchronous clock generator 732, and a manual type selection switch 733, 77 a timing control circuit, 78 a synchronizing signal generator, and 79 a display including a deflection circuit and a video circuit.

Next, the operation of the display device having the aforementioned constitution will be explained. An input video signal under various specifications of computers is inputted to the analog to digital converter 71 and an input synchronizing signal is inputted to the synchronization separator 74 and separated into an input horizontal synchronizing signal and an input vertical synchronizing signal. The first PLL circuit (1) 734 whose output frequency is set by the timing control circuit 77 generates a writing side clock signal which is synchronized in phase with an input horizontal synchronizing signal to be inputted at a frequency fWCLK which is n times (n: a natural number) of the frequency $f_H$ of the input horizontal synchronizing signal and supplies it to the analog to digital converter 71, the memory 72, and the timing control circuit 77. The second PLL circuit (2) 731 which is a component of the reading side clock generator 730 whose output frequency is set by the timing control circuit 77 generates a reading side clock signal (1) which is synchronized in phase with an input vertical synchronizing signal to be inputted at a frequency fRCLK which is m times (m: a natural number) of the frequency $f_H$ of the input vertical synchronizing signal. The asynchronous clock generator 732 whose output frequency is controlled by the timing control circuit 77 generates a reading side clock signal (2) in asynchronization with an input horizontal synchronizing signal and at a frequency fRCLK which is m times (m: a natural number) of the frequency $f_H$ of the input horizontal synchronizing signal. Furthermore, the selection switch 733 selects one of the generated reading side clock signals (1) and (2) mentioned above and supplies it to the digital to analog converter 73, the memory 72, and the timing control circuit 77 as a reading side clock signal. The analog to digital converter 71 samples the input video signal on the basis of the writing side clock signal, generates digital data, and outputs it to the memory 72. The memory 72 writes and stores the digital data on the basis of the writing side clock signal and a control signal from the timing control circuit 77, reads the digital data on the basis of the reading side clock signal which is selected and outputted from the selection switch 733 and the control signal from the timing control circuit 77, and supplies it to the digital to analog converter 73. The digital to analog converter 73 converts the digital data to an output video signal in the analog form on the basis of the reading side clock signal and supplies it to the display 79. The synchronizing signal generator 78 is controlled by the timing control circuit 77, generates an output synchronizing signal using the reading side clock signal selected by the selection switch 733, and supplies it to the deflection circuit of the display 79.

As an actual operation, for example, when a signal including an extremely unstable phase and frequency jitter such as a VTR or a television broadcast in a bad receiving state is inputted, the selection switch 733 is set so as to select and output the reading side clock signal (2). When a signal of an LD (laser disk) or a computer which is comparatively stable is inputted, the selection switch 733 is set so as to select and output the reading side clock signal (1).

According to the present invention having the aforementioned constitution, even if a signal including a phase and a frequency jitter is inputted, the phase and frequency jitter are excluded from the reading side clock signal (⅒ or less of the period of the writing side clock signal) and as a result, the. display 79 can display a satisfactory image.

Figure 65:
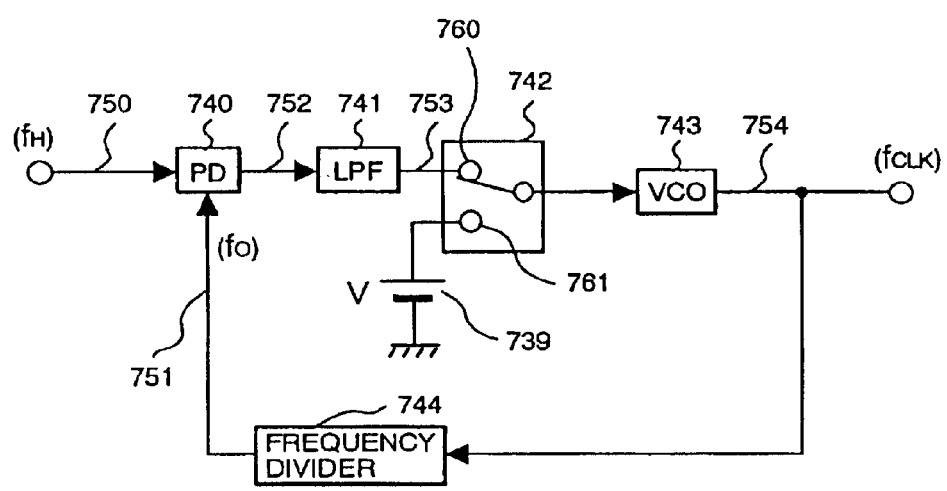
FIG. 65 is a block diagram of a deformation example of the reading side clock generator in the twenty-eighth embodiment shown in FIG. 64.

FIG. 65 shows a deformation example of the reading side clock generator 730 in the display device which is the twenty-eighth embodiment shown in FIG. 64. In FIG. 65, numeral 739 indicates a constant voltage source, 740 a phase comparator, 741 a low pass filter, 742 a manual operation type selection switch, 743 a voltage control oscillator, and 744 a frequency divider.

Next, the operation of the reading side clock generator 730 which is structured like this will be explained. Firstly, a case that a comparatively stable signal is inputted from a LD (laser disk) or a computer will be explained. The phase comparator 740 inputs an input horizontal synchronizing signal 750 ($f_H$) and an output signal 751 ($f_O$) of the frequency divider 744 which will be described later and compares the phases of the two input signals. The low pass filter 741 processes a phase comparison output signal 752 outputted from the phase comparator 740 so as to take out a low frequency component signal 753 and supplies it to one input terminal 760 of the selection switch 742. The other input terminal 761 of the selection switch 742 inputs the voltage of the constant voltage source 732. When an input signal is a comparatively stable signal like this example, the selection switch 742 is set so as to select the input terminal 760. Therefore, the voltage control oscillator 743 inputs the low frequency component signal 753 as a control voltage. By doing this, the oscillation frequency of the voltage control oscillator 743 is controlled according to the phase difference between two input signals inputted to the phase comparator 740 and the voltage control oscillator 743 generates a reading side clock signal 754 which coincides with the input horizontal synchronizing signal 750 in phase. The frequency divider 744 inputs this reading side clock signal 754 and feeds back the output signal 751 which is divided by M (M: a natural number) to the phase comparator 740 as mentioned above. As a result, the reading side clock signal 754 in the phase locked state whose frequency $f_{RCLK}$ is M times of the frequency $f_H$ of the input horizontal synchronizing signal 750 as a reference signal and whose phase coincides with that of the input horizontal synchronizing signal 750 is obtained from the voltage control oscillator 743. Namely, this reading side clock generator 730 functions as a PLL (phase locked loop) circuit.

On the other hand, a case that a signal including a phase and frequency jitter in an extremely unstable state such as a VTR or a television broadcast in a bad receiving state is inputted will be explained. In this case, the selection switch 742 is set so as to select the input terminal 761. Therefore, the voltage control oscillator 743 generates the reading side clock signal 754 whose oscillation frequency fCLK is controlled at a voltage V generated from the constant voltage source 739. Namely, in this setting, the reading side clock generator 730 does not operate as a PLL circuit but operates as an oscillation circuit whose frequency fCLK is fixed. When an NTSC signal of a VTR or a television broadcast in a bad receiving state is an input signal, a voltage V of the constant voltage source 732 is set so that the voltage control oscillator 743 oscillates at a frequency $f_{CLK}$ which is N times (N≧2) of that of a color subcarrier ($f_{SC}$=3.579545 MHz) of the NTSC signal.

According to the present invention having the aforementioned constitution, even if a signal including a phase and a frequency jitter is inputted, the reading side clock signal 754 can become a satisfactory clock signal having little phase and frequency jitter (⅒ or less of the period $f_{CLK}$).

Figure 66:
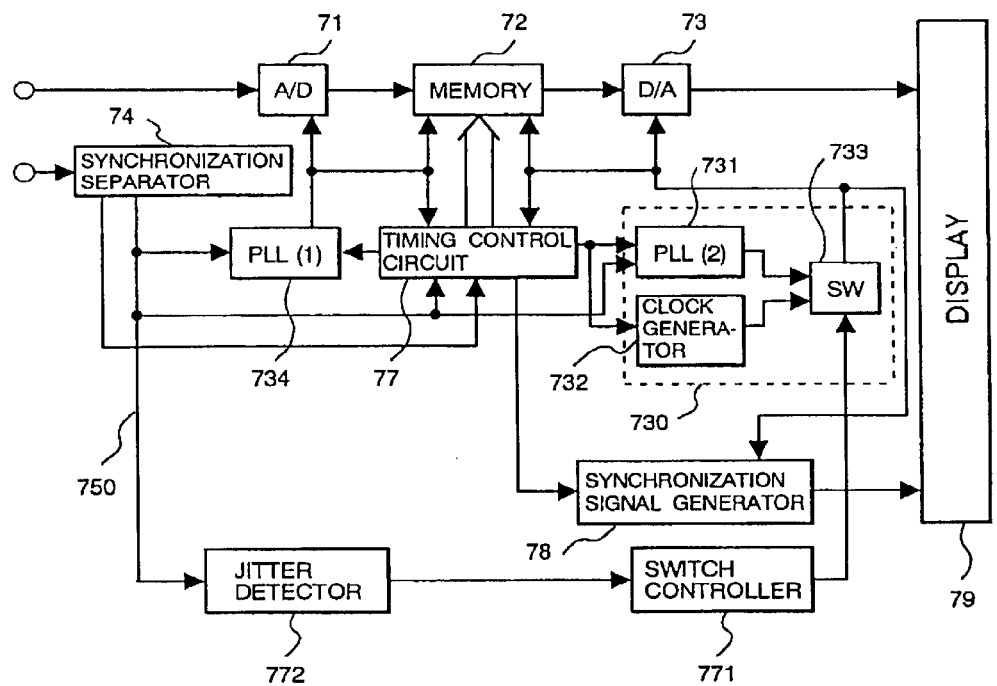
FIG. 66 is a block diagram of the display device showing the twenty-ninth embodiment of the present invention.

FIG. 66 is a block diagram showing the twenty-ninth embodiment of the image display device of the present invention. This embodiment is an embodiment in which the selection switch 733 in the twenty-eighth embodiment shown in FIG. 64 is devised so as to be automatically controlled. In this embodiment, a jitter detector 772 and a switch controller 771 are added to the constitution of the twenty-eighth embodiment.

The constitution, operation, and effect of the same components as those of the twenty-eighth embodiment shown in FIG. 64, that is, the analog to digital converter 71, the memory 72, the digital to analog converter 73, the synchronization separator 74, the first PLL (phase locked loop) circuit (1) 734, the reading side clock generator 739 comprising the second PKK (2) 731, the asynchronous clock generator 732, and the selection switch 733, the timing control circuit 77, the synchronizing signal generator 78, and the display 79 are common to those of the embodiment shown in FIG. 64. Therefore, the explanation thereof is omitted and the new components will be explained.

The jitter detector 772 inputs the input horizontal synchronizing signal 750, detects the jitter amount thereof, and sends the result to the switch controller 771. The switch controller 771 switches the selection switch 733 according to the jitter amount of the input signal. For example, when an input signal is a signal including a phase and frequency jitter in an extremely unstable state such as a VTR or a television broadcast in a bad receiving state, the jitter detector 772 sends a jitter detection signal indicating "there is a jitter" to the switch controller 771 and the switch controller 771 generates a control signal for switching the selection switch 733 so that the selection switch 733 selects the clock generator 732 according to this jitter detection signal.

When an input signal is a comparatively stable signal such as a signal from an LD (laser disk) or a computer, the jitter detector 772 sends a jitter detection signal indicating "there is no jitter" to the switch controller 771 and the switch controller 771 generates a control signal for switching the selection switch 733 so that the selection switch 733 selects the PLL circuit (2) 731 according to the jitter detection signal.

According to the present invention having the aforementioned constitution, when a signal including a phase and a frequency jitter is inputted, the clock generation characteristic of the reading side clock generator 730 can be switched and controlled automatically so that the reading side clock signal 754 becomes a satisfactory clock signal having little phase and frequency jitter (1/10 or less of the period $f_{CLK}$).

Figure 67:
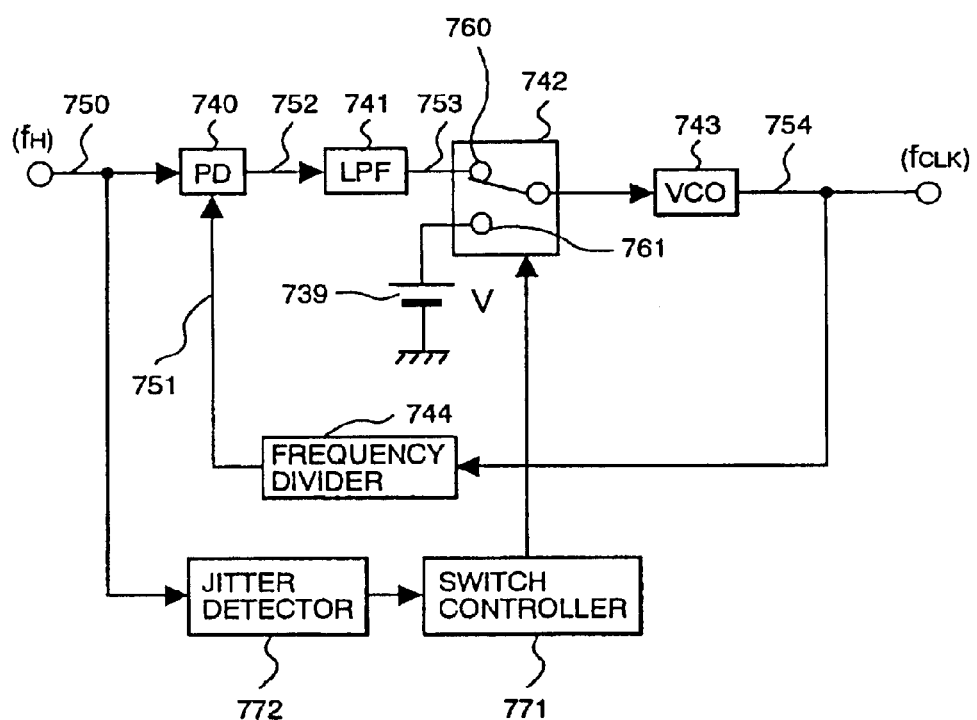
FIG. 67 is a block diagram of a deformation example of the reading side clock generator in the twenty-ninth embodiment shown in FIG. 66.

FIG. 67 shows a deformation example of the reading side clock generator 730 in the display device which is the twenty-ninth embodiment shown in FIG. 66. This deformation example has a constitution in which the jitter detector 772 and the switch controller 771 are added to the constitution of the deformation example shown in FIG. 69. Therefore, the constitution, operation, and effect of the same components as those of the deformation example shown in FIG. 65, that is, the phase comparator 740, the low pass filter 741, the selection switch 742, the constant voltage source 739, the voltage control oscillator 743, and the frequency divider 744 are common to those of the deformation example shown in FIG. 65. Therefore, the explanation thereof is omitted and the new components will be explained.

The jitter detector 772 detects the jitter amount of the input horizontal synchronizing signal 750 at a horizontal scanning frequency of $f_H$ and sends the result to the switch controller 771. The switch controller 771 switches the selection switch 742 according to the jitter amount of the input signal. For example, when an input signal is a signal including a phase and frequency jitter in an extremely unstable state such as a VTR or a television broadcast in a bad receiving state, the jitter detector 772 sends a jitter detection signal indicating "there is a jitter" to the switch controller 771 and the switch controller 771 generates a control signal for switching the selection switch 742 so that the selection switch 742 selects the input terminal 761 side.

When an input signal is a comparatively stable signal such as a signal from an LD (laser disk) or a computer, the jitter detector 772 sends a jitter detection signal indicating "there is no jitter" to the switch controller 771 and the switch controller 771 generates a control signal for switching the selection switch 742 so that the selection switch 742 selects the input terminal 760 according to this jitter detection signal.

According to the present invention having the aforementioned constitution, when a signal including a phase and a frequency jitter is inputted, the clock generation characteristic of the reading side clock generator 730 can be switched and controlled automatically so that the reading side clock signal 754 ($f_{CLK}$) becomes a satisfactory clock signal having no phase and frequency jitter (1/10 or less of the period $f_{CLK}$).

Figure 68:
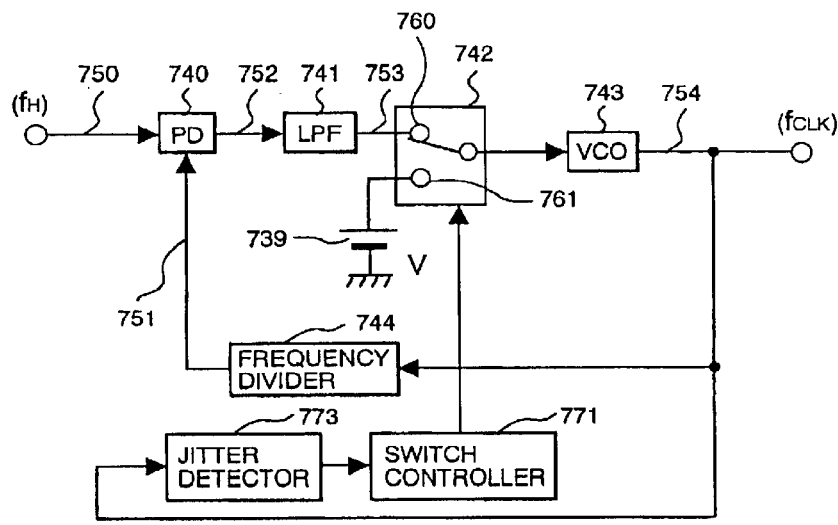
FIG. 68 is a block diagram showing a deformation example of the jitter detection system in the deformation example shown in FIG. 67.

FIG. 68 shows a deformation example of the jitter detection system in the deformation example shown in FIG. 67. This deformation example has a constitution in which a jitter detector 773 for detecting a jitter of the reading side clock signal 754 outputted from the voltage control oscillator 743 and supplying a jitter detection signal to the switch controller 771 is installed. In this deformation example, the constitution, operation, and effect of the same components as those of the deformation example shown in FIG. 67, that is, the phase comparator 740, the low pass filter 741, the selection switch 742, the constant voltage source 739, the voltage control oscillator 743, and the frequency divider 744 are common to those of the deformation example shown in FIG. 67. Therefore, the explanation thereof is omitted and the new components in this deformation example will be explained.

When a new input horizontal synchronizing signal 750 at a horizontal scanning frequency of $f_H$ is inputted, the switch controller 771 controls the selection switch 742 so that the selection switch 742 selects the input terminal 760 side. As a result, the reading side clock generator 730 operates as a PLL circuit and the reading side clock signal 754 outputted from the voltage control oscillator 743 enters the phase lock state in which the frequency is $f_{CLK}$ which is M times of the horizontal scanning frequency $f_H$ of the horizontal synchronizing signal 750 and the phase coincides with that of the horizontal synchronizing signal 750 and this reading side clock signal 754 is inputted to the jitter detector 773. The jitter detector 773 detects the jitter amount of the clock signal 754 and sends the detection result to the switch controller 771. The switch controller 771 switches the selection switch 742 according to the jitter amount of the input signal. For example, when an input signal is a signal including a phase and frequency jitter in an extremely unstable state such as a VTR or a television broadcast in a bad receiving state, the jitter detector 773 detecting this jitter sends a control signal for operating the selection switch 742 so that the selection switch 742 selects the input terminal 761 side to the switch controller 771. After the switch controller 771 switches the selection switch 742 to the input terminal 61, it keeps this state until the input signal is switched. When an input signal is a comparatively stable signal from an LD (laser disk) or a computer, the jitter detector 773 detects no jitter and sends a control signal for operating the selection switch 742 so that the selection switch 742 selects the input terminal 760 to the switch controller 771.

According to the present invention having the aforementioned constitution, even if a signal including a phase and a frequency jitter is inputted, the reading side clock generator 730 can generate the satisfactory reading side clock signal 754 having little phase and frequency jitter (1/10 or less of the period $f_{CLK}$).

In this deformation example, the reading side clock signal 754 is inputted to the jitter detector 773. However, needless to say, even if the output signal 751 of the frequency divider 744 is inputted to the jitter detector 773, the same effect can be obtained.

Figure 69:
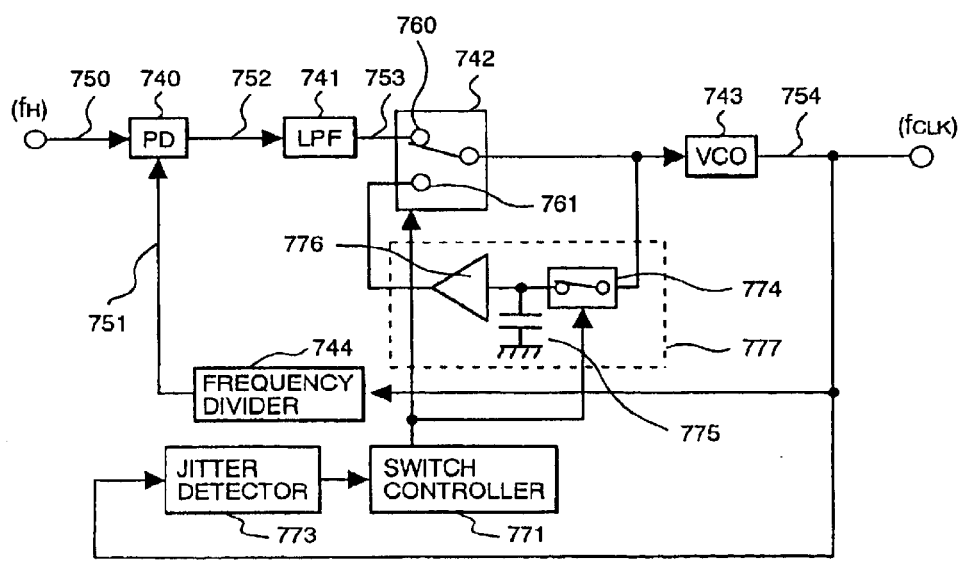
FIG. 69 is a block diagram showing another deformation example of the reading side clock generator in the twentynninth embodiment shown in FIG. 66.

FIG. 69 shows still another deformation example of the reading clock generator 730 in the display device which is the twenty-ninth embodiment shown in FIG. 66. This deformation example uses a sample hold unit 777 comprising a sampling switch 774, a hold condenser 775, and a buffer amplifier 776 instead of the constant voltage source 739 in the deformation example shown in FIG. 68. In this deformation example, the constitution, operation, and effect of the same components as those of the deformation example shown in FIG. 68, that is, the phase comparator 740, the low pass filter 741, the selection switch 742, the voltage control oscillator 743, and the frequency divider 744 are common to those of the deformation example shown in FIG. 68. Therefore, the explanation thereof is omitted and the new components in this deformation example will be explained.

When a new input horizontal synchronizing signal 750 at a horizontal scanning frequency of $f_H$ is inputted, the switch controller 771 controls the selection switch 742 and the sampling switch 774 so that the selection switch 742 selects the input terminal 760 side and the sampling switch 774 enters the ON state. As a result, the reading side clock generator 730 operates as a PLL circuit. The hold condenser 775 is charged up to the control voltage of the voltage control oscillator 743 at which the PLL circuit enters the lock state. As a result, this control voltage is supplied to the input terminal 761 of the selection switch 742. The reading side clock signal 754 outputted from the voltage control oscillator 743 enters the phase lock state in which the frequency is $f_{CLK}$ which is M times of the horizontal scanning frequency $f_H$ of the horizontal synchronizing signal 750 and the phase coincides with that of the horizontal synchronizing signal 750 and this reading side clock signal 754 is inputted to the jitter detector 773. The jitter detector 773 detects the jitter amount of the clock signal and sends the result to the switch controller 771. The switch controller 771 switches the selection switch 742 and the sampling switch 774 according to the magnitude of the jitter amount of the input signal. For example, when an input signal is a signal including a phase and frequency jitter in an extremely unstable state such as a VTR or a television broadcast in a bad receiving state, the jitter detector 773 detecting this jitter sends a control signal for operating the selection switch 742 and the sampling switch 774 so that the selection switch 742 selects the input terminal 761 side and the sampling switch 774 enters the OFF state to the switch controller 771. When an input signal is a comparatively stable signal like a signal from an LD (laser disk) or a computer, the jitter detector 773 detects no jitter and sends a control signal for operating the selection switch 742 and the sampling switch 774 so that the sampling switch 774 enters the ON state when the selection switch 742 selects the input terminal 760 side to the switch controller 771. Even if an input signal is a comparatively stable signal from an LD (laser disk), when the synchronizing signal is interrupted instantaneously due to a defect of the LD, the switch controller 771 operates so that the selection switch 742 selects the input terminal 761 side only the moment the synchronizing signal is interrupted and the sampling switch 777 enters the OFF state at the same time.

According to the present invention having the aforementioned constitution, even if a signal including a phase and a frequency jitter is inputted, the reading side clock generator 730 can generate the satisfactory reading side clock signal 754 having little phase and frequency jitter (1/10 or less of the period $f_{CLK}$). Even if the phase and frequency of an input signal are instantaneously disordered or a signal is interrupted, the reading side clock signal 754 is generated without interruption.

In this deformation example, the reading side clock signal 754 is inputted to the jitter detector 773. However, needless to say, even if the output signal 751 of the frequency divider 744 is inputted to the jitter detector 773, the same effect can be obtained.

Figure 70:
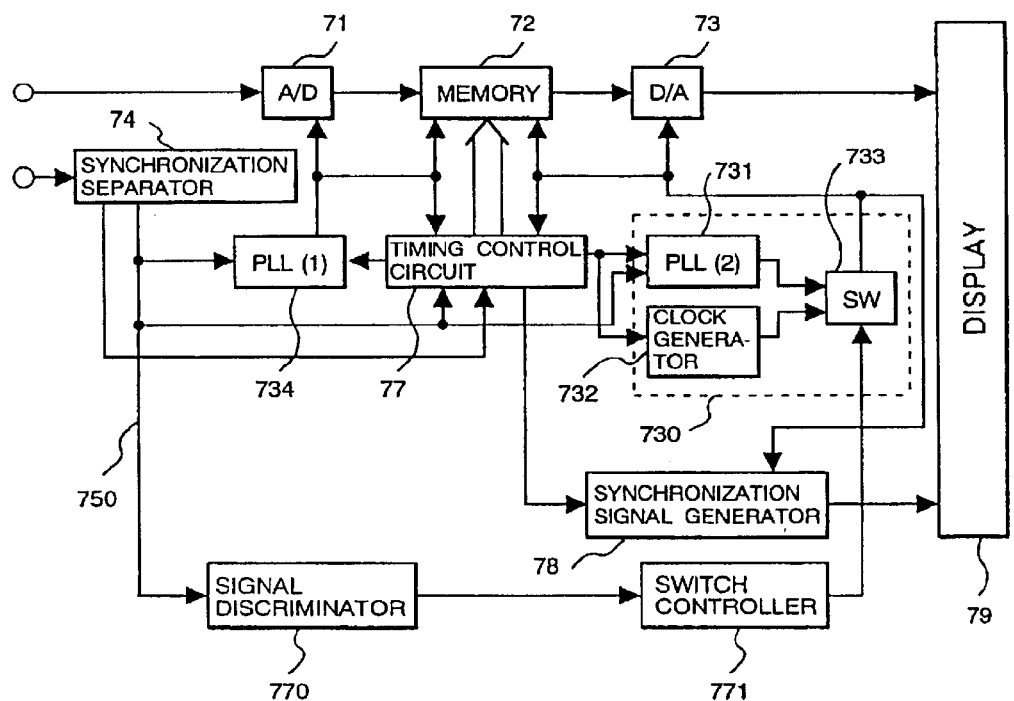
FIG. 70 is a block diagram of the display device showing the thirtieth embodiment of the present invention.

FIG. 70 is a block diagram showing the thirtieth embodiment of the image display device of the present invention. This embodiment is an embodiment in which the selection switch 733 in the twenty-eighth embodiment shown in FIG. 68 is devised so as to be automatically controlled. Concretely, a signal discriminator 770 is installed in place of the jitter detector 772 in the twenty-ninth embodiment shown in FIG. 66 and the switch controller 771 controls the selection switch 733 on the basis of the discrimination result thereof. The switch controller 771 is structured so as to control the selection switch 733 so that the selection switch 733 selects an output signal of the asynchronous clock generator 732 when an input signal is a kind of signal having a great potential of including a phase and frequency jitter.

The constitution, operation, and effect of the same components as those of the embodiments shown in FIGS. 64 and 66, that is, the analog to digital converter 71, the memory 72, the digital to analog converter 73, the synchronization separator 74, the first PLL (phase locked loop) circuit (1) 734, the reading side clock generator 730 comprising the second PKK (2) 731, the asynchronous clock generator 732, and the selection switch 733, the timing control circuit 77, the synchronizing signal generator 78, and the display 79 are the same as those of the embodiments mentioned above. Therefore, the explanation thereof is omitted and the new components will be explained.

The signal discriminator 770 discriminates the kind of an input video signal inputted to the display device on the basis of an input horizontal synchronizing signal at a horizontal scanning frequency of $f_H$ and sends the result to the switch controller 771. The switch controller 771 switches the selection switch 733 according to the kind of the input signal. For example, when an inputted signal is an NTSC signal, the signal discriminator 770 discriminates that the signal is an NTSC signal and the switch controller 770 generates a control signal for switching the selection switch 733 so that the selection switch 733 selects and outputs an output signal of the asynchronous clock generator 732 on the basis of the discrimination result.

When an inputted signal is a computer signal, the signal discriminator 770 discriminates that the signal is a computer signal and the switch controller 771 generates a control signal for switching the switch selection switch 733 so that the selection switch 733 selects an output signal of the second PLL circuit (2) 731 on the basis of the discrimination result.

According to the present invention having the aforementioned constitution, when a kind of signal having a great potential of including a phase and frequency jitter is inputted, the reading side clock generator 730 can be automatically switched so as to generate a satisfactory reading side clock signal having little phase and frequency jitter (1/10 or less of the period $f_{CLK}$).

Figure 71:
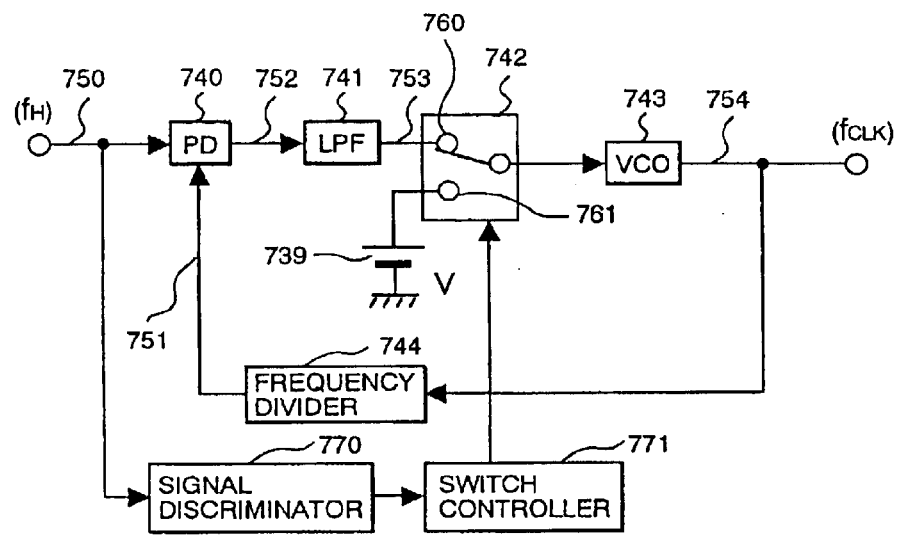
FIG. 71 is a block diagram of a deformation example of the reading side clock generator in the thirtieth embodiment shown in FIG. 70.

FIG. 71 shows a deformation example of the reading clock generator 730 in the display device which is the thirtieth embodiment shown in FIG. 70. This deformation example is structured so that the jitter detector 772 in the deformation example shown in FIG. 67 is replaced with the signal discriminator 772 and the switch controller 771 controls the selection switch 742 according to the kind of signal. Therefore, the constitution, operation, and effect of the same components as those of the deformation example shown in FIG. 67, that is, the phase comparator 740, the low pass filter 741, the selection switch 742, the constant voltage source 739, the voltage control oscillator 743, and the frequency divider 744 are the same as those of the deformation example shown in FIG. 67. Therefore, the explanation thereof is omitted and the new components will be explained.

The signal discriminator 770 discriminates the input horizontal synchronizing signal 750 at a horizontal scanning frequency of $f_H$ and discriminates the kind of a video signal inputted to the display device and sends the discrimination result to the switch controller 771. The switch controller 771 switches the selection switch 742 according to the kind of the input signal. For example, when an inputted signal is an NTSC signal, the signal discriminator 770 discriminates that the signal is an NTSC signal and the switch controller 771 generates a control signal for controlling the selection switch 742 so that the selection switch 742 selects the input terminal 761 side. When an inputted signal is a computer signal, the signal discriminator 770 discriminates that the signal is a computer signal and the switch controller 771 generates a control signal for controlling the selection switch 742 so that the selection switch 742 selects the input terminal 760 side.

According to the present invention having the aforementioned constitution, even if a signal having a S great potential of including a phase and frequency jitter is inputted, a satisfactory clock signal having little phase and frequency jitter (1/10 or less of the period $f_{CLK}$) can be generated.

Figure 30:
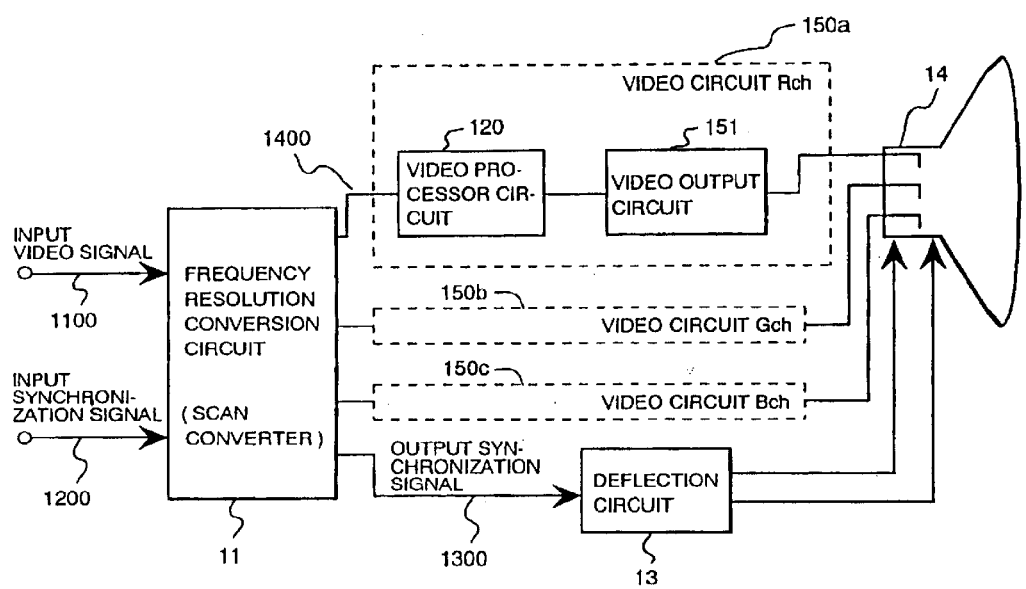
FIG. 30 is a block diagram showing the rough constitution of a display device by the prior art.
Figure 72:
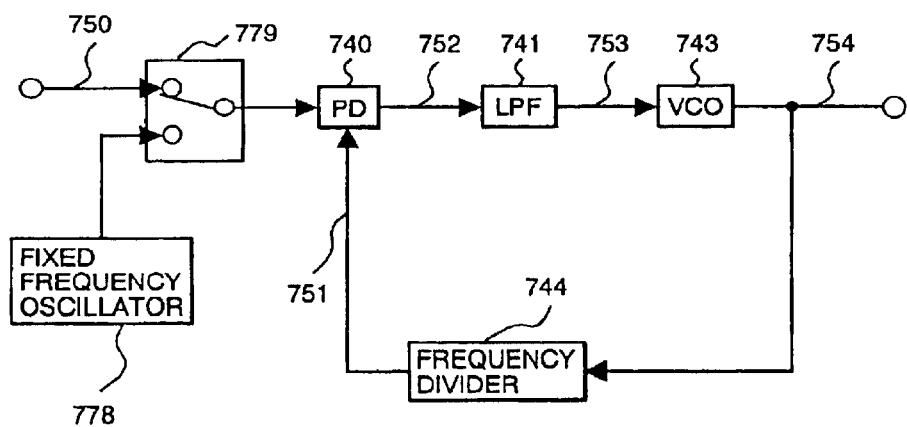
FIG. 72 is a block diagram showing a deformation example of the reading side clock generator which can be applied to the display devices in the twenty-eighty to thirtieth embodiments shown in FIGS. 64, 66, and 70.

FIG. 72 shows a deformation example of the reading clock generator 730 which can be applied to the display devices in the twenty-eighth to thirtieth embodiments shown in FIGS. 28, 30, and 70. In this deformation example, numeral 740 indicates a phase comparator, 741 a low pass filter, 743 a voltage control oscillator, 744 a frequency divider, 779 a selection switch, and 778 a fixed frequency oscillator.

The operation of the reading side clock generator 730 which is structured like this when a comparatively stable signal is inputted from an LD (laser disk) or a computer will be explained hereunder. In this case, the selection switch 779 is connected so as to select the input horizontal synchronizing signal 750 at a horizontal scanning frequency of $f_H$ by the switch controller 771 which is explained in the embodiments shown in FIGS. 66 and 70. In this case, the phase comparator 740 inputs the input horizontal synchronizing signal 750 at a horizontal scanning frequency of $f_H$ and the output signal 751 ($f_O$) of the frequency divider 744 which will be described later and compares the phases of the two input signals. The phase comparison output signal 752 outputted from this phase comparator 740 is processed by the low pass filter 741 so as to take out the low frequency component 753 and supplied to the voltage control oscillator 743. By doing this, the oscillation frequency of the voltage control oscillator 743 is controlled according to the phase difference between the two input signals to the phase comparator 740 and the reading side clock signal 754 ($f_{CLK}$) whose phase coincides with the phase of the input horizontal synchronizing signal 750 at a horizontal scanning frequency $f_H$ is generated from the voltage control oscillator 743. This reading side clock signal 754 is fed back to the phase comparator 740 as the output signal 751 ($f_f$) which is inputted to the frequency divider 744 and divided by M (M: a natural number) as mentioned above and used for phase comparison. As a result, the reading side clock signal 754 ($f_{CLK}$) in the phase locked state whose frequency is M times of the horizontal scanning frequency $f_H$ of the input horizontal synchronizing signal 750 as a reference signal and whose phase coincides with that of the input horizontal synchronizing signal 750 is obtained from the voltage control oscillator 743. Namely, the reading side clock generator 730 functions as a PLL (phase locked loop) circuit.

Next, the operation when a signal including a phase and frequency jitter in an extremely unstable state such as a VTR or a television broadcast in a bad receiving state is inputted will be explained. In this case, the selection switch 779 is controlled by the switch controller 771 so as to select the fixed frequency oscillator 778. As a result, a clock outputted from the fixed frequency oscillator 778 and the output signal 751 ($f_O$) of the frequency divider 744 which will be described later are inputted to the phase comparator 740 so as to be compared in phase. The phase comparison output signal 752 outputted from this phase comparator 740 is processed by the low pass filter 741 so as to take out the low frequency component 753 and supplied to the voltage control oscillator 743. By doing this, the oscillation frequency of the voltage control oscillator 743 is controlled according to the phase difference between the two input signals to the phase comparator 740 and the reading side clock signal 754 ($f_{CLK}$) whose phase coincides with the phase of the clock outputted from the fixed frequency oscillator 778 is generated from the voltage control oscillator 743. This reading side clock signal 754 is fed back to the phase comparator 740 as the output signal 751 ($f_f$) which is inputted to the frequency divider 744 and divided by M (M: a natural number) as mentioned above and used for phase comparison. As a result, the reading side clock signal 754 ($f_{CLK}$) in the phase locked state whose frequency is M times of the frequency of the clock outputted from the fixed frequency oscillator 778 as a reference signal and whose phase coincides with that of the clock is obtained from the voltage control oscillator 743. Namely, the reading side clock generator 730 functions as a PLL (phase locked loop) circuit.

When an NTSC signal of a VTR or a television broadcast in a bad receiving state is an input signal, the voltage control oscillator 743 operates at a frequency which is N times ($N \geq 2$) of that of a color subcarrier ($f_{SC}$=3.579545 MHz) of the NTSC signal.

According to the present invention having the aforementioned constitution, even if a signal including a phase and a frequency jitter is inputted, a satisfactory clock signal having little phase and frequency jitter (1/10 or less of the period $f_{CLK}$) can be generated as a reading side clock signal.

In this deformation example, the selection switch 779 is controlled by the jitter detector 772, the signal discriminator 770, and the switch controller 771 in the embodiments explained with reference to FIGS. 66 and 70. However, needless to say, the selection switch 779 can be controlled by applying the jitter detector 773 and the switch controller 771 explained with reference to FIGS. 68 and 69.

Figure 73:
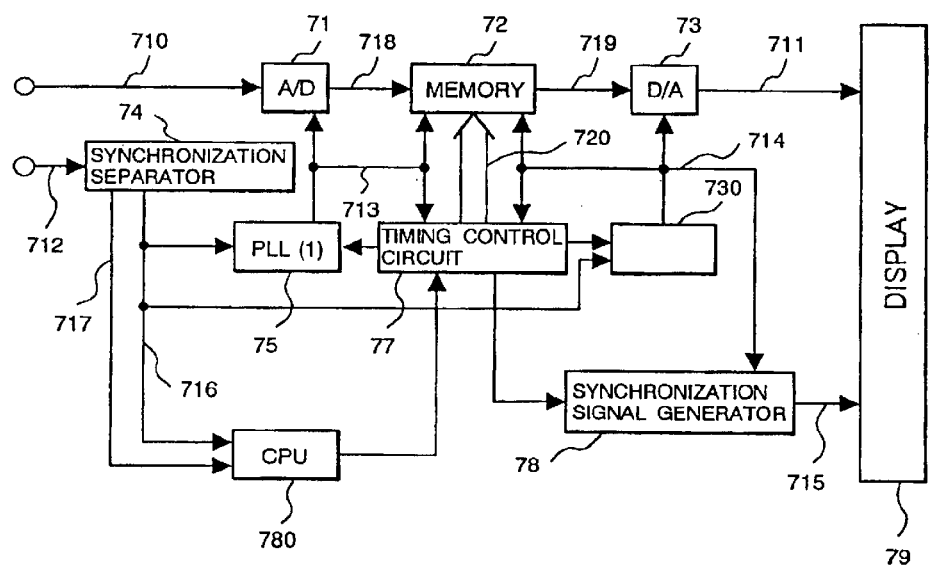
FIG. 73 is a block diagram of the display device showing the thirty-first embodiment of the present invention.
Figure 74:
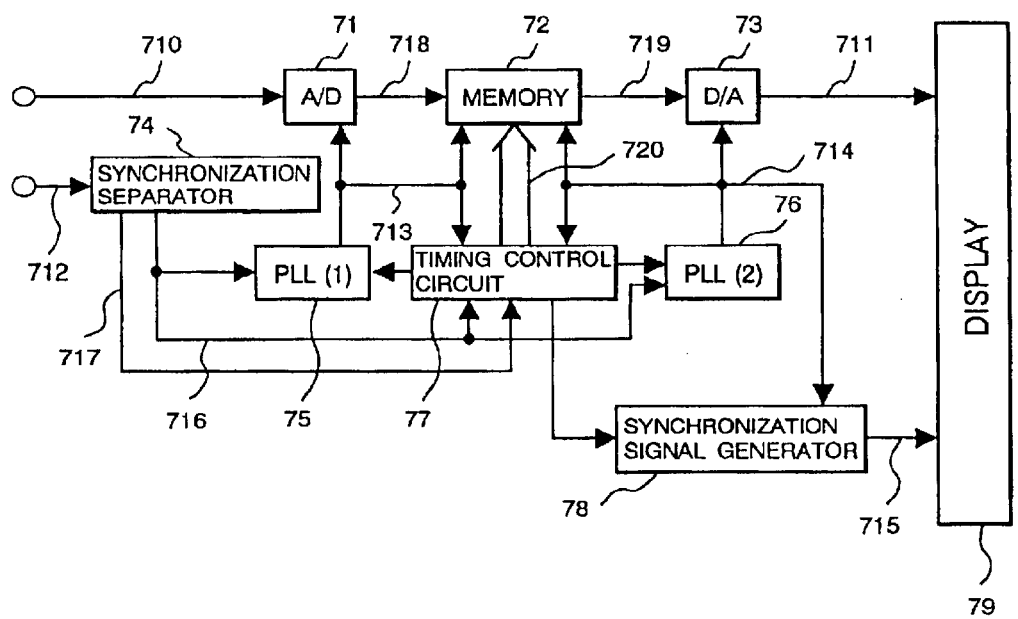
FIG. 74 is a block diagram of a conventional display device.

Next, the thirty-first embodiment of the display device of the present invention will be explained with reference to FIG. 73. In FIG. 73, numeral 71 indicates an an analog to digital converter, 72 a memory, 73 a digital to analog converter, 74 a synchronization separator, 75 a first PLL (phase locked loop) circuit (1), 730 a reading side-clock generator, 77 a timing control circuit, 78 a synchronizing signal generator, 79 a display, and 780 a CPU circuit.

The analog to digital converter 71 inputs the input video signal 710 under various standards from a computer or others and the synchronization separator 74 separates an input horizontal synchronizing signal 716 (horizontal scanning frequency $f_H$) and an input vertical synchronizing signal 717 (vertical scanning frequency $f_V$) from it. The CPU circuit 780 supplies the division ratio data to be set in the first PLL circuit (1) 75, the division ratio data to be set in the second PLL circuit (2) in the reading side clock generator 730, and the control data to the memory 2 to the timing control circuit 77 on the basis of the input horizontal synchronizing signal 716 at a horizontal scanning frequency of $f_H$ and the input vertical synchronizing signal 717 at a vertical scanning frequency of fV and the timing control circuit 77 supplies a control signal on the basis of this data to the first PLL circuit (1) 75, the reading side clock generator 730 (the second PLL circuit (2)), and the memory 72. The first PLL circuit (1) 75 generates a writing side clock signal 713 whose phase is synchronized with that of the input horizontal synchronizing signal 716 and whose frequency is N times (N: a natural number) of the frequency of a horizontal synchronizing signal which is set by the timing control circuit 77 and supplies it to the analog to digital converter 71, the memory 72, and the timing control circuit 77. The reading side clock generator 730 generates a reading side clock signal 714 whose phase is synchronized with that of the input horizontal synchronizing signal 716 and whose frequency is M times (M: a natural number) of that of the input horizontal synchronizing signal and supplies it to the digital to analog converter 73, the memory 72, and the timing control circuit 77. The analog to digital converter 71 supplies digital data 718 which is obtained by sampling the input video signal 710 by the writing side clock signal 713 to the memory 72. The memory 72 writes this digital data 718 on the basis of the writing side clock signal 713 and a control signal 720 from the timing control circuit 77, reads this digital data 719 on the basis of the reading side clock signal 714 and the control signal 720 from the timing control circuit 77, and supplies it to the digital to analog converter 73.

The digital to analog converter 73 converts the digital data 719 to the output video signal 711 by the reading side clock signal 714 and supplies it to the display 79. The synchronizing signal generator 78 generates an output synchronizing signal 715 under control of the timing control circuit 77 using the clock signal 714 from the reading side clock generator 730 and supplies it to the display 79.

The input video signal 710 is generally a sampling clock having a frequency $f_S$ which is the same as the frequency $f_{DOT}$ of the dot clock of the input video signal 710 and is sampled by the analog to digital converter 71. The CPU circuit 780 discriminates the kind of the input video signal by the input horizontal synchronizing signal 716 at a horizontal scanning frequency of $f_H$ and the input vertical synchronizing signal 717 at a vertical scanning frequency of fV. When the CPU circuit 780 discriminates it as an already-known video signal, the CPU circuit 780 reads the division ratio data corresponding to the input video signal from, for example, a ROM included in the CPU circuit 780 which is not illustrated and generates a control signal to be supplied to the timing control circuit 77. As a result, the PLL circuit (1) 75 can generate the writing side clock signal 713 having the same frequency as that of the dot clock ($f_{DOT}$) of the input video signal 710 which is synchronized with the input horizontal synchronizing signal 716 in phase. When the CPU circuit 780 does not discriminate it as an already-known video signal, the CPU circuit 780 supplies the division ratio data for controlling the PLL circuit so that the first PLL circuit (1) 75 generates the writing side clock signal 713 which is expressed by the following formula to the timing control circuit 77.

$$f_S = K \times f_V \times L^2 \quad \text{(Formula 1)}$$

where K indicates a proportional constant, $f_V$ a vertical scanning frequency of an input video signal, and L the total number of lines of the input-video signal.

As a result, even if the CPU circuit 780 discriminates that a video signal which is not known is inputted, a satisfactory image can be displayed. The values of $f_V$ and L can be recognized easily by the CPU circuit 780 by referring to the input horizontal synchronizing signal and vertical synchronizing signal.

Next, the formula 1 mentioned above will be explained. Although it is widely known, assuming the total aspect ratio (the total number of horizontal dots/the total number of vertical lines) of an input video signal as A, the vertical scanning frequency as $f_V$, and the total number of lines as L, the sampling clock frequency $f_S$ is expressed by the following formula.

$$f_S = A \times f_V \times L^2 \quad \text{(Formula 2)}$$

In this case, it is difficult to obtain the total aspect ratio A for a video signal which is not known. Therefore, it is desirable to set A to a certain value beforehand. In the above case, A is set to K. However, it is generally desirable to set it to the maximum aspect ratio of a video signal having the highest resolution which is inputted to the display device.

By doing this, a sampling clock frequency $f_S$ which is higher than the dot clock frequency $f_{DOT}$ of the input video signal 710 can be obtained and the input video signal 710 can be sampled faithfully.

Furthermore, when an image having a higher image quality than that of an image obtained by setting the sampling clock ($f_S$) obtained above is displayed, the following can be executed. Namely, assuming the total number of horizontal dots of an input video signal as N', N'=A×L is held and the following formula is held from the formula 2 mentioned above.

$$f_S = N' \times f_V \times L \quad \text{(Formula 3)}$$

In this case, if a video signal which is not known is inputted, when the predetermined number of dots N having a relation of N'<N is set first and then the CPU circuit 780 performs the control process so as to decrease the value of N gradually, it is held that N'=N, that is, $f_S = f_{DOT}$ and an image with a higher image quality can be displayed.

When an input signal is a stable signal, the present invention described in the twenty-eighth to thirty-first embodiments mentioned above selects a clock synchronized with the input signal, or when an input signal is an unstable signal, it selects a stable clock which is generated in asynchronization with the input signal, and outputs it as a reading side clock. Therefore, in a display device which can handle a video signal at a scanning frequency in a wide range, even if a signal including a phase and frequency jitter is inputted, a satisfactory image can be displayed. By doing this, the unstable factors in the various embodiments of the present invention can be reduced and a stable operation can be performed.

The invention claimed is:

1. An image display system, comprising:

a memory for storing at least one scanning line of an inputted video signal of the interlace scanning system; and reading means for repeating to read said video signal of one scanning line from said memory at a speed which is n (n is an integer of 2 or more) times of the writing speed of said video signal for said memory for a horizontal scanning period which is 1/n of said writing period and to stop reading for a horizontal scanning period of the remaining (n−1)/n for each scanning line of one field which is sequentially inputted and reading each scanning line so that the continuous fields interpolate the period of stopping of reading from said memory each other.

2. An image display system according to claim 1, further comprising:

analog to digital converter for converting said inputted video signal of the interlace scanning system to a digital signal;

a line memory for storing a video signal of at least one field outputted from said analog to digital converter;

dot clock generation means for multiplying a horizontal synchronizing signal of said inputted video signal and generating a dot clock;

write control means for generating a write control signal of said line memory on the basis of said inputted horizontal synchronizing signal and a clock outputted from said dot clock generation means;

output horizontal synchronizing signal generation means for generating an output horizontal synchronizing signal on the basis of said inputted horizontal synchronizing signal and a clock outputted from said dot clock generation means; and read control means for generating a read control signal of said line memory on the basis of said inputted horizontal synchronizing signal and a clock outputted from said dot clock generation means.

3. An image display system according to claim 2, wherein said read control means reads a video signal from said line memory at a speed which is even times of the writing speed.

4. An image display system according to claim 2, wherein said dot clock generation means is means using a PLL circuit.

5. An image display system according to claim 1, further comprising:

analog to digital converter for converting said inputted video signal of the interlace scanning system to a digital signal;

a field memory for storing a video signal of at least one field outputted from said analog to digital converter;

dot clock generation means for multiplying a horizontal synchronizing signal of said inputted video signal and generating a dot clock;

write control means for generating a write control signal of said field memory on the basis of said inputted horizontal synchronizing signal, a clock outputted from said dot clock generation means, and the inputted vertical synchronizing signal;

output horizontal synchronizing signal generation means for generating an output horizontal synchronizing signal on the basis of said inputted horizontal synchronizing signal and a clock outputted from said dot clock generation means;

output vertical synchronizing signal generation means for generating an output vertical synchronizing signal on the basis of said inputted horizontal synchronizing signal and vertical synchronization signal; and read control means for generating a read control signal of said field memory on the basis of a clock outputted from said dot clock generation means, said synchronizing signal outputted from said output horizontal synchronizing signal generation means, and said synchronizing signal outputted from said output vertical synchronizing signal generation means.

6. An image display system according to claim 1, further comprising:

analog to digital converter for converting said inputted video signal of the interlace scanning system to a digital signal;

two field memories for alternately storing a video signal of at least one field outputted from said analog to digital converter;

dot clock generation means for multiplying a horizontal synchronizing signal of said inputted video signal and generating a dot clock of the writing system of said field memories;

write control means for generating a write control signal of said field memories on the basis of said inputted horizontal synchronizing signal, a clock outputted from said write dot clock generation means, and the inputted vertical synchronizing signal;

read dot clock generation means for generating a dot clock of the read system of said field memories;

output horizontal synchronizing signal generation means for generating an output horizontal synchronizing signal on the basis of a clock outputted from said read dot clock generation means;

output vertical synchronizing signal generation means for generating an output vertical synchronizing signal on the basis of the synchronizing signal outputted from said output horizontal synchronizing signal generation means; and read control means for generating a read control signal of said field memories on the basis of a clock outputted from said read dot clock generation means, said synchronizing signal outputted from said output horizontal synchronizing signal generation means, and said synchronizing signal outputted from said output vertical synchronizing signal generation means.

7. An image display system according to claim 6, wherein said write dot clock generation means uses a PLL circuit and said read dot clock generation means uses a crystal oscillation circuit.

8. An image display system, comprising:

input means for inputting a first video signal of the interlace scanning system;

input means for inputting a second video signal of the sequential scanning system;

frequency resolution conversion means for converting the scanning speed of said first video signal;

switching means for switching and selectively outputting said first video signal which is subjected to the frequency resolution conversion process and said second video signal;

display means for displaying a video signal outputted from said switching means;

memory means for storing at least one scanning line of a video signal outputted from said switching means; and reading means for repeating to read said video signal of one scanning line from said memory at a speed which is n (n is an integer of 2 or more) times of the writing speed of said video signal for said memory for a horizontal scanning period which is 1/n of said writing period and to stop reading for a horizontal scanning period of the remaining (n−1)/n for each scanning line of one field which is sequentially inputted and reading each scanning line so that the continuous fields interpolate the period of stopping of reading from said memory each other.

9. An image display system according to claim 8, further comprising:

analog to digital converter for converting said inputted first video signal of the interlace scanning system to a digital signal;

two field memories for alternately storing a video signal of at least one field outputted from said analog to digital converter;

write dot clock generation means for multiplying a horizontal synchronizing signal of said first inputted video signal and generating a dot clock of the writing system of said field memories;

write control means for generating a write control signal of said field memories on the basis of the horizontal synchronizing signal of said inputted first video signal, a clock outputted from said write dot clock generation means, and the vertical synchronizing signal of said first video signal;

read dot clock generation means for multiplying a horizontal synchronizing signal of said inputted second video signal and generating a dot clock of the reading system of said field memories; and read control means for generating a read control signal of said field memories on the basis of a clock outputted from said read dot clock generation means and the horizontal synchronizing signal and vertical synchronizing signal of said inputted second video signal.

10. An image display system according to claim 8, wherein said display means is one of a CRT system display, a liquid crystal system display, and a plasma system display.

11. An image display system, comprising:

analog to digital converter for converting said inputted video signal of the interlace scanning system to a digital signal;

a field memory for storing a video signal of at least one field outputted from said analog to digital converter;

dot clock generation means for multiplying a horizontal synchronizing signal of said inputted video signal and generating a dot clock;

write control means for controlling writing of said field memory:

read control means for controlling reading of said field memory:

output synchronizing signal generation means for dividing a dot clock generated by said dot clock generation means and generating output horizontal and vertical synchronizing signals;

frequency resolution conversion means for increasing the number of fields by n (n is an integer of 2 or more) times so as to increase the horizontal scanning frequency by n times; and read delay means for delaying a read start signal from the read control circuit so that a video signal of an even field which is read first from said memory is delayed by one horizontal scanning period.

12. An image display system, comprising:

an analog to digital converter for converting said inputted video signal of the interlace scanning system to a digital signal;

a field memory for storing a video signal of at least one field outputted from said analog to digital converter;

a dot clock generator circuit for multiplying a horizontal synchronizing signal of said inputted video signal and generating a dot clock;

a write control circuit for controlling writing of said field memory:

read control means for controlling reading of said field memory:

an output synchronizing signal generator for dividing a dot clock generated by said dot clock generation means and generating output horizontal and vertical synchronizing signals;

frequency resolution conversion means for increasing the number of fields by n times so as to increase the horizontal scanning frequency by n times; and an output vertical synchronizing signal shifting circuit for shifting an output vertical synchronizing signal so that continuous output video signals of the same field are displayed in the same scan line position.

13. An image display system having a frequency resolution conversion circuit for increasing the field frequency of an inputted video signal of the interlace scanning system by n times so as to increase the horizontal scanning frequency by n times, wherein said frequency resolution conversion circuit comprising:

an analog to digital converter for converting an inputted analog video signal to a digital signal;

a memory for storing at least one field of a video signal outputted from said analog to digital converter;

a digital to analog converter for converting a video signal read from said memory to an analog video signal;

a dot clock generator circuit for multiplying a horizontal synchronizing signal of said inputted video signal and generating a dot clock;

a write control circuit for generating a write control signal of said memory from a dot clock generated by said dot clock generator circuit and an input horizontal synchronizing signal and a vertical synchronizing signal of an inputted video signal;

an output synchronizing signal generator circuit for counting a dot clock generated by said dot clock generator circuit and generating and outputting an output horizontal synchronizing signal and a vertical synchronizing signal at a frequency which is n times of that of the input signal;

a field detector circuit for discriminating whether the field is an odd field or an even field from a horizontal synchronizing signal and a vertical synchronizing signal of said inputted video signal and outputting a field detection signal;

an output vertical synchronizing signal shifting circuit for shifting and outputting a vertical synchronizing signal outputted from said output synchronizing signal generator circuit in dot clock units generated by said dot clock generator circuit on the basis of said field detection signal; and a read control circuit for controlling reading from said memory on the basis of a dot clock generated by said dot clock generator circuit, an output horizontal synchronizing signal outputted from said output synchronizing signal generator circuit, an output vertical synchronizing signal outputted from said output vertical synchronizing signal shifting circuit, and said field detection signal.

14. An image display system according to claim 13, wherein said output vertical synchronizing signal shifting circuit comprising:
   at least one delay circuit for shifting and outputting an output vertical synchronizing signal outputted from said output synchronizing signal generator circuit in dot clock units generated by said dot clock generator circuit;
   a switching circuit for switching and outputting an output signal of said delay circuit; and
   an output vertical synchronizing signal selection circuit for controlling said switching circuit on the basis of said field detection signal and said output vertical synchronizing signal outputted from said output synchronizing signal generator circuit.

15. An image display system comprising:
   means for converting at least one of the frequency and resolution which process an input video signal digitally and convert the input video signal to a video signal having the predetermined horizontal and vertical scanning frequencies;
   variable gain video output means for varying the gain of said video signal; and
   control means for controlling the gain of said variable gain video output means according to at least one value of said frequency and resolution.

16. An image display system according to claim 15, further comprising:
   a plurality of power sources having different voltages for setting the gain of said variable gain video output means;
   a switch for selecting the power source to be supplied to said video output means from said plurality of power sources; and
   control means for controlling switching of said switch.

17. An image display system according to claim 16, wherein said control means for controlling the power source to be supplied to said video output means controls so that a high supply voltage is set when an image displayed on said display device is a television image and a low supply voltage is set when it is a computer image.

18. An image display system according to claim 15, further comprising:
   a video processor for varying and setting the color temperature of an image to be displayed on said display device; and
   control means for controlling the value of color temperature to be set by said video processor.

19. An image display system according to claim 18, wherein said control means for controlling the color temperature of an image controls so that the color temperature is set to about 6500 K (Kelvin) when an image displayed on the display device is a television image and the color temperature is set to about 9300 K (Kelvin) when it is a computer image.

20. An image display system according to claim 15, further comprising:
   a video processor for varying and setting the gamma correction factor of an image to be displayed on said display device;
   control means for controlling the gamma correction factor set by said video processor to a suitable value.

21. An image display system according to claim 15, wherein said control means for controlling the gain of said video output means controls so that a large gain is set when an image displayed on said display device is a television image and a small gain is set when it is a computer image.

22. An image display system according to claim 15, wherein said means for converting is a scan converter.

23. An image display system comprising:
   means for converting at least one of the frequency and resolution which process an input video signal digitally and convert the input video signal to a video signal having the predetermined horizontal and vertical scanning frequencies;
   at least two video output means having different gains;
   switching means for selecting the desired one from said plurality of video output means; and
   control means for switching said switching means according to at least one value of said frequency and resolution.

24. An image display system according to claim 23, wherein said means for converting is a scan converter.

25. An image display system comprising:
   means for converting at least one of the frequency and resolution which process an input video signal digitally and convert the input video signal to a video signal having the predetermined horizontal and vertical scanning frequencies;
   current feedback video output means;
   a plurality of input resistors for deciding the gain of said current feedback video output means;
   a switch for selecting a resistor for obtaining the desired gain from said plurality of input resistors; and
   control means for switching said switch according to at least one value of said frequency and resolution.

26. An image display system according to claim 25, further comprising:
   a plurality of power sources having different voltages to be supplied to said current feedback video output means;
   a switch for selecting said power source; and
   control means for switching said switch on the basis of said selected resistance.

27. An image display system according to claim 25, wherein said means for converting is a scan converter.

28. An image display system comprising:
   frequency conversion means for processing an input video signal digitally and converting the input video signal to a video signal at the predetermined horizontal and vertical scanning frequencies;
   a first clock generator circuit for generating a clock in synchronization with an input synchronizing signal;
   a second clock generator circuit for generating an asynchronizing clock signal; and
   selection means for selecting one of these clock generator circuits on the basis of said predetermined horizontal and vertical frequencies and generating a clock for said digital process.

29. An image display system according to claim 28, further comprising:
   control means for automatically controlling a selection operation of said selection means.

30. An image display system according to claim 29, wherein said control means further comprises:
   signal discrimination means for discriminating the kind of an input signal and controlling said selection means.

31. An image display system according to claim 29, wherein said control means further comprises:
   jitter detection means for detecting a jitter of an input signal or a clock to be outputted and controlling said selection means.

32. An image display system, comprising:
   frequency conversion means for processing an input video signal digitally and converting the input video signal to a video signal at the predetermined horizontal and vertical scanning frequencies;
   a voltage control oscillator;
   a frequency divider for dividing a signal outputted from said voltage control oscillator;
   a phase comparator for comparing the phase of an input horizontal synchronizing signal with that of a signal outputted from said frequency divider and outputting a phase difference signal;
   a low pass filter for taking out the low frequency component from said phase difference signal;
   a constant voltage source; and
   selection means for selecting the output voltage of said low pass filter and the output voltage of said constant voltage source and supplying them as control voltages of said voltage control oscillator.

33. An image display system according to claim 32, further comprising:
   control means for automatically controlling a selection operation of said selection means.

34. An image display system according to claim 33, wherein said control means further comprises:
   signal discrimination means for discriminating the kind of an input signal and controlling said selection means.

35. An image display system according to claim 33, wherein said control means further comprises:
   jitter detection means for detecting a jitter of an input signal or a clock to be outputted and controlling said selection means.

36. An image display system comprising:
   frequency conversion means for processing an input video signal digitally and converting the input video signal to a video signal at the predetermined horizontal and vertical scanning frequencies;
   a fixed frequency oscillator;
   a phase comparator;
   a low pass filter for taking out the low frequency component from a phase difference signal outputted from said phase comparator;
   a voltage control oscillator using a voltage outputted from said low pass filter as a control voltage;
   a frequency divider for dividing a signal outputted from said voltage control oscillator and supplying it as one input signal of said phase comparator; and
   selection means for selecting one of said input video signal and an output signal of said fixed frequency oscillator and supplying it as the other input signal of said phase comparator.

37. An image display system according to claim 36, further comprising:
   control means for automatically controlling a selection operation of said selection means.

38. An image display system according to claim 37, wherein said control means further comprises:
   signal discrimination means for discriminating the kind of an input signal and controlling said selection means.

39. An image display system according to claim 37, wherein said control means further comprises:
   jitter detection means for detecting a jitter of an input signal or a clock to be outputted and controlling said selection means.

40. An image display system, comprising:
   frequency conversion means for processing an input video signal digitally and converting the input video signal to a video signal at the predetermined horizontal and vertical scanning frequencies;
   a voltage control oscillator;
   a frequency divider for dividing a signal outputted from said voltage control oscillator;
   a phase comparator for comparing the phase of an input horizontal synchronizing signal with that of a signal outputted from said frequency divider and outputting a phase difference signal;
   a low pass filter for taking out the low frequency component from said phase difference signal;
   sample hold means for holding the output voltage of said low pass filter; and
   selection means for selecting the output voltage of said low pass filter and the hold voltage of said sample hold means and supplying them as control voltages of said voltage control oscillator.

41. An image display system according to claim 40, further comprising:
   control means for controlling said selection means according to the kind of an input signal or a jitter of an input signal or an output signal.

42. An image display system, comprising:
   frequency conversion means for processing an input analog video signal digitally and converting the input analog video signal to a signal at the predetermined horizontal and vertical scanning frequencies;
   an analog to digital converter for converting an input analog video signal to a digital video signal;
   a PLL circuit for generating a sampling clock for sampling an input analog video signal by said analog to digital converter;
   control means for supplying the set value of the clock frequency of a sampling clock generated by said PLL circuit to said PLL circuit; and
   a CPU for recognizing said input analog video signal and instructing said control means so as to send said set value on the basis of the result;
   wherein the maximum aspect ratio A of an analog video signal which can be received by said display device is set in said CPU and when a set value corresponding to the input analog video signal is not preset in said memory circuit, said CPU recognizes the total number of lines L and the vertical scanning frequency $f_v$ of the input analog video signal and instructs said control means so that said PLL circuit generates a sampling clock at a frequency of $f_s$ for which $f_s = A \times L^2 \times f_v$ is held.

43. An image display system according to claim 42, wherein when said CPU supplies an instruction of generation of a sampling clock $f_s$ to said control means so as to approximate the maximum aspect ratio of $f_s = A \times L^2 \times f_v$ to the aspect ratio of the input analog video signal for said PLL circuit, a sampling clock at a frequency of $f_s$ which is equal to or approximate to that of the dot clock of the input analog video signal can be obtained.

44. A display apparatus comprising:
    a receiver to receive video signals corresponding to at least a first and a second effective line which are included in a field or a frame to be shown on a screen; and
    a processor to insert an ineffective line between said first effective line and said second effective line.

45. The display apparatus according to claim 44, wherein said ineffective line comprises ineffective video signals which are different from received video signals.

46. The display apparatus according to claim 45, wherein said ineffective video signals are not outputted on said screen.

47. A display apparatus comprising:
    a memory to store video signals corresponding to at least a first and a second effective line which are included in a field or a frame to be shown on a screen; and
    a processor to control to output an ineffective line between said first effective line and said second effective line.

48. The display apparatus according to claim 47, wherein said ineffective line comprises ineffective video signals which are different from received video signals.

49. The display apparatus according to claim 48, wherein said ineffective video signals are not outputted on said screen.

50. A display apparatus comprising:
    a memory to store a first field and a second field of a frame; and
    a screen to display said first field and said second field respectively, odd lines of said first field are effective lines and even lines of said first field are ineffective lines, and odd lines of said second field are ineffective lines and even lines of said second field are ineffective lines.

51. The display apparatus according to claim 50, wherein said effective line comprises received video signals and said ineffective line comprises ineffective video signals which are different from said received video signals.

52. The display apparatus according to claim 51, wherein said ineffective video signals are not outputted on said screen.

53. A display system comprising:
    a memory to store video signals corresponding to at least a first and a second effective line which are included in a field or a frame to be shown on a screen; and
    a processor to control to output an ineffective line between said first effective line and second effective line.

54. The display system according to claim 53, wherein said ineffective line comprises ineffective video signals which are different from received video signals.

55. The display system according to claim 54, wherein said ineffective video signals are not outputted on said screen.

56. An image display system comprising:
    a receiver to receive video signals corresponding to at least a first and a second effective line which are included in a field or a frame to be shown on a screen;
    a processor to insert an ineffective line between said first effective line and said second effective line;
    a memory for storing at least one scanning line of an inputted video signal of the interlace scanning system;
    reading means for repeating to read said video signal of one scanning line from said memory at a speed which is n (n is an integer of 2 or more) times of the writing speed of said video signal for said memory for a horizontal scanning period which is 1/n of said writing period and to stop reading for a horizontal scanning period of the remaining (n−1)/n for each scanning line of one field which is sequentially inputted and reading each scanning line so that the continuous fields interpolate the period of stopping of reading from said memory each other;
    a display portion to display an image based on video signals on a screen; and
    a processor to control brightness corresponding to a part of said screen by controlling a gain of said video signals corresponding to said part of said screen.

* * * * *